Aug. 20, 1963  V. H. PAVLECKA  3,101,170
RADIAL DYNAMIC MACHINES INCLUDING CENTRIPETAL
COMPRESSORS AND CENTRIFUGAL TURBINES
Filed June 8, 1955  22 Sheets-Sheet 1

INVENTOR.
VLADIMIR H. PAVLECKA
BY
Nicholas T. Vohr
ATTORNEY.

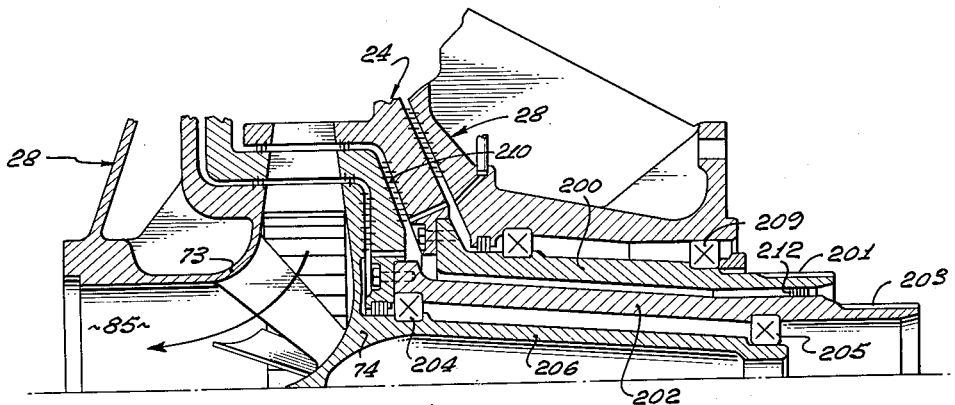
FIG. 2.
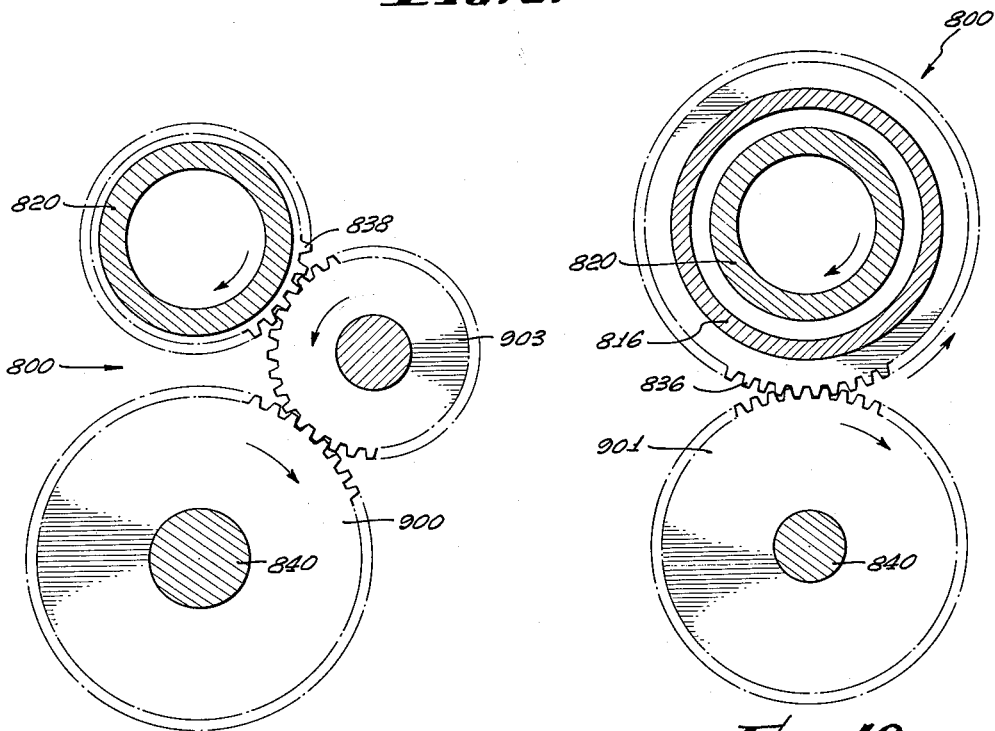
FIG. 9.
FIG. 10.

INVENTOR
VLADIMIR H. PAVLECKA
BY Nicholas T Vohr
ATTORNEY

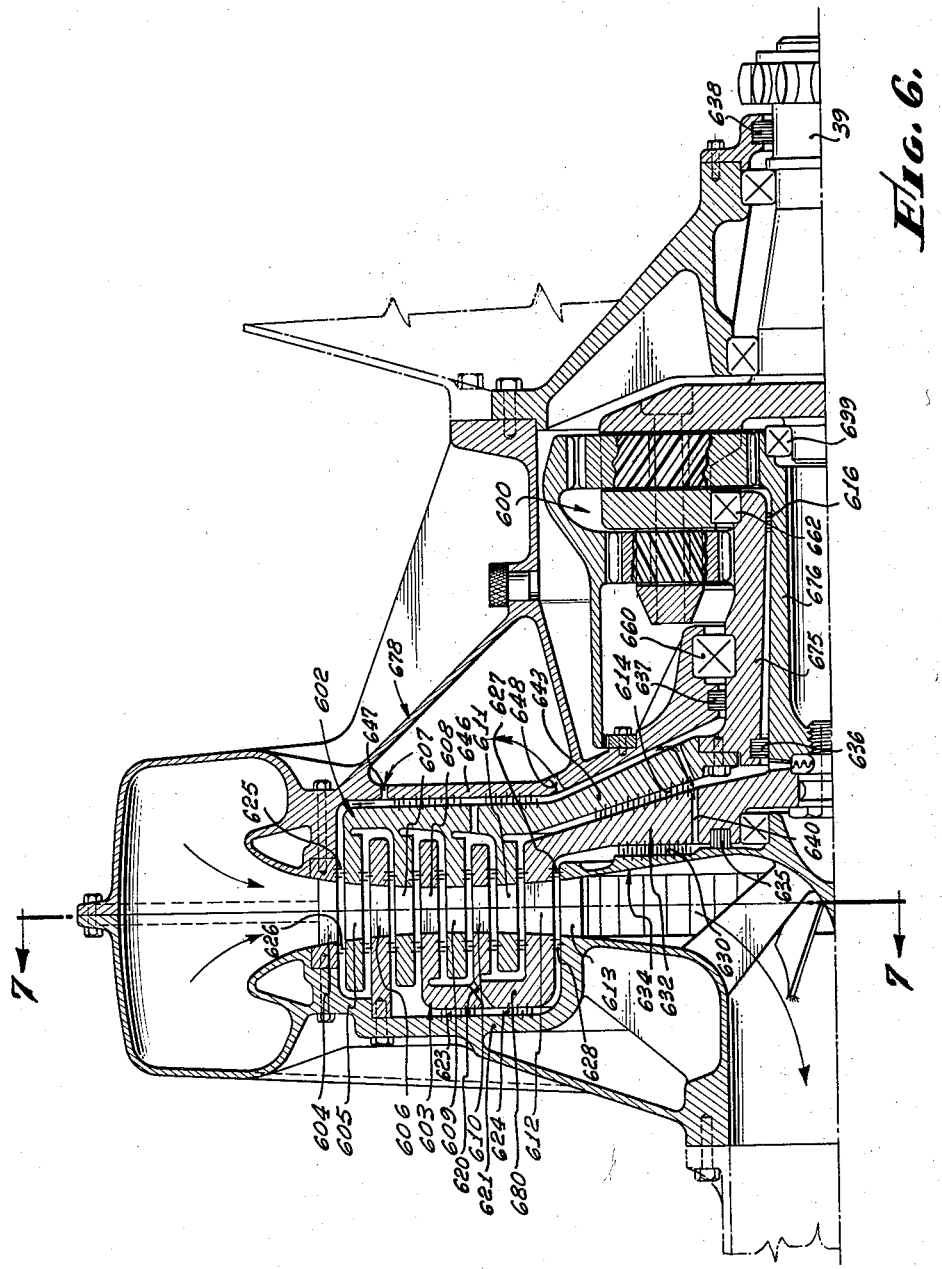

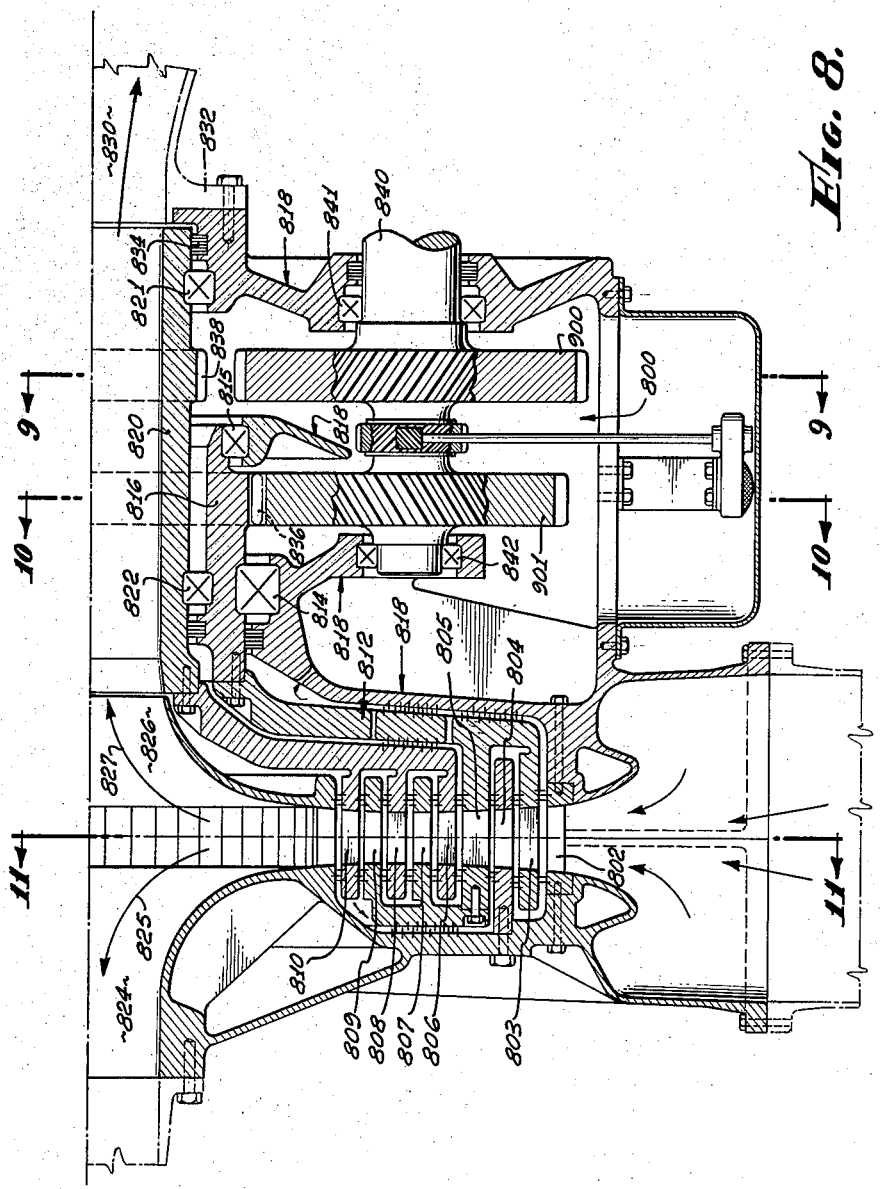

Aug. 20, 1963 V. H. PAVLECKA 3,101,170
RADIAL DYNAMIC MACHINES INCLUDING CENTRIPETAL
COMPRESSORS AND CENTRIFUGAL TURBINES
Filed June 8, 1955 22 Sheets-Sheet 6

INVENTOR
VLADIMIR H. PAVLECKA
BY Nicholas T Vohr
ATTORNEY

CENTRIPETAL COMPRESSOR

CENTRIPETAL COMPRESSOR

RADIAL CENTRIFUGAL STEAM TURBINE

RADIAL CENTRIFUGAL GAS TURBINE

INVENTOR
VLADIMIR H. PAVLECKA
BY
ATTORNEY

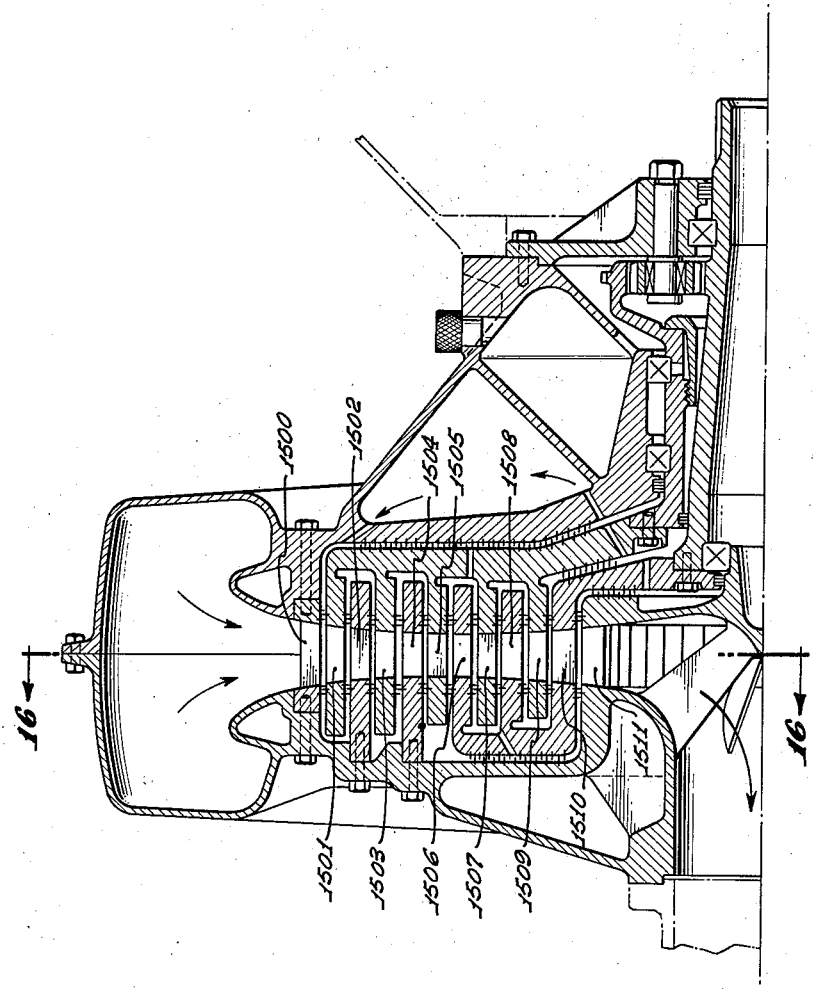

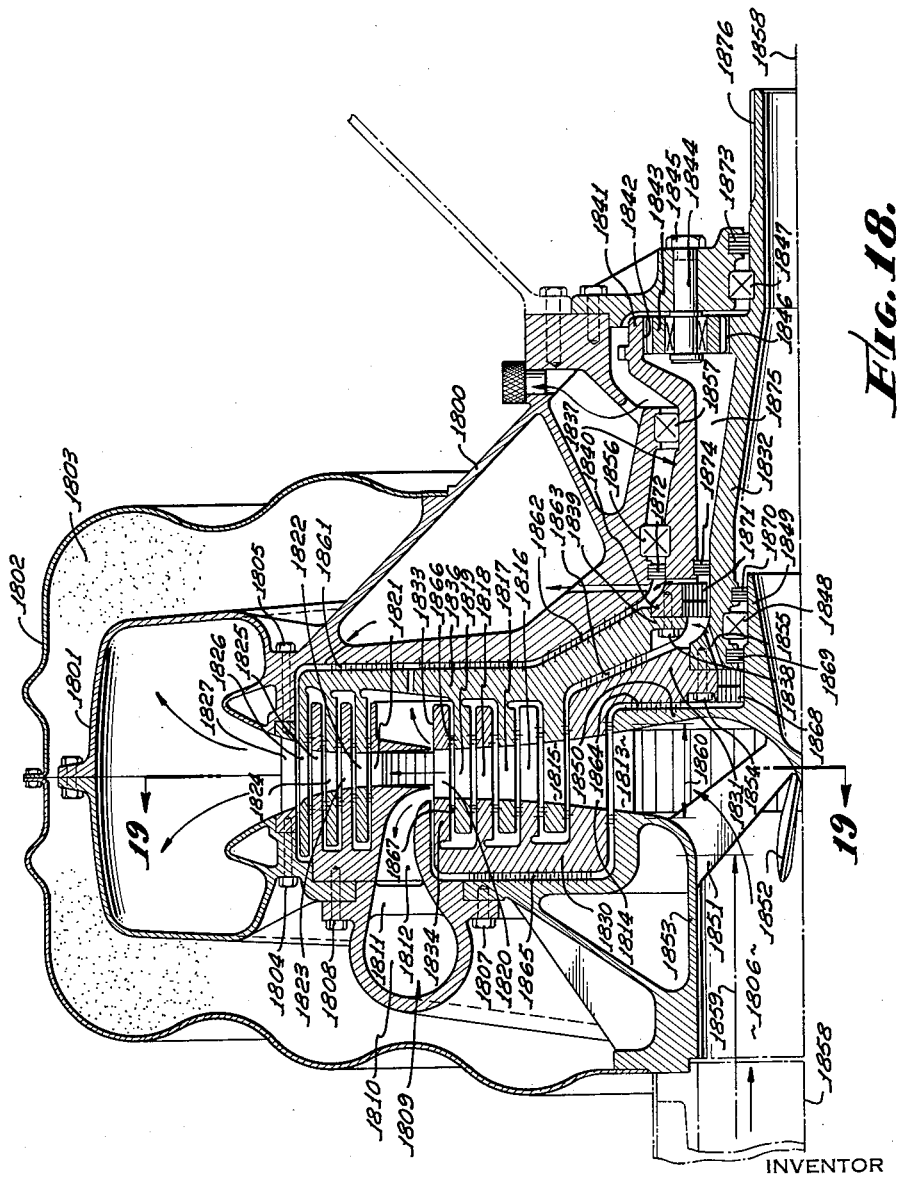

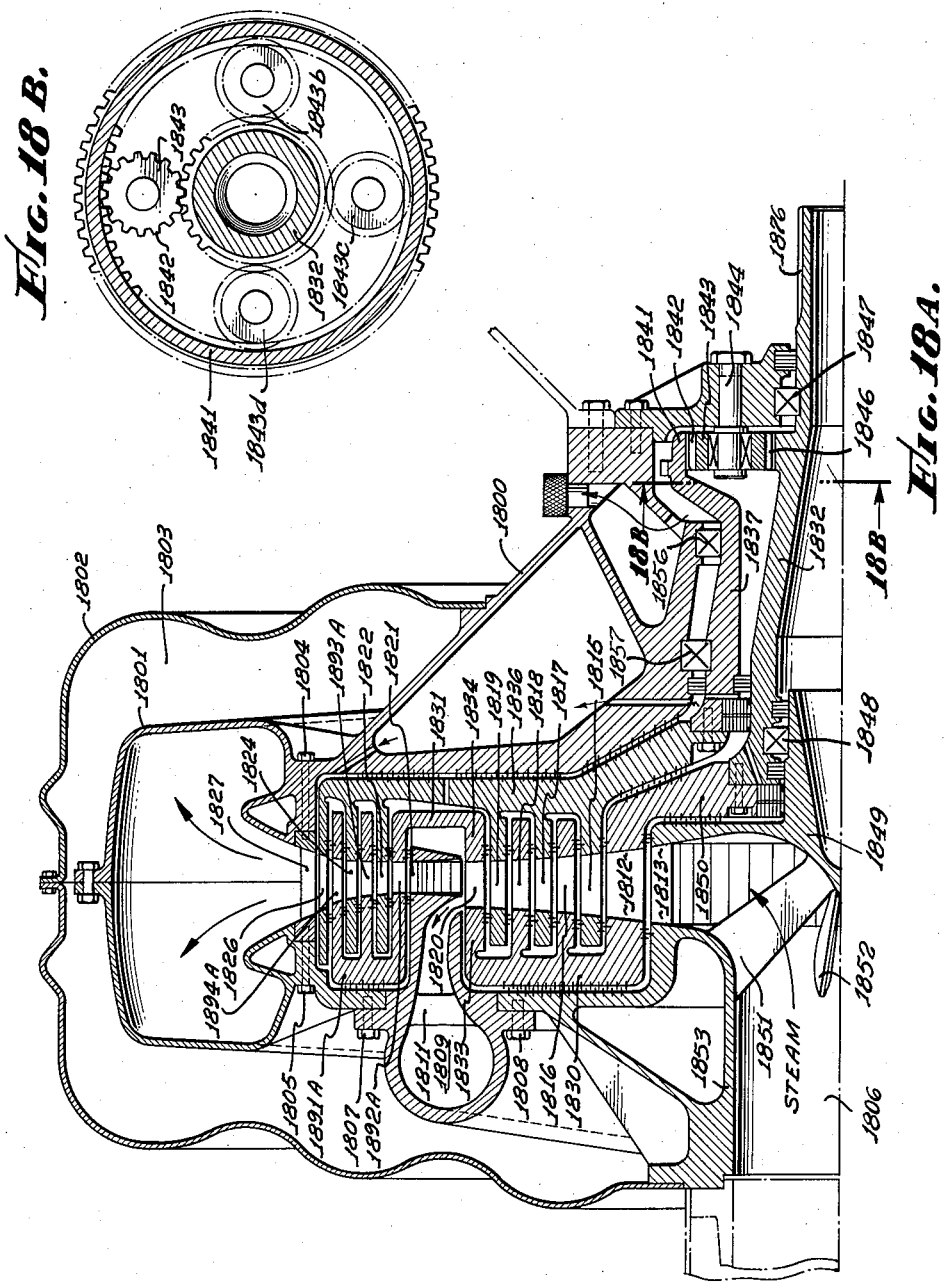

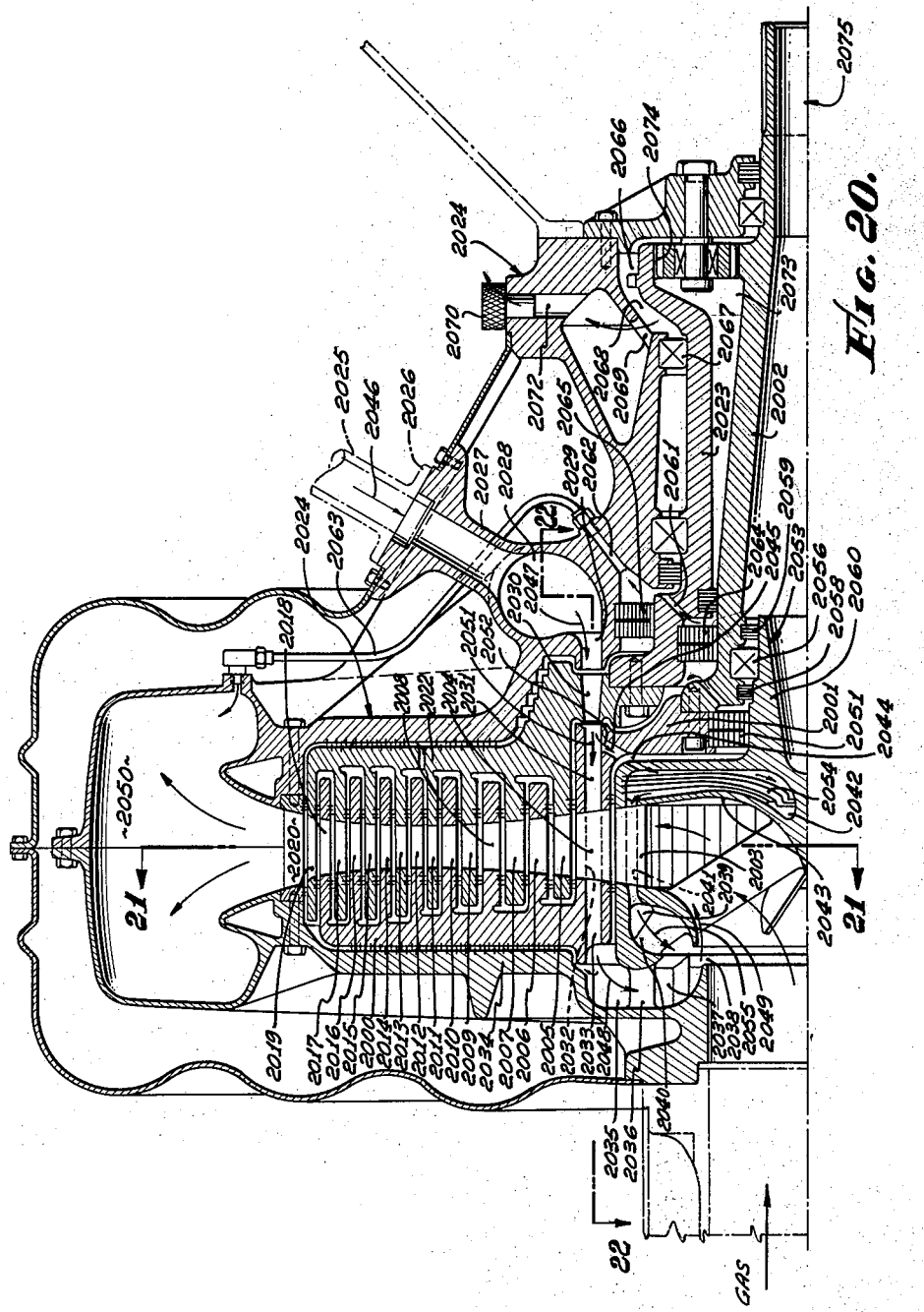

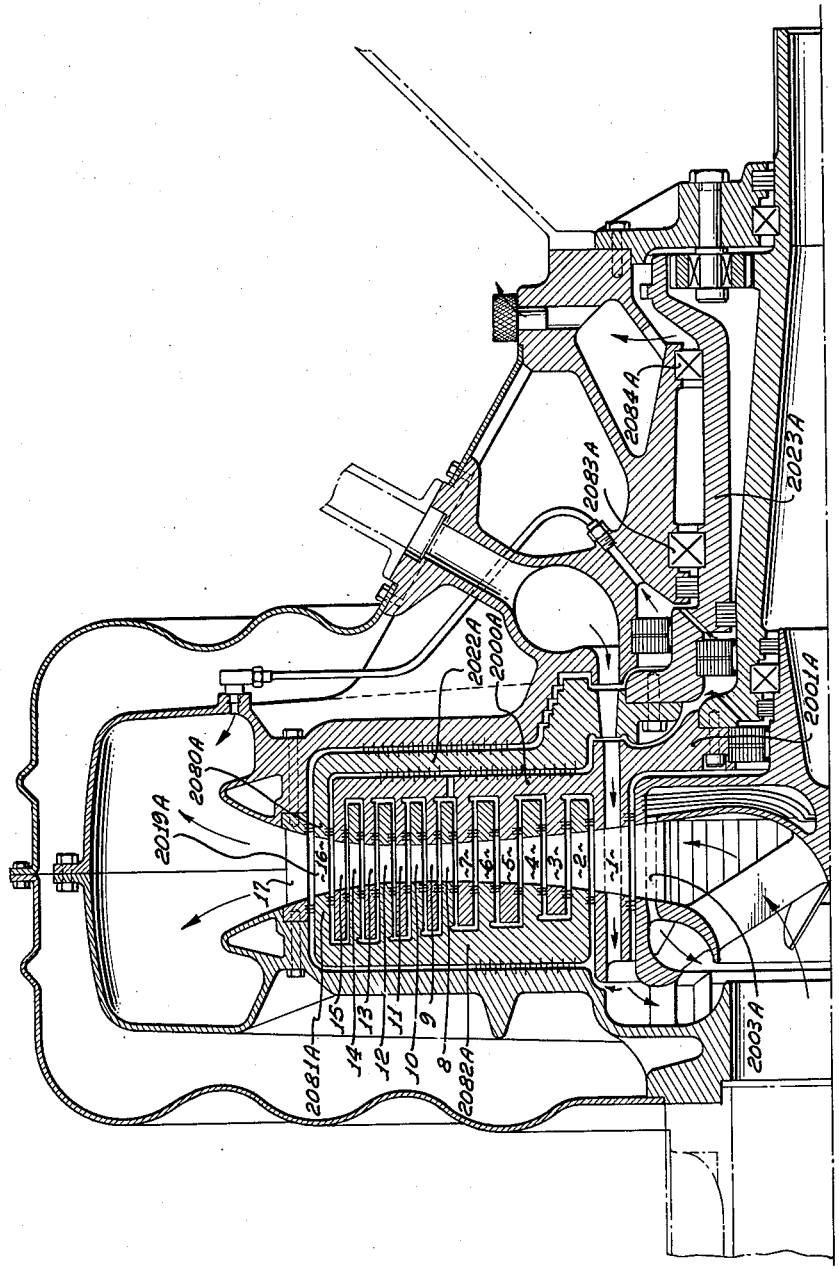

INVENTOR.
VLADIMIR H. PAVLECKA
BY
Nicholas T Volk
ATTORNEY.

TURBINE VELOCITY VECTOR DIAGRAM

INVENTOR
VLADIMIR H. PAVLECKA
BY
ATTORNEY $C_x$ = ENTRY VELOCITY
$C'_x$ = EXIT VELOCITY
$W_x$ = ENTRY VELOCITY
$W'_x$ = EXIT VELOCITY
$U_x$ = ENTRY VELOCITY
$U'_x$ = EXIT VELOCITY $$\frac{C_1}{a_{c_1}} = \frac{W'_{16}}{a_{c'_{15}}} = M_a = CONST.$$

INVENTOR.
VLADIMIR H. PAVLECKA
BY
Nicholas T Vorks
ATTORNEY.

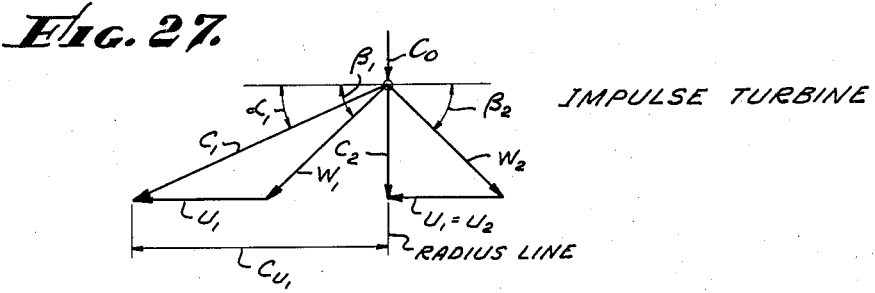
FIG. 27.  IMPULSE TURBINE
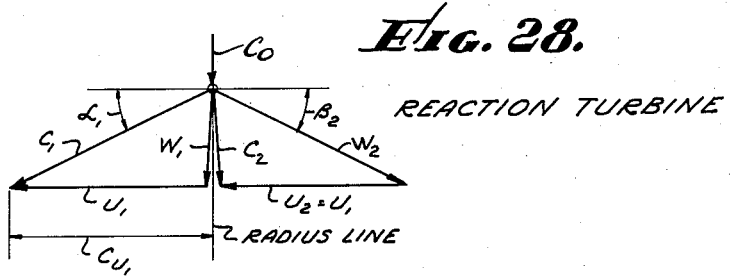
FIG. 28.  REACTION TURBINE
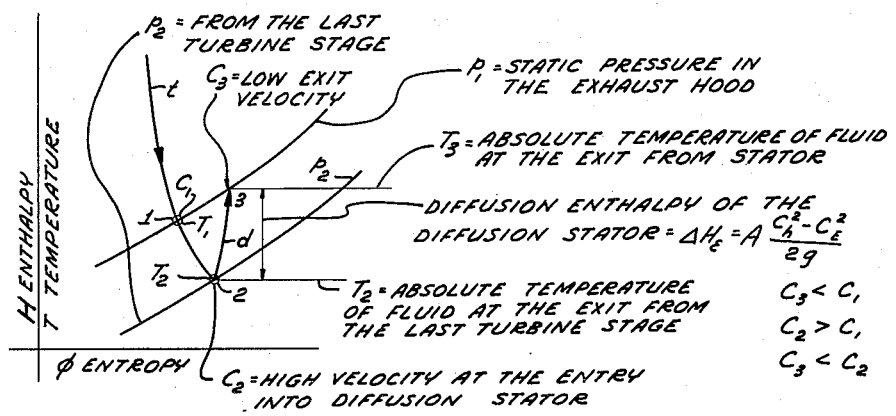
FIG. 26.

Aug. 20, 1963    V. H. PAVLECKA    3,101,170
RADIAL DYNAMIC MACHINES INCLUDING CENTRIPETAL
COMPRESSORS AND CENTRIFUGAL TURBINES
Filed June 8, 1955    22 Sheets-Sheet 20

VELOCITY VECTOR DIAGRAM FOR
SINGLE-ROTATION TURBINE SYSTEM:

VELOCITY VECTOR
DIAGRAM FOR
A RADIAL TURBINE
HAVING NO EXPANSION STATOR

INVENTOR.
VLADIMIR H. PAVLECKA
BY
Nicholas T Vohk
ATTORNEY.

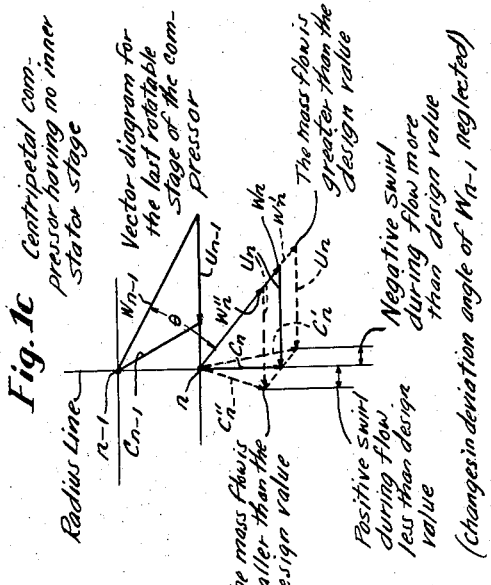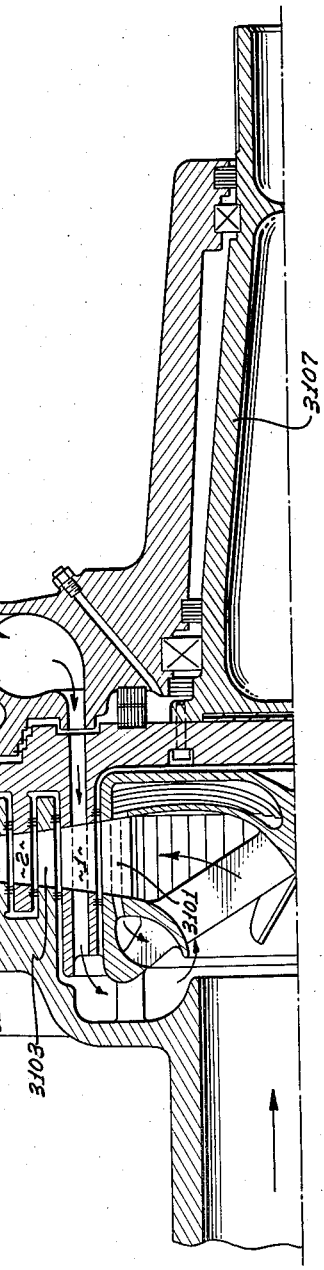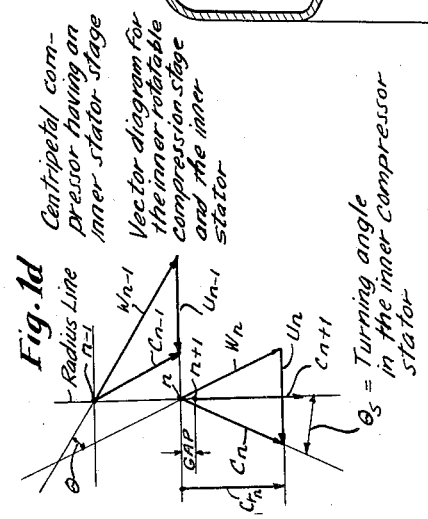

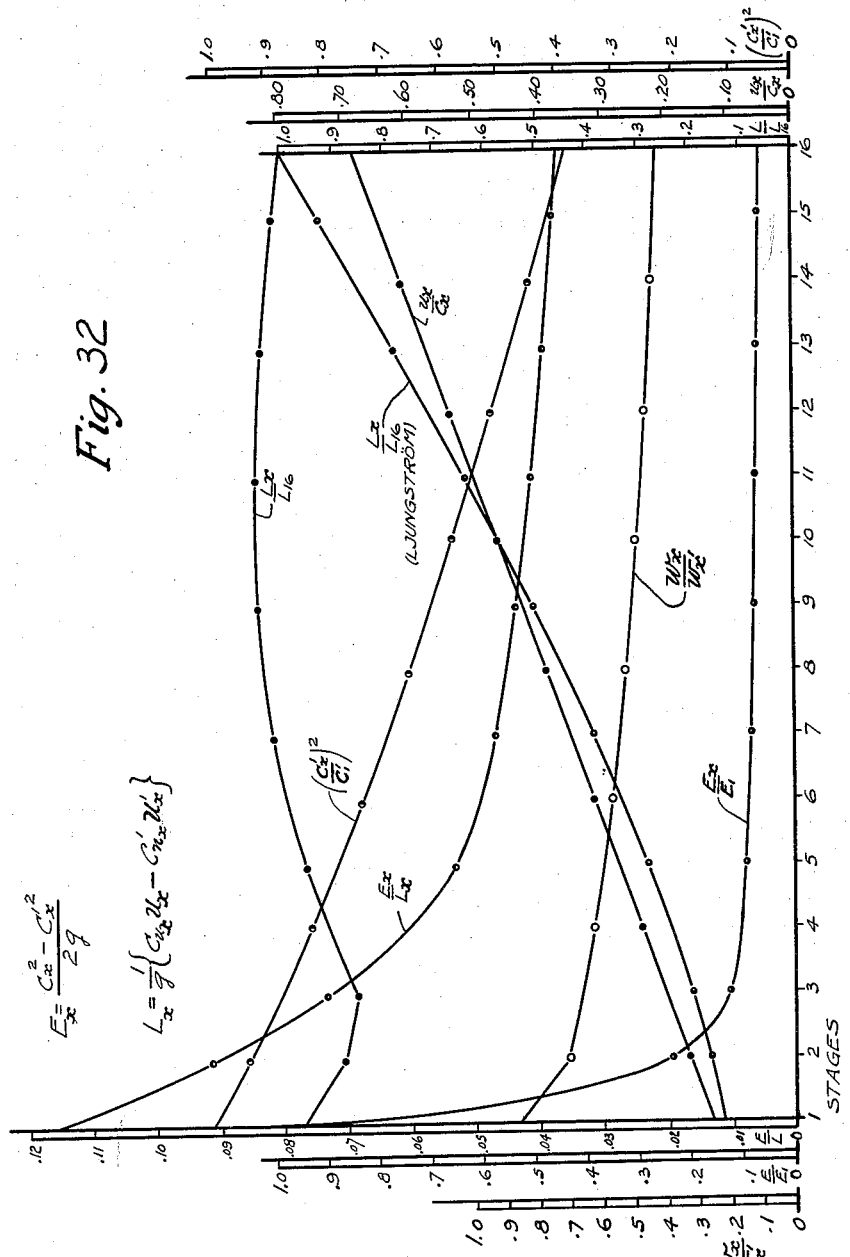

3,101,170
RADIAL DYNAMIC MACHINES INCLUDING CENTRIPETAL COMPRESSORS AND CENTRIFUGAL TURBINES
Vladimir H. Pavlecka, Pacific Palisades, Calif., assignor to American Machine & Foundry Company, a corporation of New Jersey
Filed June 3, 1955, Ser. No. 513,947
20 Claims. (Cl. 230—124)

This invention relates to radial dynamic turbine machines and more particularly to the centripetal flow dynamic compressors for compressing elastic fluid and to the radial, centrifugal flow turbines, the turbines being either steam turbines or gas turbines.

This invention discloses the centripetal compressors and the centrifugal turbines both of which utilize an identical basic structure in which two contra-rotatable rotors are mounted on two concentric shafts positioned to one side of the two rotors, and a central stationary duct for conveying a compressed fluid from the compressor or conveying superheated steam or other heated gases to the steam or gas turbine. The two shafts, preferably, are interconnected by means of appropriate gears, such as herringbone gears or planetary gears for proper synchronization of the two rotors. The central duct and the two concentric shafts have a common longitudinal axis, with the duct extending to one side of the transverse plane perpendicular to the common longitudinal axis of the shafts and the duct, while the two shafts extend to the other, or the opposite, side of such transverse plane, the longitudinal axis being also the axis around which the two rotors and the two shafts revolve. The two rotors are provided with appropriate means for fluid dynamically balancing each rotor so that equal fluid pressures are exerted by the fluid on the inner and the outer sides, or surfaces, of each rotor. Accordingly, the two rotors do not produce, or exert, any side thrust which is so wasteful of power required to operate the compressor and is equally wasteful of useful power appearing at the output shaft of the turbine.

The compressors as well as the turbines have input and output stator stages for improving their fluid dynamic characteristics, and the compressors also have vector-adjusting stages for obtaining higher total heads, or higher compression ratios, from a given number of compression stages.

Due to the fluid dynamic and geometric limitations the innermost stages of radial centrifugal turbines and the outermost stages of centripetal compressors cannot be loaded effectively, or practicably, past a certain fixed limit, this limit being a function of the local Mach number at which the respective compressor and turbine stages, or cascades, can function effectively.

In the centripetal compressors, the Mach number limitation, which is the fluid dynamic limitation, applies to the outermost stages having large diameters. The outer, large diameter compressor stages have a far greater capability to convert the mechanical shaft energy into compression energy than the Mach number limitations permit them. This is due to the fact that the peripheral velocity of the outermost stage in the centripetal compressor is the highest, and all other stages on the same rotor have their peripheral velocities reduced in proportion to the reduction in the mean radius of such stages. This is the geometric limitation of any radial machine, whether it is a compressor or a turbine. Accordingly, the small diameter innermost turbine stages, having low peripheral velocities as compared to the peripheral velocities of the other stages, are not capable of converting effectively the very high kinetic energies, produced by the very high velocities of expansion, into mechanical work. Such high velocities of the working fluid (steam or gases from a combustion heat generator) produce high local Mach numbers which may exceed the optimum Mach numbers assigned to these stages. Conversely, the large diameter stages of the centrifugal turbines, because of their high peripheral velocities, have a high capacity for converting the energy of gases into mechanical work without exceeding the optimum local Mach numbers.

Although the small diameter stages of the centripetal compressors are not capable of imparting high kinetic energy to gases, they are capable of converting the high kinetic energy of gases, produced by the outer stages, into pressure at the local Mach numbers not exceeding the optimum values, which correspond in these stages to high flow velocities, due to higher temperatures of the gases in these stages, such high temperature raising the velocity of sound. Therefore, it is possible to have high flow velocities without approaching or transgressing the local Mach numbers which are greater than 1.0, i.e. there is no danger of entering a supersonic region of operation.

Accordingly, in the centripetal compressors disclosed in this specification, the outermost stages generate large kinetic energy within the fluid, and this energy is passed to the innermost, smaller diameter stages, where this energy is added to the locally generated kinetic energy, thus increasing the local conversion of the kinetic energy into pressure energy by the small diameter stages. It should be understood that what is meant here by the large kinetic energy is that increment of kinetic energy which the outermost stages are allowed to produce, or generate, because of the use of the vector-adjusting stages in the disclosed compressors. Without such stages the total amount of the generated kinetic energy would have been much lower and it would not be possible to transmit, so to speak, large amounts of kinetic energy from the outer stages to the innermost stages.

In the case of the centrifugal turbines, the working fluid is expanded in the small diameter stages in excess of the ability of these stages to convert the kinetic energy into mechanical energy, and the excess of the kinetic energy is passed on to the larger diameter stages which are capable of converting this energy into mechanical energy because of their higher peripheral velocities.

In both instances, in the compressors and the turbines, the fluid may be compressed and expanded, respectively, at constant relative velocity local Mach numbers, from stage to stage, or nearly constant Mach numbers. High initial velocities and high rates of expansion are obtained in the turbines by introducing an input stator stage, which is also true of the compressors in which case the high entry velocity is obtained at the exit from the stationary contra-prerotation stage by creating a negative pressure gradient across such contra-prerotation stage.

The input stator of the centrifugal flow turbine becomes the output stator in the centripetal flow compressor. It is known that centripetal flow rotatable compression stages perform a dual function: each compression stage must act as a kinetic energy generator and, also, as a diffuser, or a converter of the kinetic energy into pressure. The effectiveness of the compression stage as the generator of the kinetic energy is a function of the peripheral velocity of the stage, the higher the stage velocity, the higher is the kinetic energy of the stage. The degree of diffusion obtainable in the stage depends on the length of the diffusion channel and the degree of divergence which may be obtained in the channel so as to reduce the relative velocity of flow. It may show that the innermost stage of the compressor will produce a higher compression ratio if it is combined with an inner stator. This is due to the fact that it becomes possible to make $W_n$ (see FIGURES 1–c and 1–d) which is the exit velocity from the last compression stage, and $C_n$ which is the corresponding absolute velocity, higher, and relegate the diffusion to the inner stator. The inner stator also will produce an exit velocity, $C_{n+1}$ which has a strictly radial direction with only second order variations in the direction from the true radial direction flow, caused by changes in the deviation angle produced by the changes in the mass flow. The variations in the radial component $C_{r_n}$ of the absolute velocity $C_n$ which is the absolute exit velocity from the last rotatable compression stage, do produce a variation in the magnitude and the direction of $C_n$. These changes in $C_n$, as they affect the stator, appear, primarily, as the variations in the angle of incidence of $C_n$ with respect to the stator. Since this angle of incidence does not have any marked effect on the direction of $C_{n+1}$, or the direction of the exit velocity from the stator, no important swirl will ever appear in the compressed air leaving the inner stator at any time throughout the operating range of the compressor. In the compressor having no stator, the last compression stage will produce a positive swirl when the flow is less than the design value, and a negative swirl when the mass flow is more than the design value, as illustrated in FIG. 1–c. Therefore, there will be no swirl in this case only when the mass flow through the compressor is equal to the design flow. Such swirl will create fluid dynamic problems in the combustion chamber or the ducting following the compressor. However, what is more important than the swirl is the fact that the last rotatable compression stage must have a small turning angle, $\theta$ in this case, which also is due to the general decrease of the stagger angles of the cascade blades with the decreasing radii of the cascade, or stage, of the compressor. This produces a corresponding decrease in the energy conversion through the last rotating stage. The turning angle of the last stage, in the compressor having a stator, can be increased to the very limit of feasibility of this stage, which will produce an immediate and a marked increase in the momentum of the fluid and the mechanical work input into this stage. This increase in the work input will produce a corresponding increase in the work output and the energy conversion factor of this stage. The stator will also produce a turning on the swirl component emanating from the compression stage with the concomitant turning of the flow to the radial direction and conversion of the swirl into potential energy through diffusion. When the mass flow changes, the absolute velocity vector $C_n$, arriving from the last compression stage, will also change in its angular direction, and the stator will be, in general, capable of accepting this angular variation and turn it into a substantially radial direction with the swirl being reduced to negligible values in this case. It is, therefore, possible to achieve very good energy conversions in all compression stages, and especially in the last stage, relatively speaking, if an exit stator is used in the compressor. This is not possible except in an unusual instance—design point only—if the last stage is a rotatable stage. The combination of the inner stator and the last compression stage produces a total pressure head approximately from 30% to 50% greater and a static pressure head approximately 100% greater than the compression stage can produce alone, without any stator.

The introduction of the exit stator in the centripetal flow compressor does not put any physical or geometric limitations on the capabilities of the compressor, such robbing of the compressor of the radial space available for the compression stages. This is due to the fact that the exit stator simply becomes a part of the exit ducting and, therefore, in effect, takes no space from the compression stages. Accordingly, whenever the geometry of the power plant or any other apparatus using the centripetal compressor so permits, it will be always advantageous to use a centripetal compressor having an inner stator. The invention discloses such geometries.

It is important in radial flow multi-stage machines to achieve as much energy conversion as possible with as few stages as possible since the diameter of such machines is limited by some practical considerations and also by the fact that, in considering the overall diameter of a machine, proper dimensional allowance should be made for structures permitting good flow-in or flow-out spaces at the entry and exit to and from the stages. The disclosed compressors produce higher total heads or compression ratio than the compressors disclosed in my earlier United States application for patent Serial No. 179,028, filed August 12, 1950, now Patent No. 2,712,895 entitled "Centripetal Subsonic Compressor" where no vector-adjusting stages are used. The disclosed turbines are also capable of producing higher shaft horse-power with a lesser number of stages, thus enhancing materially the performance characteristics of the radial dynamic machines.

As stated in the co-pending application, S.N. 514,001 filed June 8, 1955, now abandoned the gain in the total pressure head produced by a centripetal compressor operating at a substantially constant Mach number through all the compression stages of the compressor is more than 100% higher as compared to the total pressure head produced by a centripetal compressor having the same number of compression stages but operating with a progressively decreasing Mach number in accordance with the teachings of the earlier Patent No. 2,712,895, entitled "Centripetal Subsonic Compressor." Such increase in the total head is obtained solely because of the constant Mach number operation outlined in the above application. For a complete discussion of this method, the reader is referred to the above-mentioned application for patent which concerns itself solely with the method of compression, while this application relates solely to the apparatus which, in addition to the apparatus disclosed in the co-pending application, can also be used for practicing the method of compressing fluids. The constant Mach number mode of compressing fluid is also outlined briefly in this specification in the introductory part to the chapter of this specification entitled "Centripetal Flow Compressor."

However, the co-pending application does not disclose centripetal compressors with the inner stators, which are disclosed here, and, therefore, the most efficient compressor, which is capable of producing maximum total pressure head and maximum static pressure head is the one disclosed in this application and operating at substantially constant Mach number, in accordance with the method outlined in application S.N. 514,001, now abandoned, and having the inner stator disclosed in the application. The inner stator, as mentioned previously, increases the efficiency of the last compression stage by increasing the total pressure head of this stage, in combination with the inner stator, by 30% to 50%, and the static pressure head by approximately 100% as compared to the same heads produced by the last compression stage having no inner stator.

It is one of the objects of this invention to provide novel dynamic radial flow machines, including centripetal flow compressors and centrifugal flow radial turbines, having higher energy conversion characteristics than the known machines.

It is an object of this invention to provide centripetal dynamic compressors having a plurality of contra-rotatable compression stages and one or more stationary vector-adjusting stages positioned between the compression stages.

It is also an object of this invention to provide dynamic centripetal compressors having a plurality of contra-rotatable compression stages, one set of compression stages, including the two outermost stages, being supported by a first rotor and another set of compression stages being supported by a second rotor, and also having a vector-adjusting stage positioned between the first and the second outer compression stages mounted on the first rotor.

Still another object of this invention is to provide a centripetal dynamic compressor having first and second rotors, each rotor having a plurality of compression stages, the innermost, last, compression stage of the compressor discharging into a stationary vector-adjusting and diffusing stage.

It is also an object of this invention to provide the centripetal compressor having first and second rotors rotatable in opposite directions and having a stationary vector-adjusting stage positioned between the outermost stage of the first rotor and the outermost stage of the second rotor.

Still another object of this invention is to provide a centripetal compressor having first and second rotors and two stationary vector-adjusting stages, the first outermost vector-adjusting stage being positioned between the first and second compression stages of the first rotor and the second vector-adjusting stage being positioned between the second stage of the first rotor and the outermost stage of the second rotor, the latter stage being the third stage in the compressor.

Still another object of this invention is to provide the centripetal compressor having first and second rotors and a plurality of stationary vector-adjusting stages positioned between the outermost compression stages of the first rotor, the remaining stages of the compressor being the stages of the first and second rotors interleaved with each other.

Yet another object of this invention is to provide radial centrifugal turbines having a stationary expansion stage, two contra-rotatable rotors and a stationary diffusion discharge stage, the two rotors being mounted on two concentric shafts in a cantilever manner with the stationary input duct of the turbine having a common longitudinal axis with such shafts, the turbine rotor stages being positioned between the stationary input stage and the stationary output diffusion stage.

It is also an additional object of this invention to provide a radial centrifugal flow gas turbine having a stationary expansion air-cooled input stage at the entry into the turbine and an air-cooled rotatable first turbine stage which follows said stationary expansion input stage.

Among the additional objects of this invention is the provision of a centrifugal flow radial turbine having a plurality of radial stages, the innermost stages of the turbine having parameters whereby the innermost stages are capable of producing overexpansion, or a very rapid expansion, of the working fluid for an equally rapid conversion of the potential energy of the fluid into high kinetic energy which is transmitted to the outermost stages for its conversion into mechanical work.

The novel features which are believed to be characteristic of the invention, both as to their organization and method of operation, together with further objects and advantages thereof, will be better understood from the following descripton considered in connection with the accompanying drawings in which several embodiments of the invention are illustrated by way of several examples. It is to be expressly understood however, that the drawings are for the purpose of illustration only and are not intended as a definition of the limits of the invention. Referring to the accompanying drawings, FIG. 1 is a vertical longitudinal sectional view of a centripetal flow compressor and of three shafts interconnected through a planetary gear system which is used for rotating the compressor.

FIGS. 1a and 1b are enlarged sectional diagrammatic views of two types of labyrinth seals that can be used in the structures of the disclosed invention.

FIGS. 1-c and 1-d are the vector diagrams for the innermost rotatable stage of a centripetal compressor without—FIG. 1-c— and with—FIG. 1-d— an inner stator following the last rotatable compression stage.

FIG. 2 is a vertical cross-section of two compressor or turbine shafts, each shaft being supported by a stationary frame.

FIGS. 3 and 4 are transverse sectional side-views of the planetary gears illustrated in FIG. 1, the sections being taken along the line 3—3 and 4—4, respectively, illustrated in FIG. 1.

FIG. 5 is a vertical transverse sectional view of the compressor illustrated in FIG. 1 taken along the line 5—5 illustrated in FIG. 1.

FIGS. 6, 8, 13, and 15 are vertical, longitudinal sectional views of compressors and gears taken along the longitudinal axes of the respective compressors.

FIGS. 7, 11, 11a, 14 and 16 are transverse vertical sectional views of the centripetal compressor rotors taken along the lines illustrated in FIGS. 6, 8, 13 and 15, respectively.

FIGS. 9 and 10 are transverse vertical sectional views of spur gears taken along the lines 9—9 and 10—10 illustrated in FIG. 8.

FIGS. 18, 18A, 20, 20A, and 20B are longitudinal sectional views of the radial centrifugal flow turbines.

FIG. 18B is a transverse vertical section of a planetary gear system illustrated in FIGS. 18, 18A, 20, and 20A.

Figure 20B:
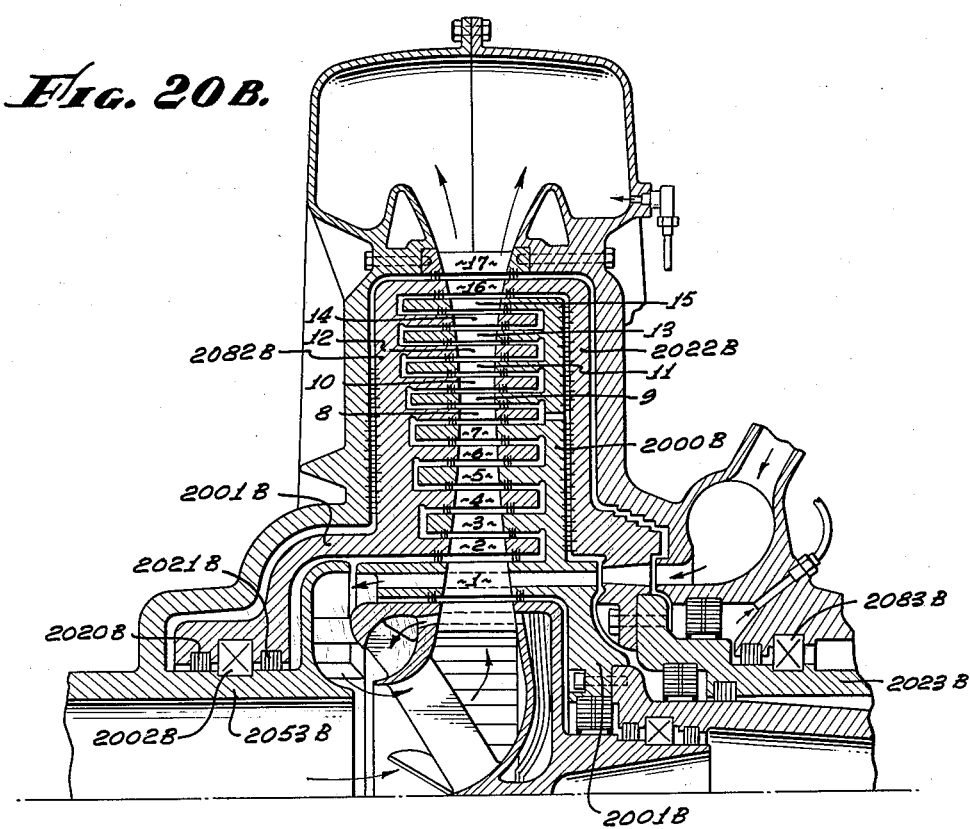
Figure 20C:
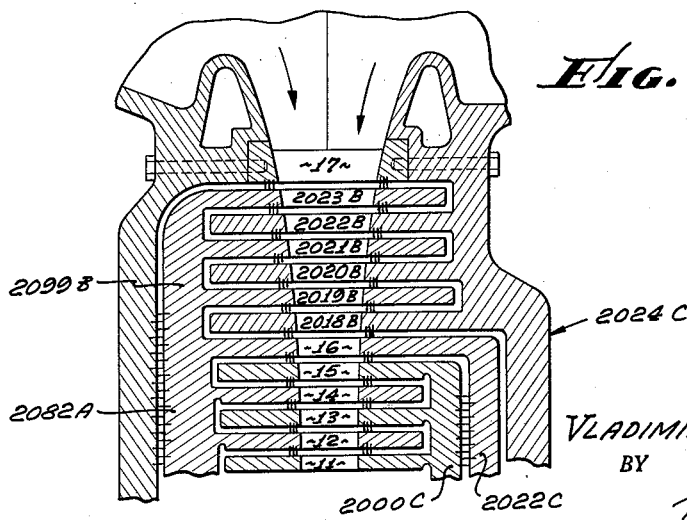

FIG. 20C is a vertical sectional view of a portion of a centripetal flow compressor utilizing the structure of the turbine disclosed in FIGS. 20A and 20B.

Figure 19:
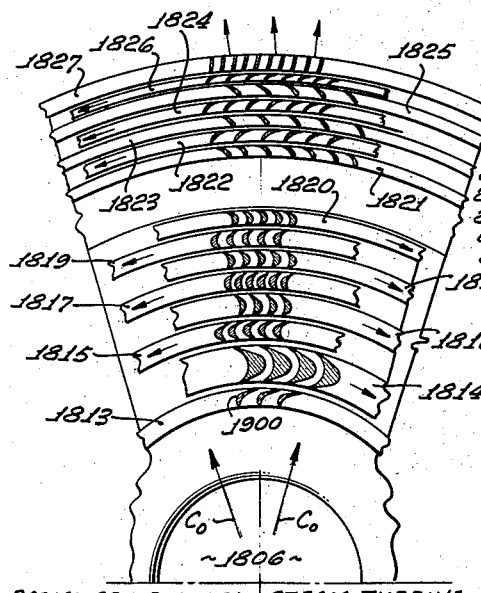
Figure 21:
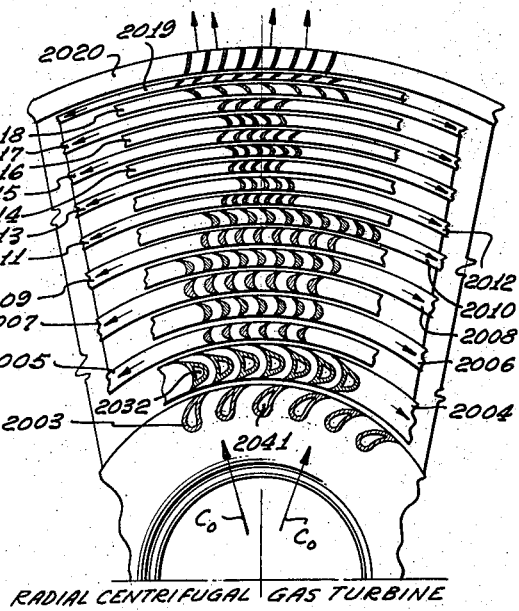

FIGS. 19 and 21 are transverse sectional views of the turbines illustrated in FIGS. 18 and 20, respectively.

Figure 22:
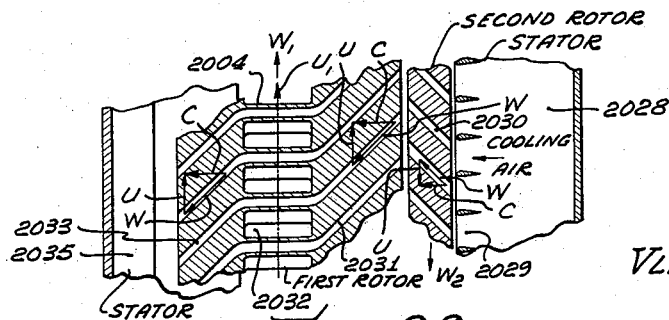

FIG. 22 is the sectional view of the air-cooled turbine stage taken along the line 22—22 illustrated in FIG. 20.

Figure 23A:
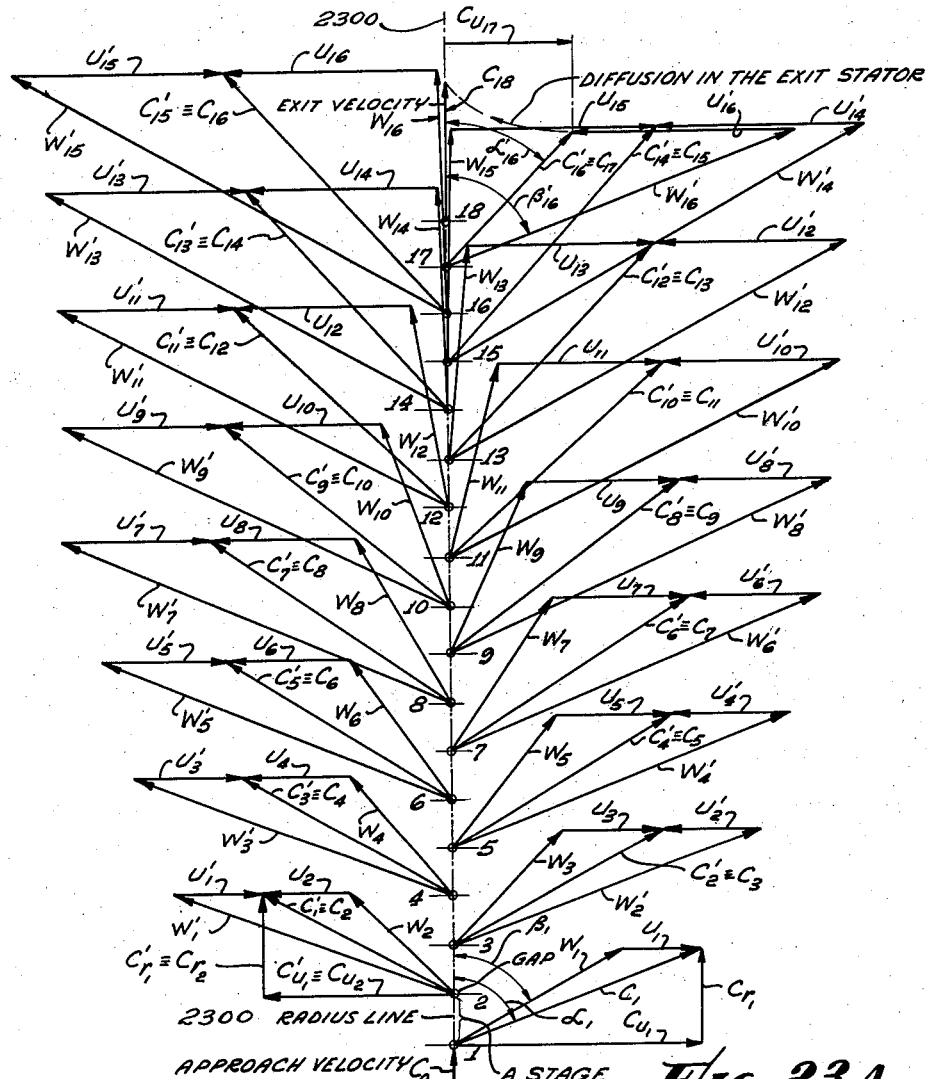
Figure 23:
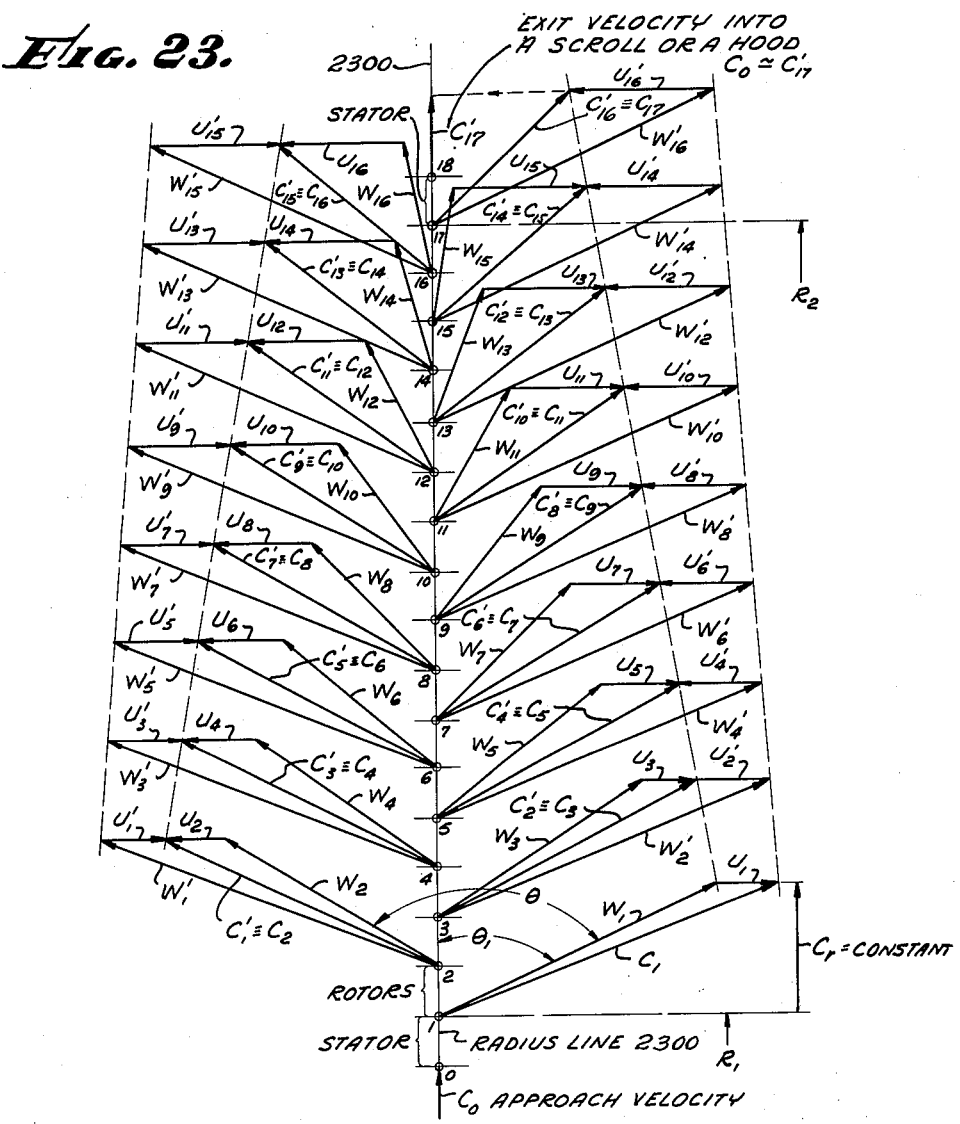

FIG. 23 is a preferred version of a velocity vector diagram for the centrifugal flow turbines constituting a part of this invention, this velocity vector diagram disclosing the operation of the centrifugal flow turbine with a constant local Mach number throughout the turbine.

FIG. 23A is another version of a velocity vector diagram for the disclosed centrifugal flow turbines in which the local Mach number is not constant, and therefore this velocity vector diagram represents no more than a feasible mode of operation of the disclosed turbines in accordance with the disclosed method but not the optimum mode of operating the rotor disclosed in FIG. 23.

Figure 24:
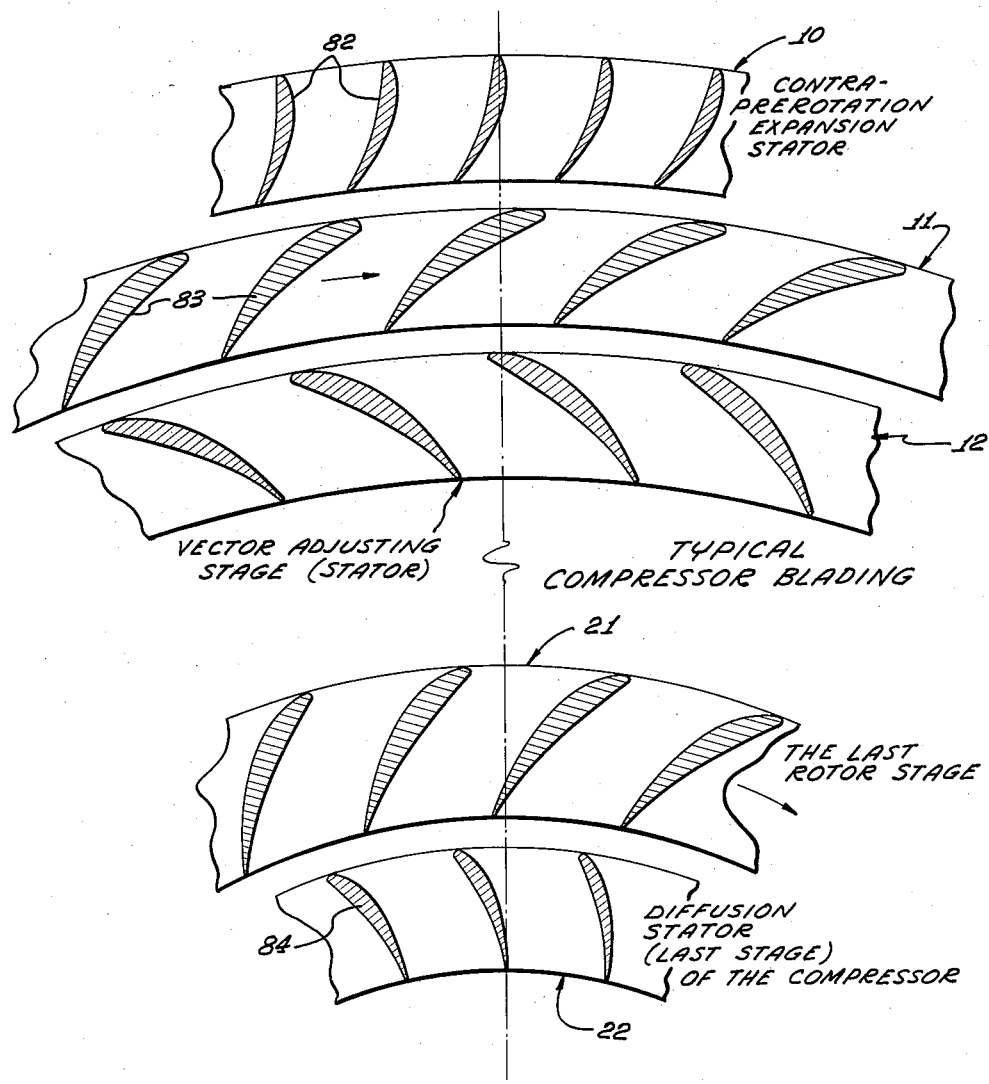

FIG. 24 is an enlarged cross-sectional view of a typical blading that would be suitable for use in the disclosed compressors. The figure illustrates an expansion stator which also may be called a stationary contra-prerotation stator stage which is followed by the first compression stage. The latter is followed by the vector-adjusting stage or the stator stage. The same figure also illustrates the last compression stage which is followed by the diffusion stator. The intermediate stages, i.e. the stages between the vector-adjusting stage and the last compression stage, are not illustrated in this figure.

Figure 25:
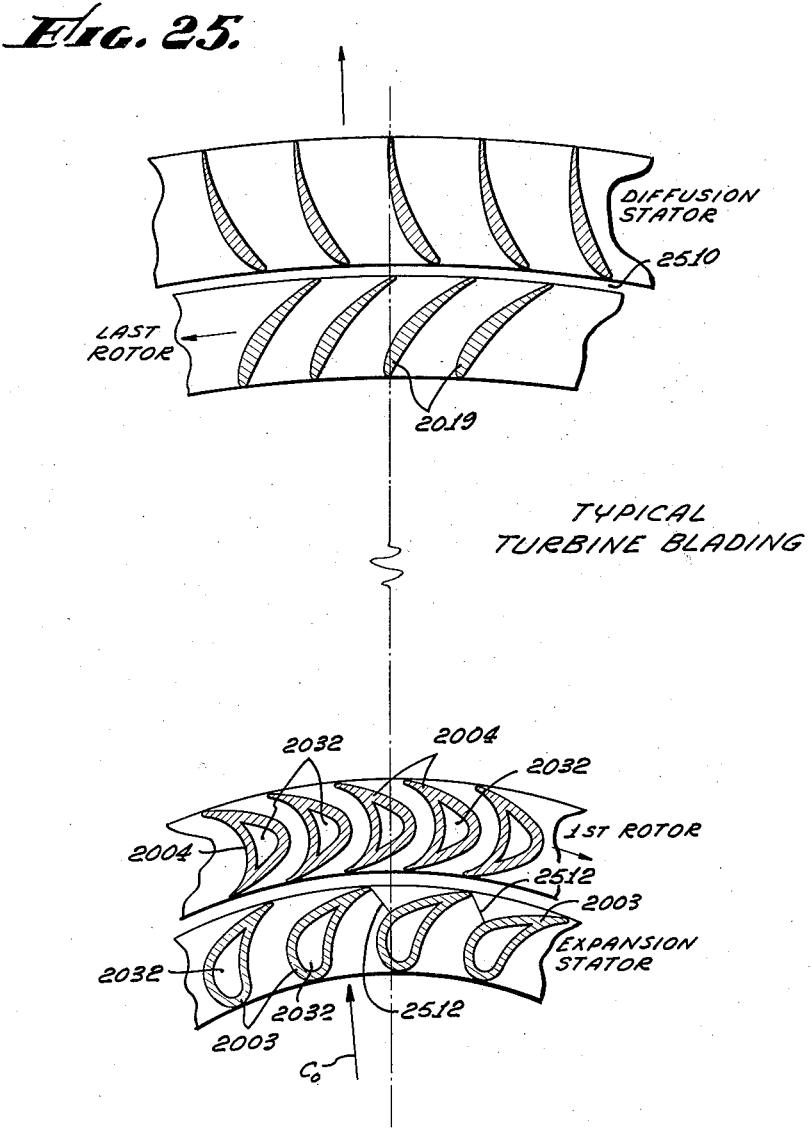

FIG. 25 illustrates a vertical transverse sectional view of a typical turbine blading including the expansion stator, the first turbine stage, the last turbine stage, and the diffusion stator. The intermediate turbine stages, which are between the first and the last turbine stages, are not illustrated in the figure.

FIG. 26 is the enthalpy-entropy diagram for the expansion stator of the disclosed turbines.

FIG. 27 is a vector diagram for a known impulse turbine.

FIG. 28 is a vector diagram for a known 50-50 reaction turbine.

Figure 29:
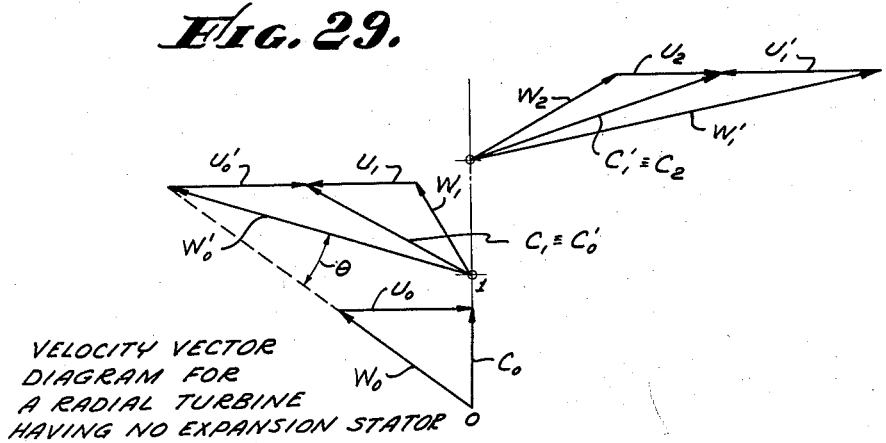

FIG. 29 is a typical velocity vector diagram for a radial flow contra-rotatable centrifugal turbine which does not use an expansion stator.

Figure 30:
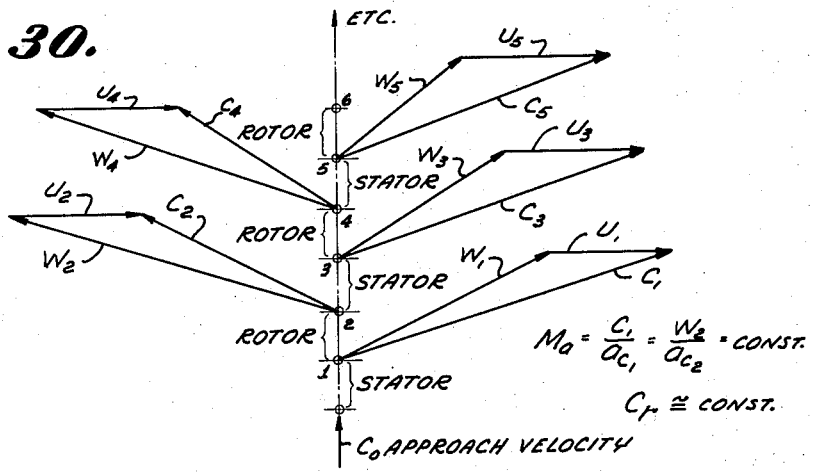

FIG. 30 is a typical velocity vector diagram for a single rotation turbine.

FIG. 31 is a vertical sectional view of a single rotation turbine.

FIGURE 32 is a series of performance curves for the radial, centrifugal flow reaction turbine in which the working fluid enters the turbine with high kinetic energy and in which the turbine stages have expansion channels adjusted to produce a constant local Mach number for the relative exit velocities.

From the above description of the figures it follows that FIGURES 1–17 relate to the centripetal compressors while FIGURES 18–23 relate to the centrifugal turbines. The description of the compressors will be given first and then will be followed with the description of the turbines.

It should be emphasized here that, as stated in the objects of the invention, the centripetal flow compressors and the centrifugal flow turbines have a large number of common mechanical features. For example, the two contra-rotatable rotors have identical type of mounting in the compressor structures as well as in the turbine structures, and it is also true of the input and output ducts. Additionally, the planetary gears or other types of gear systems which are used for interconnecting the two concentric shafts also are applicable to the compressors as well as the turbines. The type of shaft mounting in the bearings is also applicable to the compressors as well as the turbines. Accordingly, it should be understood by those reading the description of this invention that although some of the structures will be described only in connection with the compressors, they have an equal applicability in the radial centrifugal flow turbines. Therefore, the only reason why such a description is given either with one type of machine or another is for saving the repetition of the description.

The description of the compressors is given immediately below under the general heading of "Centripetal Flow Compressors" and the description of the turbines is given under the heading of "Radial Centrifugal Flow Turbine" which follows the description of the compressors.

*Centripetal Flow Compressors*

Before proceeding with the description of the several versions of the centripetal compressors constituting a part of this invention it would be helpful to describe these versions of the compressors in a brief manner for facilitating the understanding of the more detailed description that will follow.

(1) In FIGS. 1–5 a vector adjusting stage 12 is positioned between the first compression stage 11 and the second compression stage 13. Stage 11 is mounted on a first rotor 24 while stage 13 is mounted on a second rotor 26. Therefore, this compressor has one vector-adjusting stage positioned between two contra-rotating compression stages, the first stage being mounted on one rotor rotated in one direction and the second stage being mounted on the second rotor rotated in the opposite direction.

(2) In FIGS. 6–12 a single vector-adjusting stage is placed between two co-rotating compression stages mounted on the same rotor.

Figures 13, 17:
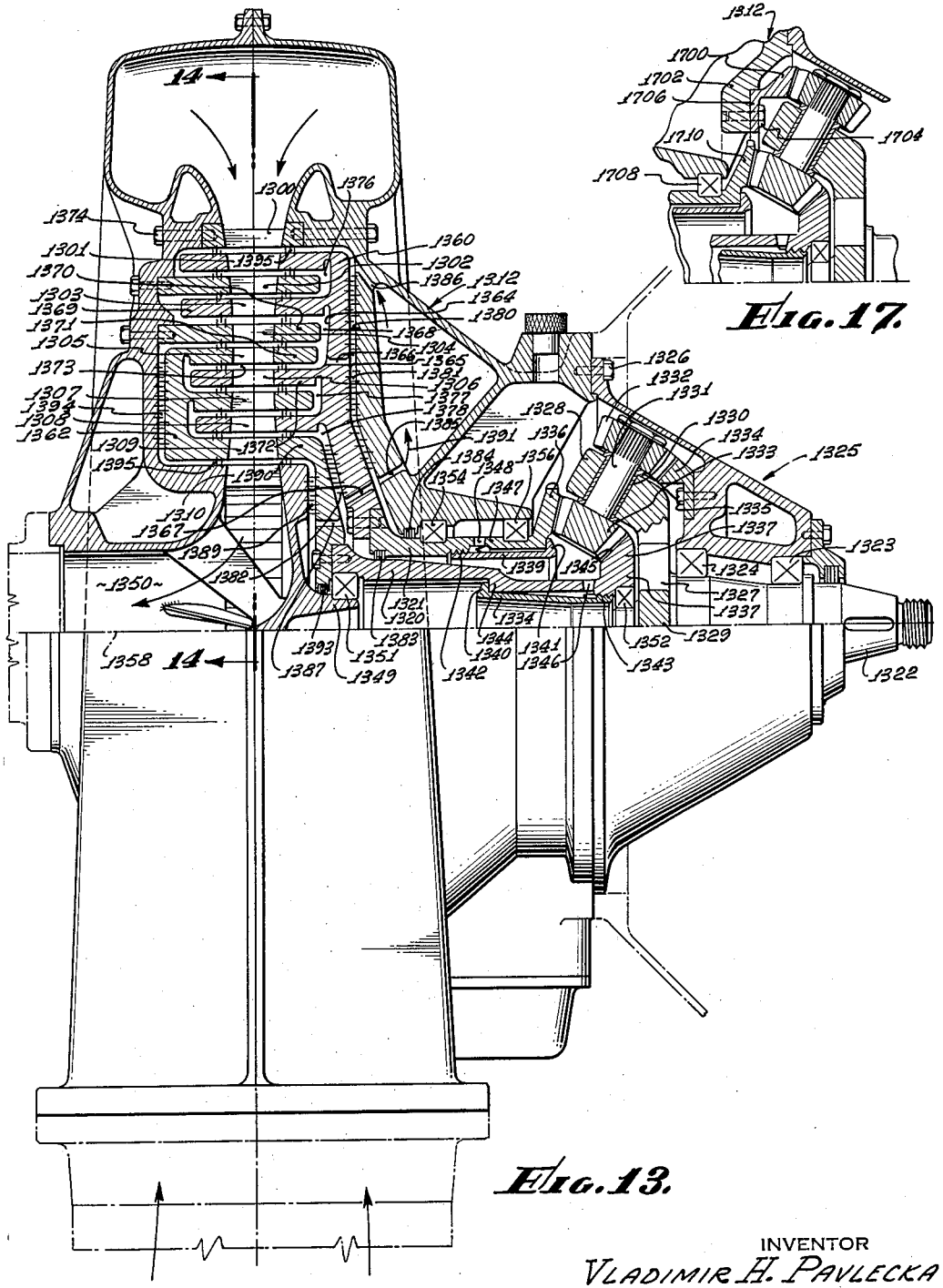
FIG. 17 is a sectional view of an alternative form of planetary gears suitable for inter-connecting two contra-rotatable shafts.
Figure 14:
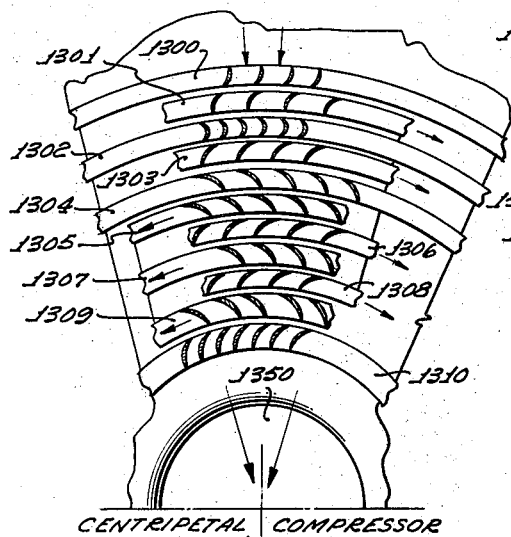

(3) In FIGS. 13 and 14 there are two vector-adjusting stages, the first vector-adjusting stage is placed between two co-rotating compression stages and the second vector-adjusting stage is placed between two contra-rotating compression stages.

Figure 16:
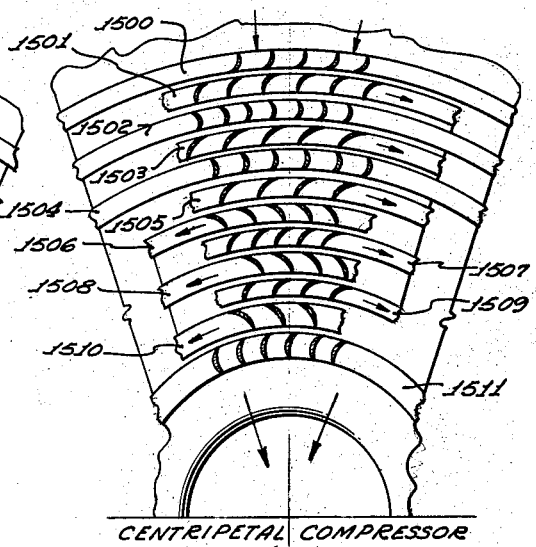

(4) In FIGS. 15 and 16 there are two vector-adjusting stages both of which are placed between two co-rotating stages mounted on the same rotor.

In all cases, the first and second rotors of the compressor are rotatable in opposite directions, either at equal or unequal angular velocities.

In all cases, the compressor rotors may be rotated from a single power shaft or from two concentric power shafts in the manner illustrated in FIG. 2.

The co-pending application for patent Serial No. 514,001 entitled "Methods of Compressing Fluids With Centripetal Compressors" filed on June 8, 1955, now abandoned and replaced by continuation application Serial No. 12,479, now U.S. Patent No. 3,040,971, discloses and claims several methods of centripetally compressing fluids. The methods disclosed in the above application may be summarized briefly by stating that higher compression ratios or higher total mechanical heads are obtained by rotating the first and the second rotors of the compressor at high peripheral velocities and distributing the energy conversions among the stages in accordance with the abilities of these stages to produce and to convert the kinetic energies reaching them from the preceding stages. Vector diagrams are given for practicing these methods and it is indicated in the course of the discussion of these vector diagrams that the relative flow velocities for the fluid being compressed, such as $W_1$, $W_3$, $W_5$, etc., are made sufficiently large so as to have a constant Mach number, either throughout the compressor or through the greater part of the compression stages of the compressor.

The methods and the vector diagrams disclosed in the above application are also applicable to the compressors disclosed in this case and therefore these vector diagrams and description of the methods of compressing fluid will not be given here, but the above application is hereby incorporated by reference into this disclosure and is made a part of this disclosure. Accordingly, the description given here will be limited to the description of the mechanical structures rather than the methods.

In light of the above discussion, it follows that the vector-adjusting stage is used in the centripetal flow compressor for obtaining a substantially constant Mach number operation of the centripetal flow compressor, with the concomitant gain in the total head produced by such compressor.

*Centripetal Compressor With a Single Stationary Vector-Adjusting Stage Positioned Between Two Contra-Rotating Compression Stages*

Figure 1:
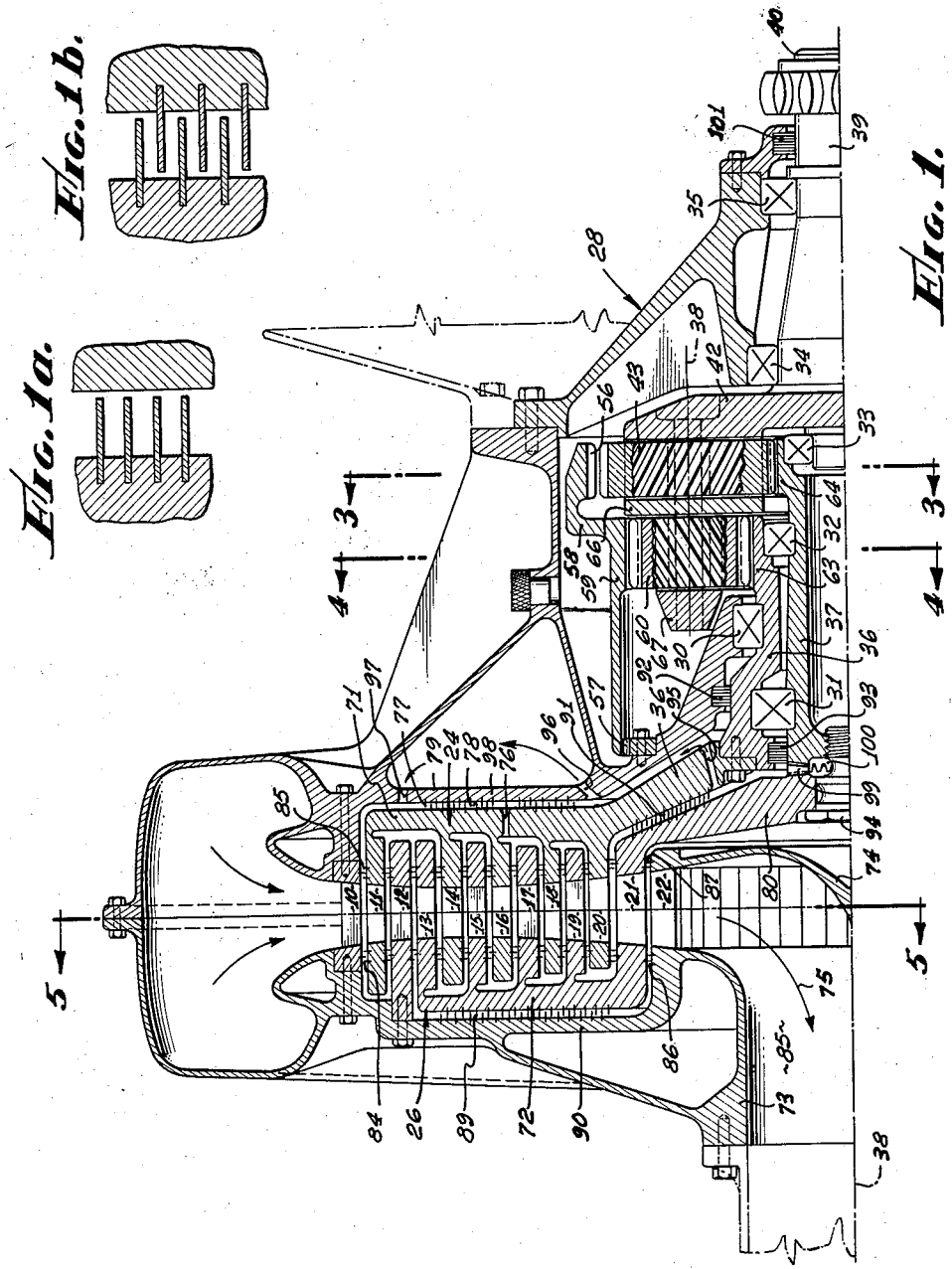

Referring to FIGS. 1–5 and more particularly to FIG. 1, the two rotors 24 and 26 of the compressor and the driving shaft 39 of the compressor are supported by means of six bearings in a stationary frame 28 of the compressor. The six bearings are bearings 30, 31, 32, 33, 34 and 35. These bearings, which may be either plain or anti-friction bearings, support the following concentrically aligned rotatable elements: Rotors 24 and 26 and shafts 36, 37 and 39. The first rotor 24 of the compressor which is mounted on an outer shaft 36 supported by the three bearings 30, 31 and 32. Bearing 30 is mounted between shaft 36 and frame 28 while bearings 31 and 32 are mounted between the outer shaft 36 and the inner shaft 37 which is concentric with shaft 36. Both shafts rotate around the longitudinal axis 38 of the entire structure. The inner shaft 37 is supported in a concentrically aligned relationship with the outer shaft 36 by means of bearings 30, 31, 32 and 33.

Figure 3:
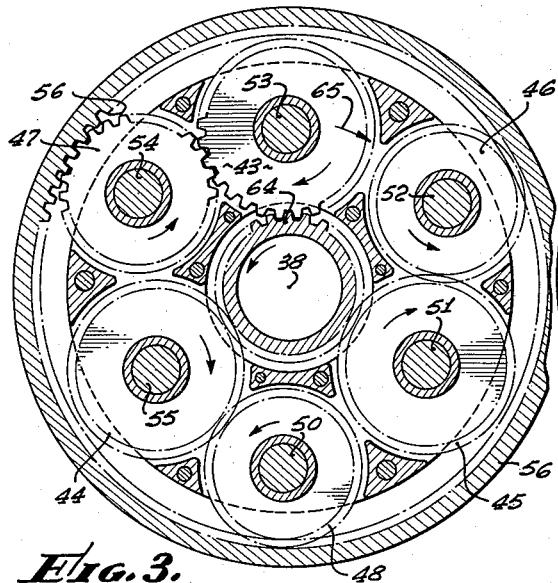

Bearings 34 and 35 are used for supporting a drive shaft 39, the outer end 40 of which is connected to some suitable source of power such as gas or steam turbine, or some other prime mover such as geared electric motor. The power furnished by the prime mover through shaft 39 is transmitted to the compressor rotors in the following manner: shaft 39 is connected to a disc 42 and a ring 66. Six planetary gears 43–48 are rotatively supported by means of journals or shafts 50–55 mounted on disc 42, as illustrated in FIG. 3. Since shafts 50–55 may also be regarded as pins rigidly connected to disc 42 and ring 66, and, in this sense, are integral parts of ring 66, disc 42 and shaft 39, it follows that these pins 50–55 rotate with disc 42 and shaft 39. Therefore, these pins also rotate all of the planetary gears 43–48 around the axis 38. The first set of the planetary gears, which includes the planetary gears 46, 47 and 48, is geared to the ring gear 56 which is mounted on frame 28 by means of a floating ring gear spline 57 which supports ring gear 56 in a non-rotative relationship with respect to frame 28.

Since ring gear 56 is mounted on, or is supported by, a circumferential floating ring 58, connecting ring gear 56 to the floating gear spline 57, and ring 58 is also used for supporting a second ring gear 59, it becomes necessary to devise some self-aligning and self-adjusting pivotal or floating connection between frame 28 and ring 58 which supports the two ring gears 56 and 59. Without such floating connections the entire planetary gear transmission becomes noisy and wears out quicker than with the floating self- aligning connection at 57. No further detailed description of the flexible coupling 57 is deemed necessary in this specification because such flexible, self-aligning couplings or joints are known to the art and do not constitute a part of this invention.

Figure 4:
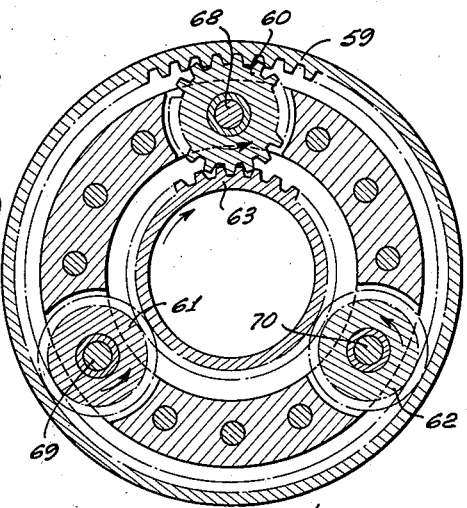

Ring gear 59 meshes with a set of planetary gears 60–62, the side view of which is illustrated in FIG. 4. These planetary gears engage a sun gear 63 which is keyed to the outer shaft 36. Only three planetary gears 60–62 are illustrated in FIG. 4, but it is known in the planetary gear art that a larger number of such planetary gears will produce a better result than the absolute minimum of the three gears illustrated here. These planetary gears 60–62 are mounted on pins 68, 69 and 70, FIG. 4; these pins are rotated around axis 38 by shaft 39, and therefore they rotate shaft 36 in the same direction as that of shaft 39.

Reverting back to the first planetary gear system, it has been already stated that it includes the ring gear 56 and the first set of the planetary gears, including gears 47, 48 and 46. This first planetary gear system also includes the second set of the planetary gears which includes gears 43, 44 and 45 which are geared to a sun gear 64. The sun gear 64 is permanently keyed to the inner shaft 37.

The transmission of power from shaft 39 to the contra-rotating compressor rotors 26 and 24 is as follows: Shaft 39 carries with it the first and second set of the planetary gears in the first planetary gear system and the planetary gears 60, 61 and 62 of the second planetary gear system. If it is assumed that shaft 39, disc 42 and ring 66 revolve in a clockwise direction as viewed in FIG. 3 (see arrow 65), the first set of the planetary gears 46, 47 and 48 will revolve around the ring gear 56 in the counter-clockwise direction; rotation of the first set of the planetary gears 46, 47 and 48 in the counter-clockwise direction will rotate the second set of planetary gears, i.e., gears 43, 44 and 45 in the clockwise direction, which in turn will rotate the sun gear 64 in the counter-clockwise direction (see FIG. 3). In other words, the first planetary system is provided with the rotation-reversing gears 43, 44 and 45. This counter-clockwise rotation of the sun gear 64 will produce a counter-clockwise rotation of the inner shaft 37. Accordingly, shaft 37 will rotate in the opposite direction to the direction of rotation of shaft 39. The angular velocity of shaft 37 will be higher than the angular velocity of shaft 39, the ratio of the two velocities being a function of the ratio of the gear diameters within the two planetary gear systems.

Accordingly, while rotor 24 of the centripetal compressor will rotate clockwise, the second rotor 26 will rotate counter-clockwise, Therefore, the two compressor rotors rotate at two different and opposite angular velocities, the angular velocity of rotor 24 being lower than the angular velocity of rotor 26. These angular velocities are adjusted so as to produce any desired peripheral velocity $U_1$ for the outer compression stage 11 mounted on the first rotor 24 and an equal peripheral velocity $U_3$ for the outermost stage 13 mounted on the second rotor 26. In general, these two velocities are made equal for producing substantially the same amounts of kinetic energy by the outermost stages of the two rotors; in this case stage 13 is the second stage of the compressor. This is explained more fully in the previously mentioned application Serial No. 514,001, now abandoned. In terms of stage parameters, it enables one to operate a larger number of stages at constant local Mach numbers.

Reverting once more to the description of the two rotors and two sets of compression stages mounted on these rotors, it already has been stated that the first rotor 24 has a side disc 71 which is used for rotating and mechanically supporting the first stage 11, the third stage 14, the fifth stage 16, the seventh stage 18 and the ninth stage 20. In other words, disc 71 supports all odd-numbered stages, while disc 72 of the second rotor 26 supports all even numbered stages which are stages 13, 15, 17, 19 and 21.

It is to be noted that what is meant here by the odd and even-numbered stages is that the stages which have odd and even-numbered consecutive positions within the compressor, beginning with the first odd-numbered stage 11 and the first even-numbered stage 13, since stage 13 is the second compression stage in the compressor. Accordingly, the odd-numbered stages are the first compression stage which is then followed by the third, fifth, seventh, etc., compression stages. The even-numbered stages, the second, fourth and sixth, etc., are generally interleaved with the odd-numbered stages in the manner illustrated in FIG. 1. As also illustrated in the same figure, a stationary vector-adjusting stage 12 is interposed between the first and the second stages of the compressor, which are stages 11 and 13 respectively.

The compressor illustrated in FIG. 1 therefore has ten contra-rotatable compression stages and one vector-adjusting stage 12 positioned between two contra-rotating stages 11 and 13. The compressor is also provided with the stationary contra-prerotation stage 10 at the entry into the compressor and an exit stator stage 22 which is supported by frame 28 and more particularly by the inner wall 73—74 of the stationary duct which conveys the compressed air in an axial direction illustrated by an arrow 75 in FIG. 1.

Disc 71 of the first rotor 24 of the compressor is provided with several peripherally located orifices 76 which are used for conveying compressed fluid from the exit of compression stage 15 to a labyrinth seal 77 placed between the outer surface of rotor 71 and the inner wall 78 of the frame member 79. These orifices, by conveying compressed fluid into the labyrinth seal, equalize fluid pressures on both sides of disc 77. When such equilibrium is reached then the compressed fluid does not exert any side thrust on shaft 36'. This elimination of the side-thrust is obviously desirable for eliminating a parasitic side-thrust on all the bearings of the compressor. Accordingly, the radial position of the orifices 76 on disc 71 and the number of such orifices are selected so as to make the two pressures exerted by the fluid on disc 71 equal. No orifices are indicated in disc 72 of the second rotor because pressure equalization on the two sides of disc 72 is obtained here by allowing sufficient amount of leakage for this purpose from the output of the last compression stage 21.

All compression stages and vector-adjusting stages are provided with the labyrinth seals 84, 85, 86, 87, etc., and a labyrinth seal 89 is provided between the upper side-disc 72 of the second rotor and the adjacent wall 90 of the rotor housing. A labyrinth seal 91 is also provided between the rotor discs 36 and 80 to prevent any leakage of compressed air through the gap between the two rotor discs 36 and 80 and through the gap existing between the shafts 37 and 36'. Bearings 31, 30, and 32 are further isolated from the fluid under compression by means of high pressure seals 92 and 93. Bearing 33 is also protected from such fluid by means of a threaded plug 94 inserted at the left end of the inner shaft 37. The side disc 36 is also provided with a plurality of orifices 95, and orifices 96 and 97 are also provided in the side wall 98 of the rotor housing. Accordingly, all fluid that leaks through the labyrinth seal 96 is conveyed back into the compressor through the orifices 95, 96 and 97 and then to the first compression stage 11 after passing through the labyrinth seal 85. The inner side-disc 80 of the second rotor is connected to the inner shaft 37 by means of a plurality of gear teeth 99 which enmesh the corresponding gears 100 at the inner end of the inner shaft 37. The tooth joint 99—100 is held in tight engagement by the threaded end-plug or stud 94. A high pressure seal 101 is also provided at the outer end of shaft 39 for preventing any leakage of lubricant which may be used for lubricating the planetary gear system.

It should be noted that the second rotor, including the side disc 72 and the even numbered compression stages 13, 15, 17, 19, and 21, is supported by disc 80 through the blades of the last compression stage 21. Since this stage is the stage having the smallest diameter, it is obvious that, from a purely mechanical point of view, this stage is not as strong as any of the preceding stages of the larger diameter; thus, for example, the outermost stage 11 has a larger number of blades than the stage 21, and therefore would be capable of supporting a greater weight than stage 21. In order to impart a greater strength to stage 21, its blades are made with longer chords, thus increasing ther strength. A different mode of suspending stages, not from the innermost stages, such as stage 21 in FIG. 1 but from the outermost stages, such as stage 13 in FIG. 1, will be described later in connection with FIG. 8.

In the light of the description of the compressor given thus far, it follows that the vector-adjusting stage 12 is placed between two contra-rotating stages 11 and 13, stage 11 being the outermost stage of the first rotor 24 while stage 13 is the outermost stage of the second rotor 26. Since the two rotors revolve in the opposite directions, the vector-adjusting stage is positioned between the two contra-rotating outermost stages of the two rotors. As explained more fully in the aforementioned Patent No. 3,040,971 and in co-pending application for patent Serial No. 514,001, entitled "Methods of Compressing Fluids With Centripetal Compressors" filed on June 8, 1955, now abandoned, it becomes necessary to have a vector-adjusting stage in order to avoid the creation of the supersonic mode of operation or compression within the second stage 13. It is the introduction of the vector-adjusting stage 12 that permits the generation of very large kinetic energies within the outermost stages, such as stages 11 and 13, and transmitting these large kinetic energies to the inner stages, such as stages 15, 16, 17, 18, 19, 20 and 21, where they are converted into the pressure or potential energy. For a more detailed description of these methods of compressing fluids the reader is referred to the above mentioned co-pending application where such methods are discussed at great length. It should be mentioned here, however, that application S.N. 514,001, now abandoned, does not disclose the novel mechanical configurations of the compressors disclosed in this application. Therefore, for example, the inner stator 22 is illustrated in all the figures of this application, while there is no such inner stator in application S.N. 514,001, now abandoned. Accordingly, a total pressure head and static pressure head obtainable with the compressors disclosed in this application will be higher than those obtainable with the compressors disclosed in application S.N. 514,001, now abandoned. The reasons for this higher head have been already outlined in the introductory part of the specification. They may be repeated here as follows: the turning angle $\theta$ of the last compression stage can be increased to the very limit of feasibility (this limit is determined by the mechanics of flow, such as continuity of flow, lack of separations, discontinuities, etc.) which at once produces a greater kinetic energy and a greater change in momentum of the fluid through the stage. This is due to the fact that the angle $B_n$, see FIG. 1–d, between the radial line, or the radius line, and the relative exit velocity $W_n$ at the exit of the last stage becomes smaller as the turning angle $\theta$ of the last compresison stage is made greater with the result that the magnitude of the absolute exit velocity $C_n$ at the exit from the last rotatable stage becomes larger. This greater $C_n$ is converted into greater pressure in the inner stator. The stator also converts a large swirl velocity, present in this case, also into pressure, thus increasing the total head still further. The peripheral momentum of the last rotor stage, without the stator following the last rotor stage, is the vector $(C_{n-1})U$ in FIG. 1–c. The peripheral momentum of the last rotor stage which is followed by a stator stage, is $$[(C_{n-1})U + (C_n)U]$$

or, roughly, about twice as large as the one in FIG. 1–c. This increase in the peripheral momentum does not affect the absolute outflow velocities such as $C_n$ and $C_{n+1}$, FIG. 1–d, irrespective of whether there is or is no inner stator. The peripheral momentum, therefore, is the measure of energy conversion in a stage. The radially directed momentum, which is a function of the radial velocity $C_{r_n}$, is the measure of the kinetic energy of the flow. When the last stage in the compressor is a stator, such stator allows a considerable increase in the peripheral momentum and, therefore, a corresponding increase in the energy conversion of the preceding rotor stage. Accordingly, the combination of the inner stator 22 and of the innermost rotatable stage 20 produces a total pressure head which is from 30% to 50% greater and a static pressure head approximately 100% greater than the last innermost compression stage 20 can produce alone, without the aid of the inner stator. The change in the momentum because of the increase in the turning angle of the stage is primarily responsible for the higher energy conversion factor of the innermost compression stage. As mentioned previously, such increase in $\theta$ is impossible without the inner stator.

Figure 5:
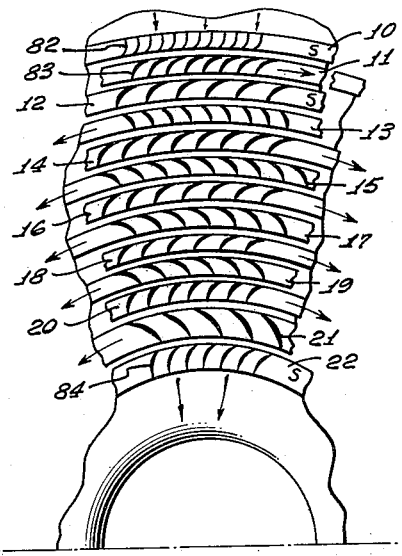

The cross-sectional view of the compression stages, taken along line 5—5 shown in FIG. 1, is illustrated in FIGS. 5 and 24. The latter illustrates the cross-sectional view of a typical blading suitable for the use in the disclosed compressors. The airfoils may be either the Joukovsky's airfoils, the approximation of the Joukovsky's airfoils, or the NACA (National Advisory Council for Aeronautics) compressor airfoils. The stationary contra-prerotation stage 10 has a plurality of cambered airfoils 82 followed by airfoils 83 in the first compression stage 11. The vector-adjusting stage 12 acts as a stationary contra-prerotation stage with respect to the compression stage 13 and the remaining compression stages have geometrical turning angles producing asymmetric vector diagrams. The asymmetry becomes especially pronounced when $U_3$ is made equal to $U_1$, $U_1$ and $U_3$ being the peripheral velocities of the first and second compression stages. The stage parameters are discussed in Patent No. 3,040,971 and in the application Serial No. 514,001, now abandoned, and need not be repeated here. It should be stated here, however, that the geometry of the compression stages and the magnitude of the geometrical turning angles is selected from stage to stage so as to produce constant Mach number in all the stages, if possible. As to the vector-adjusting stages, their turning angle is selected also to produce a constant Mach number in the next stage. The exit stator 22 has a pluraltiy of airfoils 84 which are used for diffusing fluid reaching it from the last compression stage 21 and for directing it through the stationary output duct 85.

The operation of the compresosr will be described only briefly and for a more detailed description of the vectorial relationship and stage parameters, reference is made once more to the previously mentioned co-pending application. The first compression stage, which is the outermost stage 11 is rotated at the peripheral velocity of the order of 1000 feet per second, which is the maximum velocity that can be obtained wtih the presently availablbe metallic alloys. The vector-adjusting stage 12 is used for conveying the accelerated fluid from the exit of the first stage to the entry into the second stage without exceeding the local Mach number, $M_{w_3}$, at the entry into the second stage. As described in the co-pending application Serial No. 514,001, now abandoned, introduction of the vector-adjusting stage 12 produces mechanical head gains which are two or three times higher than the mechanical heads obtainable with a centripetal compressor which utilizes a symmetric vector diagram such as that disclosed in the co-pending application patent Serial No. 179,028, filed August 12, 1950, now U.S. patent Serial No. 2,712,895, issued July 12, 1955, entitled Centripetal Subsonic Compressor, by the same inventor.

While application Serial No. 179,028, as well as application Serial No. 514,001, now abandoned, disclose compressors which discharge into hollow shafts, and are driven by means of two shafts pointing in the opposite directions, it is to be understood that the compressors with the vector-adjusting stages can be used with any type of shaft structure. The use of two independent shafts for this type of compressor is illustrated in FIG. 2.

The advantage of the structure disclosed in FIG. 1, and other figures in this case wherever a single external drive-shaft is used, resides in the fact that it permits a contra-rotation of the two rotors of the compressor from one external power shaft such as shaft 39 requiring only one prime mover. The additional advantage of the disclosed structure also resides in the fact that it also permits a discharge of compressed fluid through an outgoing centrally located stationary output duct 85, which is quite desirable in many applications or uses of dynamic compressors. A compressor of this structure also has its applications in the field of gas turbine power plants whenever it becomes desirable to separate physically the compressor from the combustion chamber for inserting a heat exchanger between the compressor and the combustion chamber. The simplicity of driving the two contra-rotatable rotors of the compressor from one power shaft is quite obvious. The obtained conveniences and compactness of the over-all structure, disclosed in this application, is obtained by introducing two planetary gear systems. However, such planetary gear systems have been in use now for some time and do not represent an especially high cost item because of the relatively small diameter of the gears that go into the makeup of such planetary gear systems.

Another advantage, which now becomes attainable, is to have a stationary exit stator stage 22 which permits the last stage in the compressors, which is stage 21, to contribute its share of kinetic energy to the fluid being compressed. This fluid then is diffused in a stator stage 22. This obviously increases the total mechanical head obtained from the compressor, because the last stage 21 now is capable of contributing more to this gain in the mechanical head than before by transmitting the generated kinetic energy to stator 22 where it is diffused and converted into pressure. Without the stator stage 22, the last compression stage 21 would have to perform the function performed by stator stage 22, with the concomitant loss in the kinetic energy that can be otherwise produced or generated by this stage.

As disclosed in the earlier application Serial No. 179,028, now Patent No. 2,712,895 the stationary contra-prerotation stage 10 is used for facilitating the entry of the fluid into the first compression stage 11 and for imparting to it a large entry velocity $C_1$ which, when vectorially combined with the peripheral velocity $U_1$ of the outer rim of the first compression stage, produces a relative entry velocity $W_1$ which coincides with the median flow-line of the first stage flow channels. The stationary contra-prerotation stage 10, in a sense, rams fluid into the first compression stage at the point of its entry into that stage.

The outstanding features of the disclosed compressor may be summarized as follows: a high compression ratio or high total mechanical head per pound of dead weight and per stage because of the use of vector-adjusting stages and the concomitant possibility of obtaining a constant Mach number operation throughout the compressor or at least through the greater part of the compressor; ability to attain high compression ratios with an extremely compact, small and inexpensive structure since all blading in the compressor is strictly "straight" blading; the use of stationary flanges on the input side, stationary flanges on the output side and venting of the labyrinth seals to the input side of the compressor which, in combination, produce gas tight sealing of the entire compressor; a single prime mover which nevertheless produces a highly advantageous contra-rotation of the compression stages; utilization of even the last stage of the compressor as a purely compression stage because of the presence of the exit stator which is used as a diffuser.

FIG. 2 discloses a sectional view of the compressor where two shafts 200 and 202 are independent of each other, in a sense that they are not geared to each other in the manner shafts 37 and 36 are geared to each other through the planetary gear system in FIG. 1. In this case, shafts 200 and 202 terminate in splines 201 and 203; shaft 202 is supported by means of two bearings 204 and 205 which in turn are supported by an extension 206 of duct 85 and duct walls 73 and 74; the duct walls 73 and 74 are supported by the frame 23; the second rotor 24 is now supported by means of bearings 208 and 209 which in turn are supported by frame 28. This construction of the compressor requires interposition of the labyrinth seal 210 and, if so desired, of an additional liquid seal 212. Seals of this type are well-known in the art and need no detailed description here.

The planetary gear systems disclosed in this application can all be used for interconnecting the shafts 200 and 202 in FIG. 2 for obtaining contra-rotation from a single prime mover. The advantage of FIG. 2 resides in the fact that all bearings are "single rotation" bearings (stationary frame on one side and shaft on the other side of the bearing). In FIG. 1, bearings 31, 32 and 33 are all contra-rotating bearings which doubles their rotational speeds. This is a disadvantage at the speeds under consideration.

The rotor structure of the compressor is identical to that illustrated in FIG. 1, or the subsequent figures, and therefore, needs no additional description.

The turbomachine disclosed in FIG. 1 can be used also as a centrifugal flow turbine if the vector-adjusting stage 12 is eliminated. From the description of the turbines that will follow, and especially from the description of the vector diagram illustrated in FIG. 23, it will become apparent that no useful purpose would be served by the introduction of any vector-adjusting stage or stages at any point in the centrifugal flow turbine. It should be understood that the turbine blading will have to be of the type which is suitable for expanding the working fluid. Such blading is illustrated in FIGS. 19, 21 and 25.

*Centrapetal Compressor With a Single Vector-Adjusting Stage Positioned Between Two Co-Rotating Compression Stages*

Figure 7:
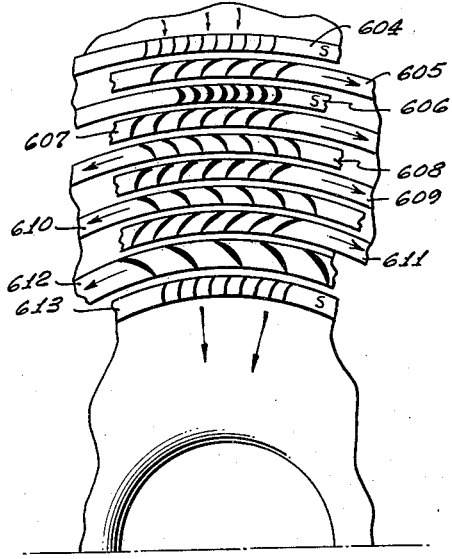

FIGS. 6 and 7 illustrate a compressor, quite similar to that illustrated in FIG. 1, and, therefore, its description can be completed quite readily by merely pointing out the differences between what is disclosed in FIGS. 1–5 and what is illustrated in FIGS. 6 and 7. Shaft 675 in FIG. 6 corresponds to shaft 39 in FIG. 1; the planetary gear system 600 is identical to that illustrated in FIGS. 1, 3 and 4; a similar main frame structure 678 is used in both FIG. 1 as well as FIG. 6. There is a difference in the rotors of the compressor and the suspension of the rotors. The compressor has two rotors 602 and 603; each rotor has a side-disc, such as side-discs 680 and 643. The compression stages are distributed as follows: fluid to be compressed enters a stationary contra-prerotation stage 604 and then its path is as follows: the first compression stage 605, a vector-adjusting stage 606, the second compression stage 607 (which is now a part of the first rotor 602 and therefore is mounted on the side-disc 643), the third stage 608 (which is the outermost stage of the second rotor 603, mounted on the side-disc 680) and then the compression stages 609, 610, 611 and 612, the stages of the first rotor interleaving the stages of the second rotor. The last compression stage 612, which is the seventh compression stage, is followed by the exit stator diffuser stage 613 corresponding to the diffuser stage 22 in FIG. 1. The main difference between the compressor illustrated in FIG. 6 and that illustrated in FIG. 1, resides in the fact that the second stage 607 now is a part of the first rotor 602 and the third compression stage 608 is now a part of the second rotor. Accordingly, while in FIG. 1 the vector-adjusting stage 12 is positioned between the two contra-rotating compression stages 11 and 13, in FIG. 6 the vector-adjusting stage 606 is positioned between the two co-rotating compression stages 605 and 607, since the stages 605 and 607 are both mounted on the first rotor 602.

As described more fully in the previously identical application Serial No. 514,001, now abandoned, the advantage of such stage order resides in the extension of the constant Mach number through the greater part of the compressor because a high peripheral velocity is obtained at a relatively small diameter compression stage 608, the diameter of stage 608 being smaller than the diameter of stage 13. It is assumed here that the compressors in FIGS. 1 and 6 have equal outside diameters.

It should be noted here that the planetary gear system 600 is very well-suited to give any desired angular velocity ratio between shafts 675 and 676. Therefore, it is a simple matter to obtain equal peripheral velocities for stage 605 and stage 608, which is necessary if one is to have a substantially constant Mach number through the greater part of the compression stages.

The shaft suspension illustrated in FIG. 6 is more advantageous than that illustrated in FIG. 1. Only two bearings 660 and 662 are used for mounting shaft 675 and the first rotor 602 of the compressor. In providing bearings 699 and 662, it is necessary to take into consideration the fact that there will be a contra-rotation between the two sides of the bearing. However, those sides connected to shaft 39 will rotate at a slower angular velocity than the corresponding compressor shafts and therefore the contra-rotation experienced by these bearings will not be especially severe.

The fluid dynamic balancing of the rotors 603 and 602 is comparable to that used in FIG. 1: the smaller rotor 603 is now provided with a plurality of orifices 620 which convey the fluid under pressure into the gap between the side-disc 680 of rotor 603 and the side wall 621 of the rotor housing; the labyrinth seals are seals 623, 624, 625, 626, 627, 628, 630, and high pressure seals 635, 636, 637, 616, and 638. A plurality of orifices 620, 640, 648, 647 and 645 are used to equalize the pressure on both sides of the two rotors.

FIG. 7 needs no additional description since the blade structure of this figure does not differ from that illustrated in FIG. 5, with one exception: since the vector-adjusting stage 606 now is placed between two co-rotating stages 605 and 607, it becomes necessary to use highly cambered blades 620 in this vector-adjusting stage. The degree of camber, or the degree of turning, in this case is adjusted so as to obtain, if possible, the same local Mach number at the entry into stage 607 as the local Mach number obtained at the entry into stage 605.

*Vector-Adjusting Stage Positioned Between Two Co-Rotating Compression Stages and Different Modes of Suspending Compression Stages*

FIGS. 8–11 illustrate the compressor which differs from that illustrated in FIGS. 6 and 7, only in two respects: the gear system 800 in FIG. 8 is a spur gear system rather than the planetary gear system 600 disclosed in FIG. 6; also, in FIG. 8, the lower stages 807 and 809 of the compressor are suspended from the second compression stage 805 and a side-disc 812. Since the solidity of the stages is a function of the angle of turning of any given stage, it may be stated in general that the solidity of the stages of a centripetal compressor utilizing vector-adjusting stages will have the following pattern: the solidity of the first compression stage will be high; the solidity of the second compression stage, which follows the vector-adjusting stage, will be low; the solidity of the third and fourth stages will be relatively high, but not as high as that of the first stage so long as there are no vector-adjusting stages between the second, third and fourth compression stages; the solidity of the subsequent stages will be decreasing, the last compression stage having very low solidity which is even lower than that of the second stage so long as there is no exit stator stage following the last stage. When the exit stator stage is used, which is the case in all the compressors disclosed in this application, then the solidity of the last stage becomes comparable to that of the first stage because the last stage will now have a large angle of turning.

The higher the solidity of the stage, and the larger its diameter, the stronger and the stiffer it is structurally and therefore the blading of such stage is subjected to only moderate stresses and strains when such blading is used for driving and suspending the remaining portion of the rotor. Accordingly, if the overall geometry of the compressor so permits, it is best to arrange the rotors of the compressor so that whatever stages must be supported and driven through the blading, such blading should have the maximum solidity and should be a part of the maximum diameter stage.

Accordingly, what is illustrated in FIG. 8 will result in a more rigid structure than what is illustrated in FIGS. 6 and 1. All stages of the second rotor are suspended from the last stage 21 in FIG. 1 and the last stage 612 in FIG. 6. Although the solidity of these last stages admittedly is quite high because they are followed by the exit stator stages 22 and 613 respectively, nevertheless, the rigidity of the last stage and the amount of metal available for suspending the dependent stages through the blading, obviously cannot be compared with that available in stage 805 in FIG. 8. Admittedly, the type of suspension disclosed in FIGS. 1 and 6 is more symmetrical from a purely geometric point of view and accordingly offers certain advantages in the course of their manufacture. This being the case, it then becomes desirable to stiffen and enlarge the total cross-sectional area of the metal available in the last stages 21, FIG. 1 and 612, FIG. 6, and this can be accomplished by making the blading in the last rotor stages larger in size by lengthening the chord and increasing their cross-sectional area.

The shaft suspension in FIG. 8 is comparable to that used in FIG. 6, in that bearings 814 and 815, supported by a frame 818, are used for supporting the outer shaft 816 which in turn supports the first rotor 812. The inner shaft 820 is supported by bearings 822 and 821; bearing 821 is also supported by frame 818, while bearing 822 depends on its support on the outer shaft 816. Accordingly, bearing 822 is a contra-rotating bearing.

This type of shaft suspension may be selected when part of the compressor output is discharged through a duct 824 and another part through a duct 826, such flow of compressed fluid being indicated by arrows 825 and 827 respectively. That portion of the compressed fluid which emerges from the stationary duct 826 then enters the hollow shaft 820 and then enters a stationary duct 830 connected to frame 818 by means of a flange 832 bolted to the frame. A labyrinth seal 834 is required for making the arrangement indicated in FIG. 8 practicable. Conduction of air in two opposite directions 825 and 827 may be necessary when the disclosed compressor is used as a part of an over-all turbine power plant having two turbines, one turbine driving the compressor and the other turbine being a free turbine which is used to furnish useful power to an outside load. The disclosed construction would be useful in such a type of power plant, especially when heat exchanges are contemplated for the compressed air emerging from the compressor.

The fluid dynamic balancing of the rotors, for preventing any side-thrust, is identical to that described previously and therefore need not be repeated here. It is fully illustrated in FIG. 8.

FIGS. 9 and 10 disclose two side-views of the spur gears 800 of FIG. 8. Gear 900 is a driver and so is gear 901, FIG. 10; gear 901 is geared to shaft 816, FIG. 8. Shaft 816 is provided for this purpose with gear 836, FIG. 8. The two driver gears are mounted on a common shaft 840 mounted on bearings 841 and 842, FIG. 8. In order to reverse the direction of rotation, an idler gear 903, FIG. 9, is interposed between the driver gear 900 and a pinion gear 838, which is a part of the inner shaft 820. Although the number of gears used in this type of drive is lower than the total number of gears and pinions used in the planetary system, the size of the spur gears is much larger than the size of the planetary gear system and for this reason it is less advantageous than the planetary system.

Figure 11:
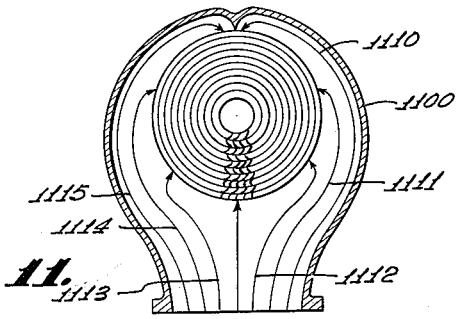
Figure 11A:
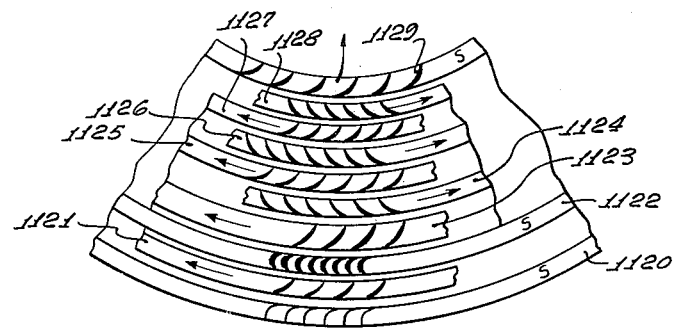

FIG. 11 discloses a transverse section of the compressor illustrated in FIG. 8. This figure is self-explanatory in view of the prior descriptions of similar figures, such as FIGS. 5 and 7. It may be mentioned here that FIG. 11 also illustrates the cross-sectional view of a scroll 1100, having a plurality of potential flow lines 1110—1115 illustrated in this figure. They illustrate the fact that the fluid to be compressed enters the stationary contra-prerotation stage 802 in a substantially radial direction.

The order of stages in FIG. 8 is identical to that in FIG. 6: a single vector-adjusting stage is placed between two co-rotating stages 803 and 805. The remaining stages are contra-rotating, the stages of the first rotor interleaving the stages of the second rotor.

Two Stationary Ducts Structure

Figure 12:
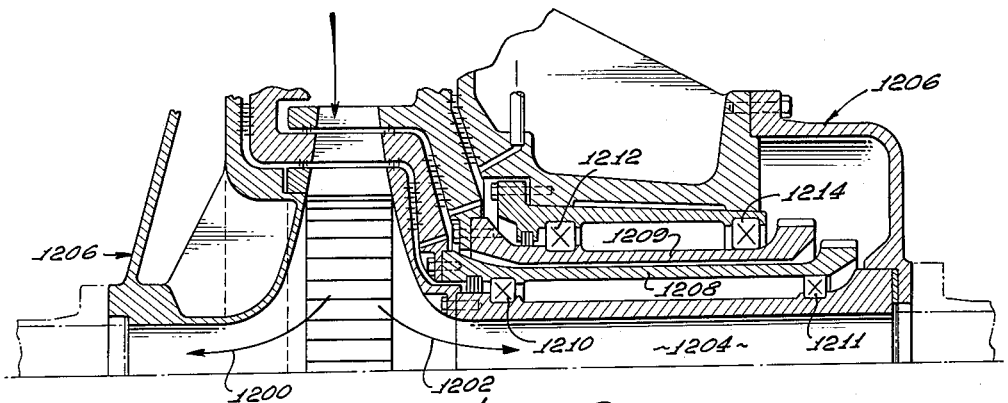
FIG. 12 is a longitudinal sectional view of two concentric shafts and of the main frame and the mode of supporting the two shafts by such frame.

FIG. 12 discloses a modified type of suspension for a compressor, in which it is desirable to discharge compressed air in two directions 1200 and 1202. In this case, a hollow duct 1204, which is supported on both sides by a frame 1206, is used for supporting the inner shaft 1208 through bearings 1210 and 1211, while the outer shaft 1209 is supported through bearings 1212 and 1214 from the main frame 1206. This type of support is suitable for any type of centripetal compressor or centrifugal turbine structure, and it is also suitable for a planetary gear drive or a spur gear drive. Although the diameter of the bearings in FIG. 12 may be somewhat larger than the diameter of the bearings in FIGS. 8 and 6 or 1, the advantage of the type of suspension shown in FIG. 12 resides in the rigidity of the suspension for the two shafts and positive alignment of the bearing surfaces, since both shafts in this case are supported directly by the main frame. Also, the contra-rotating bearings are eliminated.

Centripetal Compressor With a Plurality of Vector-Adjusting Stages

FIGS. 13 and 14 illustrate a compressor having two vector-adjusting stages while all the preceding compressors described above have only one vector-adjusting stage. The two vector-adjusting stages are stages 1302 and 1304 which are supported by the main frame 1312: the first rotor includes the first compression stage 1301, the second compression stage 1303, the fourth compression stage 1306 and the sixth compression stage 1308. The second rotor includes the compression stages 1305, 1307 and 1309. Accordingly, in this case, the first vector-adjusting stage is mounted between two co-rotating stages while the second vector-adjusting stage is mounted between the contra-rotating stages 1303 and 1305. Utilization of two vector-adjusting stages is indicated with the centripetal compressors of large or medium diameters, where the peripheral velocities of the outer stages do not diminish as rapidly as in the compressors having smaller outside diameter. In the large diameter compressors the first two outer stages of the first rotor are stages 1301 and 1303, capable of generating such a large amount of kinetic energy that it becomes necessary to have an additional vector-adjusting stage 1304 for conveying the excess of this energy in proper vectorial relationship to the succeeding stages and especially compression stage 1305, without exceeding the local Mach number in stage 1305.

Utilization of the two vector-adjusting stages also permits one to have a constant Mach number throughout the compressor more readily than in the compressor which has only one vector-adjusting stage. A more detailed discussion of the vectorial relationships in the compressor of the above type is disclosed in the previously identified copending application Serial No. 514,001, now abandoned.

As stated in the above application, the mechanical head $\Delta L_t$ produced by any given stage is given by the equation:

$$\Delta L_t = \frac{1}{g}(C_{u_n}U_n + C_{u_{n+1}}U_{n+1}), \frac{\text{ft. lbs.}}{\text{lbs.}} \quad (1)$$

in which $\Delta L_t$, total mechanical head;
$g$, acceleration of gravity;
$C_{u_n}$ is the peripheral velocity component of the absolute flow velocity $C_n$ at the entry of fluid into stage $n$.
$U_n$ is the peripheral velocity of the outer periphery of compression stage $n$.
$C_{u_{n+1}}$ is the peripheral velocity of the absolute flow velocity $C_{n+1}$ at the exit from stage $n$.
$U_{n+1}$ is the peripheral velocity of the inner periphery of compression stage $n$.

From this equation, it follows that the mechanical head will be the highest if the product of $C_{u_n}U$ will be the largest. This can be achieved by making $U$ as large throughout the total number of stages of the compressor as mechanically possible. This is accomplished by rotating the inner rotor, and therefore the smaller of the two contra-rotating rotors, at the same peripheral velocity as the peripheral velocity of the first stage.

The asymmetrical velocity diagram provides the highest component $C_u$ consistent with feasible angles of turning in the cascades and therefore by these two means, i.e., the high peripheral velocity of the inner rotor and the large $C_u$ components, the highest possible mechanical heads in all stages can be achieved. Obviously the highest head would be achieved in each stage if $C_u$ could be made equal to $U$. This indeed is possible and can be achieved in a few stages in the middle of the compressor. It is impossible to achieve this throughout all of the compressor because it is impossible to make the peripheral velocity, $U$, constant throughout the compressor. However, the disclosed compressors approach the unattainable ideal closer than any prior centripetal compressors. Therefore, the disclosed centripetal compressors are capable of converting maximum practicably obtainable mechanical energy into pressure.

FIGS. 13 and 17 illustrate two additional types of the planetary gear systems which are especially suitable for interconnecting the two shafts 1320 and 1321 of the compressor and for rotating these two shafts in the opposite directions from a single power receiving shaft 1322. Shaft 1322 is mounted in two bearings 1323 and 1324 which are supported by the extension 1325 bolted to the main frame 1312 by means of bolts 1326. Shaft 1322 terminates in a spider 1327 having a plurality of spider arms such as spider arms 1328 and 1329, the only two spider arms visible in the figure. However, there are two or more additional spider arms, identical to the arms 1328 and 1329, uniformly distributed around the periphery of the spider 1327. These spider arms are provided with suitable bores which are used for mounting bushings 1330 and pinions 1331 which are rotatively mounted within the bushings 1330. The upper and the lower ends of the pinions 1331 are serrated or splined for mounting the planet gears 1332 and 1333, which are fixed to the pinion 1331. Therefore, the planet gears 1332 and 1333 are not capable of rotating on the pinion 1331 but are capable of rotating together with the pinion 1331 when the latter revolves within the spider arm 1328. The planet gear 1332 engages a stationary ring gear 1334. The ring gear 1334 is permanently bolted to the frame extension 1325 by means of a plurality of bolts 1335. The lower planet gear 1333 engages the two sun gears 1336 and 1337 which are connected to the respective shafts 1321 and 1320 by means of collars 1338 and 1339, having flanges 1340 and 1341 and threaded portions 1342 and 1343. Flange 1340 of the inner collar 1338 engages a shoulder 1344 of shaft 1320 while its threaded end 1343 engages the threaded portion of the sun gear 1337. This sun gear and shaft 1320 are provided with teeth 1345 and 1346 which enmesh each other and thus provide a self-aligning coupling between the inner shaft 1320 and the planet gear 1333. The same type of self-aligning arrangement is also used between the sun gear 1336 and the outer shaft 1321 where the sun gear 1336 is provided with a plurality of teeth 1347 and 1348. The inner shaft 1320 is mounted on an extension 1349 of the stationary central duct 1350, the rotative connection being obtained by mounting a bearing 1351 between the shaft and the duct. The outer end of shaft 1320 is supported by a bearing 1352 which is mounted on the inner end of the external shaft 1322, this bearing supporting the inner shaft 1320 through the sun gear 1337, collar 1338, and the teeth 1345 and 1346. The outer shaft 1321 is supported by means of bearings 1354 and 1356 which are supported by the main frame 1312. Since the sun gear 1336 is supported in part by the bearing 1356, this bearing 1356 is also used indirectly for supporting the inner shaft 1320 through the sun gear 1337, the planet pinion 1333 and thence again the sun gear 1336. In view of the type of construction or the type of mounting of the sun gears 1336 and 1337, it follows that the two sun gears possess the self-aligning features so that they can align themselves continuously with respect to the planet pinions 1333 which are mounted on the main external shaft 1322 through the spider arms 1328.

The operation of this planetary system should be apparent from the description given thus far. It should be mentioned here that the angular velocity of the sun gear 1336 will be somewhat lower than the angular velocity of the inner sun gear 1337, the relationship of the angular velocities being a function of the number of the gear teeth on the two sun gears. The angular velocity of the inner sun gear 1337 will be larger than that of the outer sun gear 1336 because the diameter of the sun gear 1337 is smaller than the diameter of the sun gear 1336, which in turn will make the angular velocity of the compression stage 1305 higher than the angular velocity of the outermost compression stage 1301. This is what is desired because it permits the outermost stage on the rotor 1362, which is stage 1305, to have a peripheral velocity comparable or equal to the peripheral velocity of the outermost stage 1301.

FIG. 17 discloses a modified version of the same type of planetary gear system illustrated in FIG. 13. The difference resides in the transfer of the ring gear 1700 in FIG. 17 to a bracket 1702 constituting a part of the main frame 1312. The ring gear 1700 is mounted on frame 1312 by means of a plurality of bolts 1704 uniformly distributed around the periphery of flange 1706 of the ring gear 1700. The above structure is somewhat more compact and more rigid than the structure illustrated in FIG. 13 because it enables one to mount the ring gear 1700 directly on the main frame and the brackets 1702 reinforce and make the main frame 1312 very rigid, thus furnishing a very stable support for the ring gear 1700. Moreover, it should be noted here that one of the main bearings 1708, which supports the sun gear 1710, is also connected to the main frame 1312, and therefore the proper alignment of the ring gear 1700 with the sun gear 1710 is obtained in FIG. 17 in a more direct manner than is the case in FIG. 13.

Equalization of the pressure exerted on the two surfaces 1364 and 1365 is obtained by providing a plurality of orifices 1366 around the rotor disc 1360 and a plurality of orifices 1367. The orifices 1366 convey the fluid at the pressure appearing in a gap 1368, which exists between rotor disc 1360 and the inner rings 1369, 1370, 1371 and 1372. This gap is in communication with the highest pressure appearing in gap 1373 between the compression stages 1305 and 1306, and it is also in communication with the somewhat lower pressure appearing in the gaps between the compression stage 1305 and the compression stage 1303. All compression stages as well as the vector-adjusting stages are provided with the labyrinth seals such as 1374, 1375, etc. which reduce the amount of interstage leakage. Therefore the pressure appears in the gaps such as gap 1368 and similar gaps 1376, 1377, 1378, is always lower than the pressure existing at the adjacent interstage gaps. The outer surface 1365 is also provided with the labyrinth seals 1380 and 1381, which aid in producing the equalizing fluid pressure on the outer surface 1365. The two rotors are also provided with a labyrinth seal 1382 to prevent any leakage of compressed fluid between the two rotors and through the gap which exists between the concentric shafts 1320 and 1321. The shafts are also provided with a high pressure seal 1383 which prevents any leakage of the compressed fluid through the gap between the two shafts. The outer shaft 1321 is also provided with a high pressure seal 1384, which is mounted between this shaft and frame 1312 for preventing any leakage of the compressed fluid between the outer shaft 1321 and frame 1312 and through the bearings 1354 and 1356 of the outer shaft. In order to insure that no leakage whatsoever of a compressed fluid takes place through the bearings, frame 1312 is provided with a plurality of orifices 1385 and 1386. Rotor 1362 is also provided with a plurality of orifices 1387. Accordingly any compressed fluid that leaks through the labyrinth seal 1389 will be conveyed through the orifices 1387, 1367, and 1385 in the manner indicated by arrow 1391, and it then will be conveyed through orifices 1386 into a gap existing between frame 1312 and side disc 1360 of the first rotor. This compressed fluid will contribute to the fluid dynamic pressure-balancing effect produced by the working fluid on the two surfaces of the disc. It should be noted here that any fluid emerging through the orifices 1386 will have to pass through the labyrinth seal 1395 before it can reach the gap between the contra-prerotation stage 1300 and the first compression stage 1301. This latter gap has a negative fluid pressure because of the marked expansion of the fluid through the contra-rotation stage 1300. The orifices 1387, 1367, and 1385 therefore prevent any possibility of the compressed fluid ever reaching the gap between the shafts, the gap between the outer shaft and the frame, and bearing 1351 which supports the inner shaft 1320. Bearing 1351 additionally is provided with a high pressure seal 1393 between extension 1349 and disc 1390. No orifices are indicated or provided within disc 1362 because fluid dynamic balancing of this second disc is obtained by means of the labyrinth seals 1394 and 1395. Fluid is under high pressure in the gap between the innermost compression stage 1309 and the stator stage 1310, and some of this fluid leaks through the labyrinth seal 1395 and through the labyrinth seal 1394 so as to create sufficient amount of pressure on the outer surface of disc 1362 so as to equalize the fluid pressure exerted on its inner surface.

FIG. 14 illustrates the transverse cross-sectional view of the compressor illustrated in FIG. 13. This figure does not require any special comment or description in view of the prior description of such figures.

FIGS. 15 and 16 disclose a compressor having two vector-adjusting stages 1502 and 1504, both of which are surrounded by the compression stages mounted on the first rotor 1512. The second rotor 1514 begins with a compression stage 1506 and this stage follows the compression stage 1505 of the first rotor. Accordingly, this arrangement is that in which two vector-adjusting stages are placed between co-rotating compression stages throughout.

Examination of FIG. 15 reveals that the elastic fluid is conveyed to the stationary contra-prerotation stage 1500 from ambient air through a hood (not numbered). The elastic fluid then is compressed in a centripetal direction by means of the following stages: the first or the outermost compressor stage 1501 of the first rotor, the first vector-adjusting stage 1502, the second compression stage 1503, which is a part of the first rotor, the second vector-adjusting stage 1504, the third compression stage 1505, which is also a part of the first rotor, the fourth compression stage 1506, which is a part of the second rotor, the fifth compression stage 1507 of the first rotor, the sixth compression stage 1508 of the second rotor, the seventh compression stage 1509 of the first rotor, the eighth compression stage 1510 of the second rotor, and the diffusion inner stator stage 1511. Upon leaving the diffusion stator stage 1511, the compressed fluid first enters the radial portion of the stationary duct and then is conveyed into the axial portion of the same duct, as illustrated by an arrow. The diffusion stator 1511 is identical to the diffusion stator 22 illustrated in FIG. 1, which is described more in detail in connection with the description of FIG. 1. As mentioned previously in connection with the description of FIG. 1, the use of the diffuser 22 permits one to convert the last, or the innermost, compression stage 21 in FIG. 1 and the innermost compression stage 1510 in FIG. 15 into a purely compression stage whose blading is designed so as to impart to the compressed fluid as much of the kinetic energy as possible by means of this stage. The diffusion of the elastic fluid is then performed completely in the stationary diffuser 1511. It is obvious that such arrangement enhances markedly the over-all compression ratio of the compressor. One might even go as far as to say that it increases the number of stages by one stage, since in the compressors which are not capable of having stator 1511 because of their geometry, it becomes necessary to convert the last, or the innermost, stage 1510 into the diffuser with the concomitant loss of the kinetic energy that is available in FIG. 15.

A vectorial study of this compressor reveals that it produces a maximum total head of all the compressors disclosed in this case. This is due to the fact that it becomes possible to have a peripheral velocity at a relatively small diameter of stage 1506, which is equal to the peripheral velocity of stage 1501. In other words, the high peripheral velocity has been carried into the innermost part of the compressor and it is at this point that the compression stages will produce maximum $\Delta L_t$. The transverse cross-sectional view of this compressor is illustrated in FIG. 16. It is self-explanatory and needs no particular description.

The number of compression stages used in any given compressor is determined by the total mechanical head one wishes to obtain and, therefore, a lesser or a larger number of stages may be used in the disclosed compressors than the number disclosed in the drawings. If the diameter of the compressor must not exceed some given dimension, then the number of stages that one can place within this dimension will be determined in the main by this given dimension itself. However, even then high compression ratios can be obtained with small diameter compressors by making the peripheral velocity equal to approximately 1000 feet per second, which is the maximum velocity obtainable with the existing vacuum-distilled steel alloys.

The disclosed versions of the centripetal compressors are capable of producing mechanical heads which are much higher than the mechanical heads that can be produced by axial flow compressors having the same number of compression stages. This is so because the axial flow compressors and the optimum cascade configuration in the axial flow compressor can exist only at one radius which is a purely geometrical concept because all other portions of the axial flow blading having definite radii are not able to achieve the optimum cascade configuration. This is not so in the centripetal compressors because the entire length of the blade in a centripetal compressor has this optimum radius, this radius being constant through the width of the blade in this instance. Moreover, the flow configuration itself following the natural vortex in the centripetal compressor, does not produce any fluid dynamic problems that are typical of the axial flow compressors.

This specification has already referred to and incorporated by reference in the introductory part, the co-pending application for patent, Serial No. 514,001, now abandoned, entitled Method of Compressing Fluids With Centripetal Compressors, filed June 8, 1955, which discloses and claims several methods of centripetally compressing fluids. The methods disclosed in the above application are predicated on the structures disclosed in this application, namely, the compressors which use vector adjusting stages. This specification goes still further than the co-pending application, Serial No. 514,001, now abandoned, by disclosing additional elements in the compressors, such as the inner stators used at the entry into the centrally mounted stationary duct receiving the compressed air. It is, for example, stator 22 in FIGURE 1, constituting a diffuser and swirl eliminating stator used at the entry into the stationary duct 84. Such stator further increases the total head that may be obtained with the compressors of this type since it converts the kinetic energy of the compressed fluid entering the stator into the potential energy, thus still further increasing the total mechanical head obtainable with such compressors. The co-pending application, Serial No. 514,001, now abandoned, therefore, does not illustrate nor does it discuss the output stators since in the above co-pending application compressed fluid discharges directly into rotatable, hollow shafts used for supporting the two rotors and for receiving compressed air. In the above application, Serial No. 514,001, now abandoned, there are several figures which compare the performance obtainable with the so-called "classical" centripetal compressor, which does not have any vector adjusting stages, with the performance of the compressors using vector adjusting stages. Vector diagrams and the velocity distributions are illustrated for both types of compressors and the reader is referred for a more detailed comparison of the two compressors, to the referenced application, Serial No. 514,001, now abandoned.

It may be helpful here, nevertheless, to repeat once more only the most pertinent data that is given in application Serial No. 514,001, now abandoned, in connection with the description of FIGURES 26 and 27. FIGURE 26 illustrates the mechanical heads produced by individual compression stages of three compressors:

(1) Having no vector adjusting stages, (2) With one vector adjusting stage positioned between two contra-rotating stages, and (3) Having two vector adjusting stages with the vector adjusting stages positioned between contra-rotating stages.

These curves illustrate that there is very large gain in the mechanical heads produced by all compression stages in the compressors with the vector adjusting stages, the gain in some of the stages being greater than a 100% gain.

FIGURE 27 illustrates the total mechanical head obtained with the compressors Nos. 1, 2 and 3 enumerated above. In the select example, the total head of the classical compressor is in the order of 27,000 ft. lbs./lb. The total head of the compressor No. 2 is in the order of 41,000 ft. lbs./lb., and the total head of the compressor using two vector adjusting stages is in the order of 52,000 ft. lbs./lb. Thus, there is a gain of approximately 100% in total head between the compressors No. 1 and No. 3.

The above results are based on the actual experimental data obtained with the compressors using vector adjusting stages, which were operated under the conditions outlined in the co-pending application Serial No. 514,001, now abandoned. As stated in the above application, in order to obtain the above comparisons, all of the compressors were operated at Mach number .684 which, of course, is an extremely unfavorable Mach number for obtaining such comparison insofar as the compressors having vector adjusting stages are concerned, because it is possible to use much higher peripheral velocities for the second rotor in the compressor having vector adjusting stages. For example, in FIGURE 15 of this application, a compressor is disclosed which has two vector adjusting stages 1502 and 1504, these stages being positioned between co-rotating compression stages 1501, 1503 and 1505. Then follows the contra-rotating first stage of the second rotor which is stage 1506, and, as explained in application No. 514,001, now abandoned, it is best to operate the outermost stage 1506 of the second rotor at the same peripheral velocity as the peripheral velocity of the outermost stage 1501 of the first rotor. This, obviously, means that all of the stages of the second rotor, such as stages 1506, 1508 and 1510 in FIGURE 15, all have much higher peripheral velocities than the comparable stages would have in the classical compressor, with the result that even much higher total mechanical head would be obtainable if the comparison were made between the compressor illustrated in FIGURE 15, with the peripheral velocity of the stages 1501 and 1506 being equal to each other.

However high is the gain that is obtainable by making the two peripheral velocities of the outer stages of the two rotors equal, such mode of operation being possible only when the compressor has vector adjusting stages, even greater gains are obtainable in the compressors with the vector adjusting stages when they are operated at local entry Mach number in the order of 1.0 to 1.5. It is obvious that under such operating conditions, all of the velocities would be much higher than the Mach number .684 and, therefore, the corresponding gains would, unquestionably, exceed the 100% gains that have been already corroborated experimentally. The gains under such circumstances, together with the gains obtained by operating the two contra-rotating outer peripheral stages of the two rotors at the same peripheral velocities and using the output stator diffuser should be very much in excess of 100%.

The disclosed compressors utilize straight blading and are well adapted for the mechanical introduction of contra-rotation principles and also the introduction of equal peripheral velocities at different radii of the two rotors. Therefore, these compressors have inherently much simpler mechanical structures. For example, the cost of a straight blade airfoil used in this compressor is approximately one-tenth the cost of the twisted blading used in axial flow compressors. The blading in the centripetal compressor is braced at both ends by hoop-rings and is not subject to vibration encountered in axial flow machines.

The disclosed compressor structures are suitable for constructing subsonic compressors, supersonic compressors, and a combination of supersonic and subsonic compressors; in the latter case the outermost stages are supersonic and the innermost stages are subsonic. The supersonic compressor and their mode of operation, as well as the type of blading suitable for obtaining compression of fluids by using oblique, reflected and normal compression shocks is disclosed in my co-pending parent application for patent No. 217,347 filed March 24, 1951, now Patent No. 2,804,747 entitled "Gas Turbine Power Plants With a Supersonic Centripetal Flow Compressor and Centrifugal Flow Turbine" and the divisional application Serial No. 529,504 filed August 19, 1955, now Patent No. 2,949,224 entitled "Supersonic Centripetal Compressor." What is disclosed in the above application relating to the supersonic compressors, is hereby incorporated by reference in this application. The same case also discloses but does not claim the use of the vector-adjusting stage.

Centrifugal, Radial Flow Turbines

As it has been stated in the introductory part of the specification, the disclosed structures of the radial machines are suitable not only for use as the centripetal compressors but also as the centrifugal radial flow turbines, or, as they are often called, the radial turbines. It is for this reason that a generic term "radial flow turbomachines" has been introduced in the introductory part of the specification. This part of the specification will deal with the radial turbines.

The evolution of centripetal compressor by V. H. Pavlecka produced a compressor capable of attaining a 15 to 1 compression ratio with any practicable rate of flow of compressed fluid.

At the same time, the perfection of high temperature alloys and the evolution of the air-cooled (or liquid cooled) turbine blading, enables one to use high temperatures in combustion chambers of the order of 2200° F.

It is obvious from the above, i.e. 15 atmospheres pressure and 2200° F. temperature, that any working fluid under such conditions possesses large amount of potential energy, and if such fluid were to be introduced into the known contra-rotatable radial flow turbines, such as the Ljungstrom turbines, it would be necessary to have a large number of turbine stages for converting such large potential energy of gases into mechanical work. An anomalous situation would exist in which the number of stages in the turbine would be greater than the number of stages in the compressor.

The reason for having a large number of stages in the Ljungstrom turbines is due to the fact that the working fluid enters the innermost turbine stage directly rather than through any expansion stator, and, therefore, there is only a gradual conversion of the potential energy of gases into a corresponding kinetic energy. Therefore, in order to reduce the gases to approximately atmospheric pressure a large number of stages is necessary.

The Ljungstrom turbines operate exclusively on the 50–50 reaction principle, where all rotating turbine stages expand at a high rate, but only with small heat drops. The above will be discussed more in detail later on in connecttion with the velocity diagrams of the turbines disclosed in this specification and comparison of such vector diagrams with a typical vector diagram for the Ljungstrom turbines. It then will be pointed out that the absolute velocity $C_1$, which is the absolute exit velocity of the fluid from the innermost stage of the turbine, in the Ljungstrom turbines is very small with the result that the conversion of the potential energy into kinetic energy is quite slow in the innermost stages of such turbine.

Because of the low peripheral velocities of the innermost stages of the centrifugal turbines, they are incapable of converting high kinetic energies into mechanical work without exceeding the local Mach numbers, if the working fluid is introduced at high relative velocities into these inner stages.

Accordingly in both cases, that is in the centripetal compressors as well as in the centrifugal turbines, a general principle can be formulated by stating that due to the limitations of fluid dynamics (local Mach number limitations) and the peripheral velocity differences, the innermost stages of the radial centrifugal turbine and the outermost stages of the centripetal compressor cannot be loaded beyond certain fixed limits.

The very high velocities of expansion in the smallest stages of the centrifugal turbines corresponding to the fixed Mach numbers, are far in excess of the capabilities of these small diameter stages to convert the kinetic energy of the working fluid into mechanical work, due to small peripheral velocities of these stages.

Conversely, the large diameter stages of the centrifugal turbines have a high capacity for converting the kinetic energy of gases into mechanical work and the small diameter stages of the centripetal compressors have the ability to convert high kinetic energies of gases into pressure at the local Mach numbers without exceeding the fixed local flow velocities due to the higher temperatures of the gases in these stages.

In the case of centrifugal turbines, the working fluid is accelerated to the maximum absolute velocity $C_1$ in the same manner as in the centripetal compressor by discharging or passing the fluid through the stationary expansion stator. In the preferred mode of operation, which will be described later in connection with FIG. 23, the absolute velocity $C_1$ is the maximum absolute velocity in the entire set of the absolute velocities in the turbine, these velocities decreasing in magnitude as one progresses from the innermost stage toward the outer stage. Although the absolute velocities $C_x$ decrease, there is, nevertheless, a rapid expansion of gases in the small diameter stages, such expansion being in excess of the ability of these stages to convert the kinetic energy into mechanical energy, and the excess of such kinetic energy is passed on to the larger diameter stages which have much greater capabilities for converting very high kinetic energies into pressure energy because of their higher peripheral velocities. The expansion of gases may also be carried out at a constant, or nearly constant local Mach numbers through all the stages of the centrifugal turbine.

In this manner, in the case of the turbines, the first stages operate at high relative velocities, both at the entry and at the exit, and their velocity diagrams resemble more the velocity diagrams of the impulse turbines than the velocity diagrams of the 50–50 reaction turbines, although in terms of power output and utilization of heat energy, all of the rotor stages are of the 50–50 reaction type. This will result in higher flow losses in the smaller stages but, considering the rapid rate of expansion and high power conversions within these stages, it is possible to design a turbine with fewer stages, so that the overall efficiency remains either unchanged or is made even higher than in the prior art turbines. An additional immediate advantage obtainable from such mode of operation is that the innermost stages are exposed to lower temperatures than would be the case if the expansion were made to be commensurate with the power capacities assigned to these inner stages by the prior art methods of expansion.

In the prior art radial centrifugal contra-rotating turbines of the Ljungstrom type the expansion has been always pro-rated to the ability of the stages of converting the kinetic energy into mechanical work, the velocity triangles of such stages being congruent triangles from the first to the last stage; with the method disclosed here the velocity triangles vary from stage to stage due to the fact that the working fluid is expanded very rapidly in the inner stator stage with the result that the absolute entry velocity of the fluid $C_1$, at the entry into the first turbine stage, is the highest absolute velocity in the entire vector diagram of the turbine (in the preferred mode of operation disclosed in FIG. 23). The remaining absolute velocities then diminish in accordance with the ability of the respective stages to convert the initial high kinetic energy into mechanical work. Accordingly, the velocity triangles of the first stages are of the "overloaded type," and resemble more an impulse turbine triangle rather than the triangles of the 50–50 reaction turbine; therefore, more kinetic energy is being released from the preceding stage than the succeeding stage can convert into mechanical work.

Gradually, as the diameter of the turbine stages increases, the velocity triangles become "less overloaded"; i.e., the stages pass on to the next stages a lesser amount of kinetic energy, and finally, in the last stages, the triangles begin to conform with the classical 50–50 reaction type triangles. It should be understood that the turbine stages are the 50–50 reaction stages throughout, although the triangles are distorted because of the large kinetic energy being passed from stage to stage, toward the last turbine stage. The entire vector diagram, and its component vector triangles, nevertheless is strictly symmetrical with respect to the radial line since the turbine has two contra-rotating rotors, and it is the nature of the contra-rotating machines that the velocity triangles must be nearly all perfectly symmetrical in order to obtain optimum energy conversions and energy distributions among the two contra-rotating rotors, and equal or proportional loading of the stages in the two rotors.

Accordingly, the structure of the disclosed turbine machines, as in the case of the disclosed compressors, begins with the stationary central duct which has an axial flow portion and a radial flow portion, the two portions being connected to each other by a smooth funnel-shaped or trumpet-shaped surface, which enables one to obtain a 90° turn in the flow of the fluid without any appreciable flow losses or separations. The fluid then enters a stationary expansion stator. This stator includes a plurality of cambered airfoils, forming expansion nozzles. An absolute exit velocity, $C_1$, having a local Mach number of the order of 1.3, is produced at the exit from the stator. This expansion stator is then followed by a plurality of contra-rotating turbine stages, all flow channels in the turbine stages being converging expansion channels from the first rotor stage to the last rotor stage. The degree of convergence of the flow channels increases as one progresses from the innermost stage to the outermost stage. Therefore, the last turbine stage produces maximum expansion of the working fluid. Little would be gained by proportioning the flow channels in the first stages so that they too would have high expansion characteristics, since the above would do no more but unnecessarily increase the losses within the inner turbine stages. The fluid expansion nevertheless does take place even in the innermost turbine stages and it may be stated here in general that the rate of expansion and exit velocities are adjusted so as to produce a maximum relative exit velocity, $W_x'$, whose local Mach number $M_{W_x}'$ is of the order of $$M_{W_x}' \cong \text{between 1.0 and 1.3} \qquad (2)$$

this local Mach number remaining substantially constant throughout all the rotating turbine stages.

The angle of turning, $\theta$, within the turbine stages is made to decrease as one progresses from the innermost stage to the outermost stage of the turbine, the first rotor stage having an obtuse angle of turning and the last stage having an angle of turning which is either 90° or slightly less than 90°.

It is best to have the radial velocity $C_r$ to be constant throughout the turbine, and in the optimum vector diagram, FIG. 23, the radial velocity $C_r$ remains constant. The method is also illustrated with an increasing radial velocity in the vector diagram of FIG. 23A, and the latter figure is presented here primarily for contrasting the advantages of FIG. 23 as compared to FIG. 23A, rather than as a recommended practice. A decreasing radial velocity, the vector diagram for which is not illustrated here, is also not recommended.

The radial velocity $C_r$ is sufficiently high even in FIG. 23 so as to be excessive for a scroll or a hood of the turbine, and therefore the turbine is also provided with an exit stator stage which has two functions:

(A) It reduces the radial velocity $C_r$ to a hood velocity $C_h$, the latter being sufficiently low so as to avoid any excessive flow losses within the hood; $C_h$ is made only large enough to assure an efficient transport of the exhausted fluid through the exhaust duct and into an ambient air.

(B) The outer stator is designed as a diffusion stator for converting a part of the kinetic energy of the exhausted gases into pressure energy. The stator receives the working fluid having high kinetic energy and discharges it as a fluid having higher potential energy but a lower kinetic energy. This will result in a more efficient turbine, and, at the same time, provide a useful structural means for holding the peripheral entry into an exhaust hood, or scroll, in a proper attitude by means of the stator blades. By converting the kinetic energy into potential energy in the exit stator, it becomes possible to maintain a lower pressure at the exit from the outermost stage of the turbine, and as a consequence there is a corresponding increase in the mechanical energy output of the last compression stage.

The above is comparable to a standard steam turbine power plant working into a condenser which has a somewhat higher vacuum.

In concluding the introductory part of the specification relating to the turbines, it should be mentioned here also that the local Mach number as well as the reaction remain approximately constant as one proceeds from the innermost stage to the outermost stage, the latter being of the order of 0.5. The disclosed gas turbines restore the balance between the number of the compressor stages and the number of the turbine stages with the result that it becomes possible to have the same outside diameter for the compressor as well as for the turbine, which is a very important consideration in any aircraft gas turbine power plants where the outside diameter of the power plant should be as small as possible.

Proceeding now with the description of the mechanical structures of the machines, the axial sectional view of the steam turbines are illustrated in FIG. 18A, while the axial sections of the gas turbines are illustrated in FIGS. 20, 20A and 20B. The corresponding transverse sections are illustrated in FIGS. 19 and 21 respectively. The blading for a gas turbine is also illustrated on an enlarged scale in FIG. 25.

*Steam Turbine—FIGS. 18, 18A, 18B and 19*

Referring to FIG. 18, the steam turbine is provided with a stationary frame 1800, a scroll 1801 surrounded by a metallic wall 1802 spaced from the scroll 1801; an insulation medium 1803, such as aluminum foil, may be placed between the scroll 1801 and the wall 1802 for diminishing the heat losses from the scroll. Scroll 1801 is mounted directly on frame 1800 by means of circumferentially positioned bolts such as bolts 1804 and 1805. An axially mounted stationary main steam duct 1806 is made an integral part of the frame or is connected to the main frame 1800 by means of appropriate flanges and bolts not illustrated in the figure. The diameter of the main duct 1806 is a function of the rate of flow of the working fluid. This diameter is determined by the designer by selecting an appropriate speed of flow of the fluid to the turbine at the prevailing or anticipated load conditions. The duct 1806 has a 90° turn, the lower, left part of the duct, indicated by a dimensional line 1859, being the axial portion of the duct since the longitudinal axis 1858 of this portion of the duct coincides with the rotational axis 1858 of the turbine. The axial portion of the duct then blends into the radial portion which is indicated by the dimensional line 1860. The radial portion of the duct terminates in the expansion stator 1813, which will be described more in detail later. It should be mentioned here that the diameter of the expansion stator 1813 should be made as small as possible to reduce the influence of high temperature upon the central structure of the turbine to an absolute minimum. A bleed-off scroll 1809, provided with a toroidally shaped steam chamber or duct 1810 and vanes 1811, may be connected to the main frame by means of bolts 1807 and 1808. A funnel-shaped circumferential duct 1821 connects the toroidally shaped scroll 1809 with the turbine stage 1820 with the result that a portion of the steam leaving stage 1820 is bled off for heating feed water of the power plant.

The path of the steam upon its leaving the central duct 1806 is through the expansion stator 1813 and then through the turbine stages of the first and second turbine rotors. The first turbine rotor includes the first stage 1812, the third turbine stage 1816, the fifth turbine stage 1818, and the seventh turbine stage 1820. The first rotor also includes a left side-disc 1830, a right side-disc 1831, an inner shaft 1832, and a plurality of hoop-rings such hoop-rings 1833 and 1834, which are used for supporting the turbine blades within each stage.

In the view illustrated in FIG. 18, the inner surfaces of these hoop-rings, i.e. the inner surfaces adjacent to the turbine blades, define the axial dimension of the flow channel of the turbine; this channel converges up to stator stage 1821 and then diverges from stage 1822 through the rotor stage 1826 and continues to diverge in the output diffusion station 1827. The configuration of the sidewalls of the flow channel, as viewed in the axial plane illustrated in FIG. 18, is controlled by the desired degree of expansion to be obtained within the respective flow channels of the stages, and the continuity equation.

The turbine is also provided with the second rotor including a side-disc 1836 and a plurality of stages 1815, 1817, 1819, 1822, 1824, and 1826. The outer end 1841 of shaft 1837 is provided with a ring gear 1842 which engages a planetary gear pinion 1843 mounted on frictionless bearing and a stud 1844. A similar ring gear 1846 is provided on the mid-portion of the inner shaft 1832 which also engaged the pinion 1843.

The transverse view of the planetary gear system interconnecting the inner and outer shafts 1832 and 1837 is illustrated in FIG. 18B; there are four pinions, 1843a through 1843d, circumferentially mounted on frame 1800. The inner shaft 1832 is supported by means of the frictionless bearings 1847 and 1848, the latter bearing being mounted on the axial extension 1849 of the stationary duct 1806. In order to provide a rigid, structural support for the extension 1849 of the central duct, this duct is also provided with a plurality of stream-lined vanes 1851, 1852, etc., which connect the end wall 1850 and the extension 1849 to the main frame 1800 through the outer wall member 1853 of the central duct 1806.

The second shaft 1837 is supported by the main frame through two frictionless bearings 1856 and 1857.

Steam turbines almost invariably have bleed-off ducts, and it is for this reason that the turbine has been illustrated incorporating such a duct so as to demonstrate the feasibility of having such bleed-off ducts with the disclosed turbines.

The turbine is also provided with the labyrinth seals 1861, 1862, 1863, 1864, 1865, and the labyrinth seals such as 1866 and 1867, between the hoop-rings of adjacent turbine stages.

The turbine is also provided with the high pressure seals 1868, 1869, 1870, 1871, 1872, 1873, and 1874. The high intensity seals 1871 and 1874 isolate the gear box space 1875 from the working fluid. This gear box is filled with a lubricant and the high intensity seal 1873 prevents the leakage of this lubricant out of the gear box.

The inner shaft 1832 extends to the right, as viewed in FIG. 18, beyond frame 1800 and terminates in the splined end 1876, which is used for connecting the turbine rotors to an external load.

FIG. 18 illustrates a contra-rotating turbine between the stages 1814 and 1820. It is then a single rotation turbine because the rotating turbine stages 1822, 1824, and 1826 are positioned between the respective stationary flow-turning of flow-turning-and-expansion stator stages 1823 and 1825.

The transverse section of the turbine of FIG. 18 is illustrated in FIG. 19. The blading 1900 of the inner expansion stator 1813 represents a converging cambered expansion nozzle converting the high potential energy of gases on the inner side of these nozzles to a high kinetic energy fluid emerging from these nozzles. It is known that a Mach number greater than 1 can be achieved in a flow channel which is first converging and then diverging. It has been found, however, that it is possible to reach a Mach number up to approximately 1.3 even when the nozzle is only a converging nozzle, and does not have any diverging, trumpet-shaped portions at the trailing ends. Such high Mach numbers and high exit velocities are obtainable due to the divergence or deviation in the fluid flow which always appears after such fluid leaves the nozzle with the result that the fluid becomes accelerated even to a higher velocity than that obtained in the flow channel per se. The above applies to the compressing cascade of a compressor or an expanding cascade of a turbine; the flow channel can be theoretically extended, so to speak, in one's imagination, and it then appears to be actually diverging insofar as the imaginary part of the nozzle is concerned. Therefore if the local Mach number 1 is reached in the narrowest width of the channel immediately at the trailing tail of the blade, the flow will continue to expand upon its leaving the real flow channel and will reach a Mach number higher than 1 outside of the flow channel or the cascade, in the imaginary portion of the channel. Therefore, $M_{c_1}=1.3$ is an example of a feasible maximum local Mach number for the expansion cascade 1813 and its converging flow channel defined by the blades 1900 in FIG. 19 and the blades 2003 in FIG. 25. It should be understood, however, that the value of this Mach number is a matter of design and therefore this invention is not restricted to any specific Mach number such as 1.3.

The acceleration in the fluid produced by the introduction of the expansion stator stage is illustrated vectorially in FIGS. 23 and 23A. Fluid enters stator 1830 at absolute velocity $C_0$, which is indicated as the "approach velocity." It is the velocity of the fluid within the radial portion of duct 1806. The fluid leaves stator 1813 at an absolute exit velocity $C_1$ and an angle $\alpha_1$, with respect to the radial line or "radius line," as it is labelled in FIG. 23A. In FIG. 23 $C_1$ is the maximum absolute velocity in the entire vector diagram; in FIG. 23A the maximum absolute velocities are $C_{15}' \equiv C_{16}$, which are the exit velocity from stage 15 and the entry velocity into stage 16, respectively. As will be pointed out later, $C_1$ should be the maximum absolute velocity for the optimum mode of operation.

FIG. 26 illustrates enthalpy-entropy polytrope of the working fluid at the exit from the last turbine stage and the state of the fluid at the exit from the stator diffusion stage or, stated differently, the state of the fluid in the hood upon its emergence from the diffusion stator. Instead of letting the polytrope of the turbine stop at point 1, which corresponds to temperature $T_1$, pressure $p_1$, and velocity $C_1$, $p_1$ corresponding to the pressure within the hood, the exit stator permits one to expand the working fluid to point 2 having a lower pressure $p_2$, lower temperature $T_2$, and higher absolute velocity $C_2$. This lower pressure is between the last rotor and the diffusion stator, i.e., it is in the gap between the outer periphery of the last turbine stage and the inner periphery of the diffusion stator. This gap is illustrated in FIG. 25 at 2510. To convey the gases from this gap, the diffusion stator receives these gases or steam at relative high velocity $C_2$ and compresses or diffuses them to point 3 on the pressure isobar $p_1$. Therefore the stator diffuses the working fluid back to the hood pressure $p_1$. The diffusion process diminishes velocity $C_2$ to a low velocity $C_3$ where $C_3$ can be even lower than velocity $C_1$, the latter being the velocity with which the working fluid would have reached the last rotor stage had there been no diffusion stator provided at the exit. Therefore, it is possible to recover the heat energy $\Delta H_e$ and convert it into useful work, the amount of this heat energy being equal to $$\Delta H_e = \frac{A(C_1^2 - C_3^2)}{2g}, \text{ B.t.u./lb.} \quad (3)$$

where $\Delta H_e$ is the heat energy converted into mechanical work with the aid of the diffusion stator, which can also be defined as diffusion enthalpy of the stator;

$C_1$ is the absolute velocity of the fluid at the exit from the last turbine stage;

$C_3$ is the absolute velocity of the fluid at the exit from the stator stage which can also be defined as the absolute velocity of the fluid in the hood or scroll of the turbine;

A is a constant.

The remaining quantities indicated in FIG. 26 are self-explanatory and need no additional definition here.

The stator diffuser stage at the exit of the turbine will thus improve the efficiency of the last rotor stage and at the same time will diminish the transportation losses within the hood and the ducting that follows after emergence of the fluid from the turbine. It also acts as convenient and desirable mechanical element for holding together the exhaust hood structure.

FIG. 18A discloses an additional version of the steam turbine; the configuration of this turbine is identical to that of FIG. 18 with the exception of the upper portions of the two rotors. In FIG. 18 only the lower portion of the turbine is a contra-rotating turbine, i.e. the portion up to the bleed-off scroll 1806 and the stator stage 1821. Above stage 1821 the turbine in FIG. 18 is a single rotation turbine with the second rotor turbine stages 1822, 1824, and 1826 being positioned between the stator stages 1825, 1823, and 1821.

The difference between the two figures resides primarily in the fact that the first rotor 1830 is now continued beyond the bleed-off scroll 1806, which is accomplished by means of a U-shaped member 1890A which is connected to the upper side-disc 1891A through the first rotor turbine stage 1892A. The upper side-disc 1891A is also provided with the turbine stage 1893A and the turbine stage 1894A. Accordingly, the entire turbine is a contra-rotating turbine.

The remaining elements of this turbine correspond to the identically numbered elements in FIG. 18 and therefore need no additional description. The efficiency of the turbine illustrated in FIG. 18A is somewhat higher than that illustrated in FIG. 18.

*Gas Turbine—FIGS. 20, 20A, 20B, 21 and 25*

The gas turbines illustrated in FIGS. 20, 20A and 20B do not differ markedly from the steam turbines illustrated in FIGS. 18 and 18A. They also have an expansion stator stage at the entry into the turbine and a diffusion stator at the exit from the turbine. Since there is no water to preheat in the gas turbine power plant, the bleed-off scroll is not present in the gas turbine.

The most important difference between the steam turbines and the gas turbines resides in the fact that the disclosed gas turbines utilize air-cooled blading for the first turbine stage and for the expansion stator stage. With this type of air-cooled blades of the turbine and the stator blades, it is possible to operate the turbines at very high temperatures, such as of the order of 2200° F.

In view of the prior description of the steam turbines it will suffice merely to mention and enumerate the main elements of the gas turbines and then proceed with a more detailed description of the blade cooling system. The first rotor of the turbine includes the left side-disc 2000, the right side-disc 2001, an inner shaft 2002, and the turbine stages 2004, 2006, 2008, 2010, 2012, 2014, 2016, and 2018. The second rotor includes the right side-disc 2022, an outer shaft 2023, and the turbine stages 2005, 2007, 2009, 2011, 2013, 2015, 2017, and 2019. The entire structure is supported by means of a main frame 2024 which is provided with a cooling air duct or pipe 2025 connected to the frame by means of flanges 2026 and appropriate bolts not indicated in the figure. The main frame 2024 also includes a cooling air pipe 2027 and a toroidal chamber 2028 which distributes the cooling air around the periphery of the compressor.

Before proceeding any further with the description of the cooling system, it should be called to the attention of the reader that its plan view, taken along line 22—22, FIG. 20, is illustrated in FIG. 22, and, therefore, its description should be read with the aid of FIGS. 20, 22, and, to some extent, FIG. 25.

The inner portion of the toroidal chamber 2028 is provided with a plurality of orifices 2029, which are uniformly distributed around its periphery. The side-disc 2022 is also provided with a plurality of orifices 2030 uniformly distributed around its periphery. Similar orifices 2031, 2032, and 2033 are provided, respectively, in the upper portion of the side-disc 2001, the blades, such as blades 2004, and the bottom portion of the side-disc 2000. The blades 2004 are the blades of the first turbine stage which are also shown in FIG. 25 where the orifices or the cooling channels 2032 are visible in cross-sectional view. The outer left stationary side-disc 2034 is provided with a cooling manifold 2035 which includes a plurality of cross-braces such as cross-braces 2036 and 2037 uniformly distributed around the periphery of the manifold. The manifold is also provided with an outlet 2038, a collecting manifold 2039, and a plurality of cross-braces 2040. The cross-braces 2036, 2037, and 2040 are formed as airfoils to reduce the amount of friction losses to a minimum. The manifold 2039 communicates with orifices 2041 in the blading 2003 of the expansion stator, and the cooling ducts or orifices 2041 of the stator also communicate with a chamber 2042 provided in the stationary duct wall 2043. This wall is also provided with a plurality of orifices 2044 which are directly in line with the plurality of orifices 2045 in the lower side-disc 2001 of the first rotor.

The functioning of the cooling system is as follows: air, under high pressure, is pumped into a pipe or duct 2025 and it flows in the duct in the direction indicated by an arrow 2046. It then enters the toroidal chamber 2028 and it leaves the latter through the plurality of orifices 2029, which are provided in the inner lower part of the toroidal chamber 2028. This latter flow is indicated by an arrow 2047. The cooling air then enters the orifice 2030 whereupon it flows through the orifices 2031, the cooling channels 2032 in the blades of the first turbine stage, and then through the orifices 2033. Upon leaving these orifices, as indicated by an arrow 2048, it enters the cooling manifold 2035, and it leaves the latter through the duct orifices or a circumferential duct slit 2038 and enters the duct itself in the manner indicated by an arrow 2049, where it joins the heated gases and is discharged into an exhaust hood or scroll 2050 after passing through all the turbine stages.

As indicated in the orifice 2031 by arrows 2051 and 2052, the cooling air entering the orifices 2031 is divided into two streams, the stream indicated by an arrow 2051 being used for cooling the first turbine stage 2004 while the stream indicated by an arrow 2052 enters an orifice 2045 and the orifice 2044 in the wall 2043 of the stationary duct 2053, whereupon this portion of the cooling air enters chamber 2042. Chamber 2042 is provided with a plurality of heat reflecting metallic members 2054, and the cooling air, entering chamber 2042, cools these heat reflecting members, whereupon it emerges into a manifold 2039 by passing through the cooling ducts 2041 of the expansion stator 2003. This flow of air is indicated by an arrow 2055. This stream of air then joins the stream illustrated by an arrow 2049.

The energy of the cooling air is not lost but largely is recovered and made to work through all the stages of the turbine.

It is desirable to cool as effectively as possible the wall 2043 of duct 2053 in order to protect the bearing and the labyrinth seal systems from excessive heat radiations. Such protection is especially desirable for bearing 2056 and the high pressure seals 2057, 2058, and 2059, which all have direct contact with the axial extension or boss 2060 of the stationary duct 2053.

The outer shaft 2023 is provided with an orifice 2061, and frame 2024 is provided with an orifice 2062 which is connected to a pipe 2063. This pipe interconnects orifice 2062 and hood 2050. Any gases or cooling air which may seep through the high intensity labyrinth seals 2064 and 2065 is ducted or conveyed through the orifices 2061, 2062, and pipe 2063 into duct 2050. This prevents the leakage of any heated air into the remaining bearing and the labyrinth seal systems. A breather system is provided for a chamber 2066 which is the chamber between an outer shaft 2023, a bearing 2067, and a wall portion 2068 of the main frame 2024. This is accomplished by providing an opening 2069 and a breather plug 2070 in a duct 2072 with the result that the chamber 2066 and chamber 2073 are maintained at atmospheric pressure. Both of the chambers are filled with an appropriate lubricant for the planetary gear system, including the pinion gear 2074 and two ring gears on the shafts 2023 and 2002.

The cross-sectional view of the turbine blading is illustrated in FIG. 21 and its parameters and operating values will be described in connection with FIGS. 23 and 23A, which are the velocity vector diagrams for the turbines.

Only a brief description is necessary of the turbine illustrated in FIG. 20A.

In FIG. 20A all the even-numbered stages are supported through the blading of the outermost stage 16 while in FIG. 20 all the even-numbered stages are supported through the blading 2004 of the first and the innermost stage of the turbine. The penalty of the structure disclosed in FIG. 20 resides in the fact that the second rotor is supported through the blading of the turbine stage having the smallest diameter but it has the advantage of having only two side-discs such as side-discs 2000 and 2022. On the other hand in FIG. 20A all the even-numbered turbine stages are supported through the blading of the strongest outermost stage 16, but this advantage is obtained at the expense of introducing an additional side-disc such as side-disc 2082A or side-disc 2022A. The windage losses in FIG. 20A will be somewhat higher than the same losses in FIG. 20.

FIG. 20B illustrates an additional modification of what is illustrated in FIGS. 20 and 20A in that the side-disc 2082A is now provided with a bearing 2000B mounted on the stationary duct 2053. The side-disc 2082A now has been extended at 2001B to rest on bearing 2000B. Such structure relieves the stresses that are otherwise imposed on blading 16 of the sixteenth stage of the turbine. It is quite obvious that the structure disclosed in FIG. 20B represents the best mechanically balanced structure of all the structures disclosed thus far in any of the figures, but such advantage is obtained at the expense of the increase in the specific weight and the added expense of adding an additional side-disc and an additional air-cooled bearing.

FIG. 20C is the application of the structure of FIG. 20, 20A, or 20B to a centripetal compressor having a plurality of vector-adjusting stages. In this case the vector-adjusting stages must be mounted between the outermost stages of the first rotor in the manner indicated in the figure. The vector-adjusting stages are stages 2018B, 2020B, and 2022B which are positioned between the compressor stages 2019B, 2021B and 2023B mounted on an extension 2099B of the side-disc 2082A.

*The Vector Diagrams of the Steam or Gas Turbines*

The preferred version of the vector diagram for the gas and steam turbines is illustrated in FIG. 23, and another version of the similar vector diagram is illustrated in FIG. 23A, the latter figure being included in the specification solely for the purpose of illustrating the fact that a number of expansion cycles and of the modes of conversion of potential energy of the working fluid into mechanical energy is possible with the disclosed turbine structures. The basic concept of the energy conversion is:

(A) Rapid conversion of the potential energy into kinetic energy at the entry into the turbine;

(B) Conveying of the excess kinetic energy through the innermost stages of the turbine to the outermost stages which are capable of converting greater amounts of kinetic energy into mechanical work than the innermost stages.

The above basic concept may then be stated in a more specific form, which may be considered as the preferred mode of operation, in which the local Mach number $M_{w'_x}$ is maintained constant or nearly constant through all the stages of the turbine so that all turbine flow channels defined by the blades are expansion channels, the degree of expansion per stage increasing with the increase of the inner radius of the stage.

Before proceeding with the specific description of the vector diagrams in FIGS. 23 and 23A, it may be helpful to compare what is disclosed in FIGS. 23 and 23A with the prior art vector diagrams.

In a contra-rotating turbine, the velocity vector diagrams must be symmetrical either with respect to the radius line, such as a radius line 2300 in FIG. 23, or not too far asymmetrical with respect to it, in order to load both turbine rotors and all the adjacent turbine stages almost equally. In the classical turbine engineering, two basic principles of turbine design are generally distinguished and used as the two basic points of departure. The first one is the impulse turbine and the second one is the 50–50 reaction turbine.

The impulse turbine is generally defined by the following ratios or equations:

$$\xi = \frac{U_1}{C_1} \cong 0.5 \quad (4)$$

or $$\frac{\cos \alpha}{2} = 0.5 \quad (5)$$

or $$\xi = \frac{U_1}{C_{u_1}} = .5 \text{ exactly} \quad (6)$$

or $$\beta_1 = \beta_2 \quad (7)$$

or $$W_{u_1} = W_{u_2} \quad (8)$$

where the above terms are those illustrated in FIG. 27.

When $\xi$ approaches the value of .5, the peripheral stage efficiency reaches a maximum which is obvious from the vector diagram illustrated in FIG. 27, since then there is no residual peripheral component of an absolute velocity leaving the stage. When this is so, then $C_2$ is exactly radial, and $C_{u_2}$ is equal to zero, the vector diagram of which is illustrated in FIG. 27.

The second point of departure is the 50–50 reaction turbine. The 50–50 reaction turbine is defined by $$C_{u_1} = U_1$$

or $$W_{u_2} = U_2$$

or $$\alpha_1 = \beta_2$$

or $$C_{u_1} + C_{u_2} = U_1$$

or $$\frac{U_1}{C_{u_1}} = 1.0$$

at which ratio the turbine reaches the highest efficiency, because no peripheral $C_u$ leaves the stage.

It is to be noted that the "efficiency" in this classical concept of the turbines is defined only as it pertains to a particular turbine stage. Furthermore, present day applications of fluid dynamics permit one to design turbines having different "reactions" while still maintaining high stage efficiencies. This is obtained by compounding of stages so that even though a single stage may be "inefficient" by itself, in the complex of all the stages the entire turbine is very efficient.

Such principle of stage compounding can be used to only a limited extent in axial flow machines because there the main peripheral velocities vary but little from stage to stage, and therefore all stages must operate according to very similar velocity triangles in their immediate mutual vicinity. Accordingly, the disclosed method is applicable only to the extent of the variation in the mean diameter of the turbine stages, which is not significant in the axial machines.

This is not the case in so far as the radial centrifugal flow turbines are concerned, because the stage velocities in the centrigual turbines vary as a function of their respective radial distances and, therefore, the centrifugal contra-rotating turbines can be made to take advantage in a unique manner of the modes of stage operation.

The above considerations are not applicable to the centripetal radial flow turbines at all, because the peripheral velocities of the stages in the centripetal flow machines are decreasing, which is directly the opposite of what takes place in the centrifugal flow machines. Thus the only turbine of the contra-rotating type that can take advantage of the above principle is the centrifugal flow turbine.

Turbines of the above type are well-known to the prior art and are generally known among those skilled in the art as the Ljungstrom turbines. However, the Ljungstrom turbines operate exclusively on the classical 50–50 reaction principle, in which there is no peripheral component $C_{u'_x}$ of the absolute exit velocity, $C_x'$, $C_x'$ being strictly radial in its direction, which is due to the fact that their design has been governed primarily by the desire to have equal or nearly equal energy conversions in the adajcent stages and symmetrical velocity vector diagrams which take the form of a series of congruent triangles symmetrically disposed on two sides of the radial line, such as line 2300 in FIGURE 23A. The Ljungstrom turbines, which are the contra-rotating centrifugal turbines, therefore operate on the 50–50 reaction principle, which is due to the fact that the Ljungstrom turbines are constructed, as stated above, on the principle of balanced vector diagrams of the type illustrated in FIG. 28, which is the diagram for the classical 50–50 reaction turbine (for one stage). Only a limited amount of the potential energy is converted into the kinetic energy in the inner most stages of the turbine since the working fluid enters the innermost stages with a low absolute velocity $C_0$, as illustrated in FIGURE 28.

According to the disclosed method, the preferred version of which is illustrated in FIGURE 23, the expansion begins at a very high rate in the first expansion stator 1813; this expansion can be such as to produce a local Mach number in the inter stage gap of the order of 1.0 or 1.3, which is indicated by the absolute exit velocity $C_1$.

The radial velocity $C_r$ remains constant as one progresses from radius $R_1$ which corresponds to the radius of the inner periphery of the first turbine stage and up to and including $R_2$, which corresponds to the radius of the outer periphery of the last turbine stage.

Although the radial velocity $C_r$ in FIG. 23 remains constant throughout the rotor portion of the turbine, this radial outflow velocity can increase or decrease in a workable vector diagram contemplated by the disclosed method. It is preferred mode of operation, however, when $C_r$ remains constant. The angular and the vectorial changes that take place in the vector diagram when $C_r$ is increasing are indicated in FIG. 23A. In FIG. 23A the initial velocity $C_1$ is not as high as the same velocity $C_1$ in FIG. 23, and some of the absolute velocities in FIG. 23A are actually higher than the absolute velocity $C_1$, $C_{15}'$ being the maximum absolute velocity in this case. When this is the case, the presence of the last stator stage, such as stage 187 in FIG. 18, becomes even more important than in the case of FIG. 23 because of the magnitude of the exit velocity $C_{16}' \equiv C_{17}$ is still high and it should be reduced to the exit velocity $C_{18}$, which corresponds to the velocity of the fluid within the hood, in order to avoid excessive losses in the exhaust system. The vector diagrams of the inner stages resemble the impulse turbine vector diagrams while the vector diagrams for the outermost stages of the turbine resemble the vector diagrams for the 50–50 reaction turbines.

The following additional observations follow from the study of the vector diagrams: as indicated in FIGURE 23, $$\frac{C_1}{a_{c_1}} = \frac{W_{16}'}{a_{c_{16}'}} = M_{w_x'} = \text{constant} \tag{9}$$

where $C_1$=the absolute velocity of the fluid at the entry into the first turbine rotor stage;
$a_{c_1}$=local velocity of sound;
$W_{16}'$=relative velocity of fluid at the exit from stage 16 of the turbine;
$a_{c_{16}'}$=local velocity of sound;
$M_{w_x'}$=general local Mach number for all rotors.

The local Mach number, $M_{c_x}$, with respect to the absolute velocities and the estators of the turbine is:

$$M_{c_x'} = \frac{C_x'}{a_{c_x'}} = \text{decreasing with the increasing radius and is the inverse function of the radius squared} \tag{10}$$

where $M_{c_x'}$ is the local Mach number with respect to all stages, including rotors and stators;
$a_{c_x'}$ are local sonic velocities at the exit from the turbine cascades ft./sec.

or, for all rotors, $$M_{w_x'} = \frac{W_x'}{a_{c_x'}} \tag{11}$$

where $W_x'$ are the relative entry velocities, and the remaining terms have the same meaning as in the previous equations.

The above Mach number $M_{w_x'}$ remains constant or nearly constant throughout the rotors of the turbine.

Although it is theoretically possible to make all the stages of a centrifugal turbine produce equal power, it is next to impossible to obtain such operation of the stages without exceeding the constant Mach number. All the stages of a centrifugal turbine can also be made to produce equal power per stage by diminishing the Mach number toward the outer stages. The equal power operation of the stages can be also produced if the ratio $R_1/R_2$ is higher than that indicated in FIG. 23. It is to be remembered that $R_1$ is the inner radius of the innermost stage and $R_2$ is the outer radius of the outermost stage. In FIG. 23, which represents one specific example of a radial turbine $$\frac{R_1}{R_2} = .386$$

which means that the turbine is a small diameter turbine. It is, therefore, practicable to obtain constant power operation or output per stage only with larger outside diameter turbines.

Even in the latter case, deriving equal power from all the stages can be done only with the increasing radial velocity $C_r$ toward the larger outermost stages. Such operation of the turbine does not represent the optimum mode of operation, because $C_r$, if anything, should either remain constant or decrease as one approaches the outer stage to avoid excessive loss of energy in the hood.

As will be pointed out later with the numerical examples, the gain in the power output of the stages, and especially the inner stages, is so great as long as they are operated with a constant Mach number with respect to the rotors that the additional gain that may be obtained by operating all stages at constant power per stage would result only in a small additional gain. Stated simply, the gain is not worth the trouble or the difficulties of designing the stages for such mode of operation.

The power distribution among the stages with the disclosed method is as follows:

For constant weight flow of the working fluid, the power of each stage is a function of the radius of the stage, which follows from the equation below $$\Delta N_{ST} = \psi(U^2) = \xi(R^2) \tag{13}$$

where $\Delta N_{ST}$=output of a stage, ft. lb./sec.
$\psi$=function of peripheral velocity
$U$=peripheral velocity, ft./sec.
$\xi$=function of radius
$R$=radius, ft.

In FIGURE 23, the ratio $$\frac{R_1}{R_2} = 0.386$$

Squaring $R_1/R_2$ gives one $$\left(\frac{R_1}{R_2}\right)^2 = (0.386)^2 = 0.149 \tag{14}$$

which is the ratio of power output of the first turbine stage to the last turbine stage, if congruent triangles are used, as in the Ljungstrom turbines. However, in the velocity system used in FIGURE 23, this ratio $(R_1/R_2)$, when used in the computation of the power outputs of the first and the last turbine rotor stages produces the following:

$$\frac{\Delta N_1}{\Delta N_{16}} \simeq \frac{\Delta L_1}{\Delta L_{16}} \simeq 0.96 \tag{15}$$

where $\Delta N_1$=power output of the first stage,
$\Delta N_{16}$=power output of the 16th stage,
$\Delta L_1$=expansion head in the first stage,
$\Delta L_{16}$=expansion head in the 16th stage.

Accordingly, in the Ljungstrom turbine the first stage would develop 14.9% of the power of the last stage. In the turbine illustrated in FIGURE 23, the first stage would develop 96% of the power of the last stage. The second stage in FIGURE 23 would produce .89 of the power of the last stage, etc.

Taking the average power of the Ljungstrom stage to be $$\frac{1+.149}{2} = 0.575 \tag{16}$$

as an index number for the Ljungstrom turbines, and $$\frac{1+.89}{2} = 0.945 \tag{17}$$

as an index number for the disclosed turbines, it follows that the disclosed turbines would have only 61% of stages required by the Ljungstrom turbines, which follows from the ratio of $$\frac{.575}{.945} = .61 \text{ or } 61\% \tag{18}$$

This figure would vary, depending upon the skill of application of this new method of expanding the working fluid, but it would be of that order of magnitude.

Such reduction of stages is very important in steam turbines where a large number of stages is always required because only a small heat drop takes place in steam even when the latter experiences a relatively large pressure drop, and the speed of rotation of the rotors and the turbine stages must be maintained at a low value because such speed is fixed by standard electric current frequencies, such as 60 cycles per second.

In spite of the excess kinetic energy, generated in the small diameter stages of the new method, the succeeding stages not only are fully able to convert the kinetic energy passed to them by the preceding stages, but in addition expand more, at an increasing rate with the increase of stage radius. This is apparent from the ratio of velocities $$\frac{W_x}{W_x'} \frac{\text{(The relative entry velocity)}}{\text{(The relative exit velocity)}} \quad (19)$$

the above vectorial quantities being also indicated in FIGS. 23 and 23A. This ratio is $$\frac{W_1}{W_1'}=.851 \text{ for the first rotor} \quad (20)$$

and $$\frac{W_{16}}{W_{16}'}=.4265 \text{ for the last rotor} \quad (21)$$

the expansion being therefore $$\left(\frac{.851}{.4265}\right)^2=(1.995)^2=3.98 \quad (22)$$

3.98 times greater in the last rotor, compared with the first rotor. In the Ljungstrom turbines, $W_x/W_x'$ ratio is always, in all rotors, of the order of (.4265); therefore all stages expand at a high rate, but only with small heat drops. The new method expands at a low initial rate at the inner stages and then at a non-constant rate which keeps increasing toward the large diameter stages, but with high heat drops. The reason for this is, that a large ratio $W_x/W_x'$ at high velocities makes a greater velocity difference than a small ratio $W_x/W_x'$ at low velocities.

FIG. 29 is a vector diagram for the first two stages of the turbine without an expansion stator. From the examination of this vector diagram it becomes at once apparent that the turning angle $\theta$ can be only very small if no first stator is used, and therefore the large difference between velocities $$\Delta W_0 = W_0' - W_0 \quad (23)$$

is impossible to achieve. Stated another way, the ratio $W_0/W_0'$ is too small for the turning angle $\theta$. Accordingly the described methods cannot be practiced with such turbines because it is tantamount to one's inability of designing a subsonic cascade for such a small ratio of velocities $W_0/W_0'$ with such a small turning angle $\theta$.

As $C_r$ increases in the centrifugal direction, as is the case for instance in FIG. 23A, one obtains unfavorably low stage heat drops on the small diameter stages, which is apparent from the examination of FIG. 23A. If, on the other hand, $C_r$ decreases toward the outer stages, the innermost stages become overloaded in comparison to the other stages. The latter also may be restated in the following manner: If $C_r$ increases in the centrifugal direction, as in FIG. 23A, for the same Mach number, the outermost stages produce greater energy conversions at less favorable vector angles. It perhaps would be safe to conclude here the discussion relating to the radial velocity $C_r$ by stating that when the $$\frac{R_1}{R_2}=.386$$

or when this ratio is reasonably comparable in its magnitude to .4, then the optimum results are obtained when $C_r$ is maintained constant as it is in FIG. 23. When this ratio becomes increasingly smaller, the turbine structure becomes increasingly more sensitive either to the decrease or the increase of $C_r$. However, when the above ratio of $R_1/R_2$ becomes increasingly larger, then it is still best to have a constant $C_r$ for proper loading of all the stages, but at the same time any departure from this pattern by making $C_r$ either increasing or decreasing in the centrifugal direction is not as critical as it is in the case with the turbines which have small overall diameter, and accordingly have small $R_1/R_2$ ratio. With the average run of the turbines it is quite safe to say that $C_r$ should remain constant and it is also quite safe to say that $C_r$ may be decreasing as the diameter of the stages increases without necessarily producing excessive underloading of the outermost stages and excessive overloading of the innermost stages.

FIG. 23 discloses that the relative velocities within the cascades of the first, small diameter stages are high. The losses in these cascades will be also high, but the level of the energy conversion is also high in these cascades; it is known from test experience of turbines, as well as compressors, that the ratio of losses to the energy conversion is very nearly constant, regardless of at what energy level it takes place. Therefore, the thermodynamic stage efficiency of the small stages in these turbines will remain normal, comparable to less loaded stages.

The absolute velocity $C_x$ keeps on decreasing in FIG. 23, from the smallest to the largest diameter stage, as it should with the constant Mach number. The ratio of these velocities is determined by the boundary temperature states of steam or gas that is being expanded in the turbine.

FIG. 23 also illustrates quite clearly the function of the last stator. The entry velocity, $C_{17}$, is turned and diffused into $C_{17}'$ and directed radially outward after leaving the stator, or in the case of an exit scroll, in a slightly peripheral sense.

Further study of the disclosed method also shows the following relationship:

$$\Delta L_{st} \pm .10 \Delta L_{st} = \text{constant} \quad (24)$$

where $\Delta L_{st}$ is the stage expansion head $\frac{\text{ft. lbs.}}{\text{lbs.}}$ The meaning of this relationship is that the expansion of the working fluid in all stages is a set value with a 10% tolerance.

$$.17 < \frac{U_x}{C_x} < 1.00 \quad (25)$$

where $U_x$ is the peripheral velocity on the inner radius of the stage;

$C_x$ is the absolute entry velocity into a rotor stage.

For the innermost stage this ratio is greater than .16 and for the outermost stage this ratio is less than 1.0.

Further examination of FIG. 23 discloses that the angle of turning, $\theta$, of the individual turbine rotor stages, which is the angle indicated in FIG. 23 as the angle between the relative entry velocity $W_x$ and the relative exit velocity $W_x'$, is decreasing as one progresses from the innermost stage toward the outermost stage. The first rotor stage turning angle is the angle between $W_1$ and $W_1'$, and, from the examination of FIG. 23, it is seen that it is an obtuse angle which is considerably greater than 90°. The last stage turning angle, which is the angle between the relative entry velocity $W_{15}$ and the relative exit velocity $W_{15}'$, is less than 90°. This angle of turning could be also taken with respect to the absolute velocity $C_x$ and the $C_x'$ since the absolute velocity $C_x$ is the absolute entry velocity and $C_x'$ is the absolute exit velocity of the same stage. Whatever is taken as the measure of the turbine turning angle, such turning angle for the innermost stage in the disclosed method is greater than 90° in the innermost stage and at most is equal to 90° in the outermost stage, but in the majority of the cases will be less than 90° in the outermost stage.

The tangential angle $\theta_1$, which is the angle between the relative entry velocity $W_x$ and the radial line 2300, is clearly less than 90° for the first rotor stage and diminishes with the increasing radius of the stage because the ratio $U_x/C_x$ is approaching unity toward the last stage. Accordingly $W_{15}$ has almost a radial direction.

If one is to indicate the magnitude of the limits for the tangential angle $\theta_1$, then it could be stated that $\theta_1$ (maximum) = 60°
$\theta_1$ (minimum) = 0°

It also has been stated previously that all turbine channels are converging channels so that all of the turbine channels are expansion channels. It also has been mentioned previously that the first rotor has a minimum amount of convergence while the last rotor has a maximum amount of convergence, the degree of convergence in the channels being governed and determined by the local Mach number. Accordingly, the degree of convergence in the channel is always determined so as to produce a maximum relative exit velocity of such magnitude so as to produce a local Mach number having the following practicable operating limits:

$M_{w'_x}$ (minimum) = 1. or (maximum) = 1.3

It should be repeated here once more that the above minimum and maximum limits indicate merely suitable design constants for practicing the disclosed method.

As mentioned previously, the inner velocity triangles resemble those in the impulse type of turbines while the outer triangles resemble or actually are 50–50 reaction turbine triangles. Accordingly, the expansion begins at a very high rate with the concomitant rapid reduction of the static temperature of the elastic fluid, this reduction in the static temperature being as rapid as possible and is limited only by the local Mach number $M_{w'_x}$. The velocity diagram for the initial or the first stage of the turbine obviously represents a far departure from the ideal 50–50 reaction velocity triangle and therefore does not conform any longer with the condition for the 50–50 reaction flow channel $$\xi = \frac{U}{C_u} = .5 \text{ (minimum for the outer stages)} \quad (26)$$

but may reach a value $$\xi = 4. \text{ (maximum for the inner stages)} \quad (27)$$

This has several consequences which are as follows: high initial expansion; high temperature drops in the inner stages; feasibility of high maximum temperatures, such as 2200° F.; reduction of the number of required stages by approximately 39%; substantially constant power output per stage (14.9% for the known turbines, 96% or 89% for the disclosed turbines) and either equal or higher efficiencies than in the known turbines. In so far as the overall efficiency of the turbine is concerned, the above results will not be obtained at the expense of the overall efficiency. Although the relative velocities in the first stages, undoubtedly, will be much higher than the same velocities in the known turbines, and, as a consequence, such stages will have higher frictional losses, yet the work, or the energy conversion, detained in these stages is also much higher, i.e., 96% or 89% of the outermost stages, in spite of their low peripheral velocities. The energy conversion will be also high in the initial stages due to much larger $C_{u_1}$ and $C_{u_2}$ components. This follows from the static head equation of radial centrifugal flow contra-rotating turbine, which is as follows:

$$\Delta L_t = \frac{1}{g}(C_{u_1}U_1 + C_{u_2}U_2), \frac{\text{ft. lbs.}}{\text{lbs.}} \quad (28)$$

where $\Delta L_t$ is the mechanical head in $\frac{\text{ft. lbs.}}{\text{lbs.}}$ $g$ is acceleration due to gravity;
$C_{u_1}$ is the projection of the absolute entry velocity $C_1$ upon the tangent line to the periphery of stage #1;
$C_{u_2}$ is the same type of projection for $C_2$—the absolute velocity at the exit from the same stage #1;
$U_1$ is the peripheral velocity of the inner periphery of stage #1;
$U_2$ is the same type of velocity for the outer periphery of stage #1.

Therefore the ratio of the net output to the isentropic input will still produce high efficiency per stage so that the turbine, taken as a whole, in spite of having fewer stages, will still have a thermodynamic efficiency which may even exceed the thermodynamic efficiency of the same type of turbines but with a larger number of stages.

An additional identifying parameter is the ratio of the $$\frac{\text{static head}}{\text{total head stage}} = \lambda$$

this being small in the first stage and approaching, but never reaching, unity, in the last or the outer rotor stage. Accordingly, for the inner stage $$0 < \lambda < 1 \text{ for the outer stage} \quad (29)$$

Another parameter could be the ratio $$\frac{\text{static head}}{2q} = \delta \quad (30)$$

where $$q = \frac{U_1^2}{2g}$$

The term "static head" may better be called the "power head," since the above relationship, in this case, is discussed with reference to the turbines rather than the compressors. It is $$\Delta L_{st} = \frac{1}{g}(C_1 U_1 + C_{u_2} U_2) - \frac{C_1^2 - C_2^2}{2g}, \frac{\text{ft. lbs.}}{\text{lbs.}} \quad (31)$$

but more properly:

$$\Delta L_{st} = \frac{1}{g}[C_{u_1}U_1 - (C_{u_2}U_2)] - \frac{C_1^2 - C_2^2}{2g} \quad (32)$$

with the usual meaning of the velocity vectors.

The "total head," $\Delta L_t$, is then:

$$\Delta L_t = \Delta L_{st} + \frac{C_1^2 - C_2^2}{2g}, \frac{\text{ft. lbs.}}{\text{lbs.}} \quad (33)$$

It may be stated in general that $\delta$ is decreasing toward the outermost stage, but it is impossible to set any limits, because $\delta$ is a function of the size of the machine.

One additional note should be given here, namely that it is believed more proper and more fundamental to consider, in the course of the discussion of the disclosed method and of the disclosed apparatus for performing the method, that, under the optimum operating conditions, the turbines have a constant local Mach number of the relative exit velocity which also is in conformance with the fact that the kinetic energy leaving a given stage is inversely proportional to the radius of the stage, and that the expansion head in each stage throughout all the rotor stages is constant within the limits of ±10%. It is far better to deal here with the concept of energy rather than velocities, because individual skill of a designer can alter, vary and make anything with the velocities, as demonstrated by the marked difference in the velocities in FIGS. 23 and 23A, whereas the concept of energy is more determinant. It is possible to demonstrate by known equations relating to the power output of any given stage that the Mach number is always a parameter of energy. Therefore, the constant Mach number of the relative exit velocity throughout all of the stages signifies constant energy conversion in every stage, within tolerance limits. And it is these tolerance limits which may be considered as more appropriate and firmer or more permanent guideposts toward defining of the disclosed process rather than any other quantities that may be discussed here without arriving at any definite conclusions. Even then, it should be kept in mind that even if one considers the Mach number such as $M_{w'_x}$ such Mach number does not constitute the only governing parameter defining the basic principle of the disclosed method, but such Mach numbers represent only the primary parameter that influences such methods.

It should be a matter of considerable interest to mention here however, that a significant similarity has been derived or evolved between the optimum method of operating the centripetal compressors utilizing vector-adjusting stages, and the centrifugal turbines. The optimum operation of the compressors is obtained by following a constant Mach number operation throughout all the stages or at least a majority of the compression stages. The same conclusions have been derived with the disclosed method with respect to the centrifugal radial flow turbines. Similiarly, in the centripetal compressor the Mach number is defined as the local Mach number with respect to the entry velocity $W_x$, while in the turbine the Mach number is defined with respect to the leaving velocity $W_x'$. If this were not so, it would have been possible to make $W_x$ reach or have a constant relative Mach number, which would call for a converging-diverging channel.

FIG. 30 discloses a vector diagram for a single rotation centrifugal turbine which also has a stator on the input side, a stator on the output side, a plurality of expansion stages between the two input and output stators, and also a corresponding plurality of stators between the turbine stages which represent the turning and the expansion stages in this machine. The degree of expansion obtained in the stator stages of the turbine is illustrated by the difference between the absolute velocity vectors $C_2$ and $C_3$, $C_4$ and $C_5$, etc. The amount of expansion differences obtained in the stator stages is again determined by the local Mach number which is maintained constant throughout all the rotating stages of the turbine. The constant Mach number in this case is the same as that in the contra-rotating machine; i.e., it is $M_{w'_x}$ which was defined previously.

The type of blading that would be used in the single rotation machine does not differ from that used in the double rotation machine except for the stator stages, the angle of turning obtained in the stator stages being illustrated in FIG. 30 by the angle between the absolute velocities $C_2$ and $C_3$, $C_4$ and $C_5$, etc. The stator stages are the turning and the expansion stages, the expansion being practiced in the stators as well as the rotors. The degree of expansion in the rotors is approximately equal to the degree of expansion in the stators, and the turbine is a 50–50 reaction turbine but with the distorted velocity triangles because of the rapid initial expansion and large $C_1$.

FIG. 32 illustrates the family of curves which illustrate the expansion process throughout all the stages of a typical radial flow turbine described in this invention.

$$\left(\frac{E_x}{E_1}\right)$$

represents the ratio of the absolute kinetic energy head, $E_x$ across any given stage divided by the kinetic energy head, $E_1$, across the first stator stage. This ratio is the highest in the first stage, where it is equal to unity, and it then diminishes very rapidly as one progresses through the first three stages; it is nearly constant through the remaining stages of the turbine. This ratio indicates the rate of conversion of the potential energy into kinetic energy in the respective stage, including the expansion stator; since the ordinate is equal to unity for the expansion stator, it follows that the above conversion is maximum in the stator, and less than unity in all the rotor stages. It follows from the above curve that if the first stator were not present, this curve would have very small ordinate values throughout all the turbine stages, and therefore, it would have been impossible to load the innermost stages with the kinetic energy in the manner indicated in this curve. The $E_x/E_1$ ratio also may be considered as the kinetic energy increment produced in the respective stages, and it illustrates that the greater portion of this curve is almost a straight line which is parallel to the abscissa. The asymptotic portion of the curve, next to the ordinate, indicates that there is a very rapid conversion of the potential energy of the working fluid into kinetic energy within the stator, which is then converted into work in the succeeding rotor stages of the turbine.

The rate of conversion of the kinetic energy into work in the respective stages is expressed by the curve $E_x/L_x$. The $E_x/L_x$ ratio is the ratio of the absolute kinetic energy head, $E$, across any given rotor stage divided by the work delivered by the same stage. The shape of the curve begins at a high value in the first stage and diminishes first rapidly and then slowly toward the last outermost stage. It expresses the availability of the kinetic energy at any stage in terms of its power output. Since the power output of all stages is not too far from being constant, it is feasible that the amount of the available kinetic energy in the small diameter stages is very large, and in the large diameter stages very small. This curve then expresses the distribution of the available kinetic energy throughout all the stages in the radial direction. The curve also indicates that there is a rapid conversion of the kinetic energy into work in the outer stages, even though a large amount of the kinetic energy is conveyed to these stages from the inner stages, in addition to the kinetic energy developed within these outer stages.

The mechanical work accomplished by each stage of the turbine is expressed by the curve $$\left(\frac{L_x}{L_{16}}\right)$$

in terms of the work done by the largest diameter stage, $L_{16}$, which is the mechanical work actually delivered by the last or the outermost, rotating turbine stage. In the illustrated example, this stage is the 16th turbine stage. This ratio varies from about 0.9 to about 1.05 of the output of the last turbine rotor stage. This means that even the innermost stages of the smallest diameter convert very nearly the same amount of energy into work as the largest diameter stage, and that all the rotor turbine stages are very evenly loaded throughout the turbine. The intermediate stages actually produce a larger amount of work than the outermost stage.

This curve $$\left(\frac{L_x}{L_{16}}\right)$$

should be compared with the identical curve $$\left(\frac{L_x}{L_{16}}\right)_{L_j}$$

drawn for a typical Ljungstrom turbine computed on the basis of a vector diagram having congruent velocity triangles from the smallest to the largest stage. It is seen that the power output of the Ljungstrom turbine is very small in the small diameter stages and progressively increase with the increasing diameter of the stages until it reaches the same relative value as the output of the last stage of the turbine of this invention. The vertical distance (the difference between the respective ordinates) at any stage between these two curves $$\left(\frac{L_x}{L_{16}}\right)$$

and $$\left(\frac{L_x}{L_{16}}\right)_{L_j}$$

is equivalent to the gain obtained at any given particular stage in the turbine described in this application and the Ljungstrom turbine. In the curve for the Ljungstrom turbine, the variation between the ordinates is from 13.5% in the innermost stages to 100% in the outer stage.

This gain in the work obtained from the innermost stages of the turbine permits one to reduce the number of the required turbine stages by approximately 40% in one typical case worked out for such comparison.

The curve $$\left(\frac{U_x}{C_x}\right)$$

illustrates the variation of the velocity ratio from stage to stage. This stage velocity ratio should be familiar from the classical literature on steam turbines. For pure impulses turbines, this ratio is $$\frac{U_1}{C_1} \simeq .5$$

and for 50–50 reaction turbines (equal expansion in the stator and rotor), it is equal to $$\frac{U_1}{C_1} \simeq 1.0$$

In the new system of the radial centrifugal flow turbines, that ratio is represented by a straight line because it is the direct function of the radius. Although the reaction is of the order of 50–50 throughout all the stages, the ordinates of this curve vary from approximately .15 to approximately .68. The significance of this ratio resides in the graphical illustration of the change of the velocity vectors $U_x$ and $C_x$ as a function of the radius of the turbine stages increases. The absolute velocity of the fluid, $C_x$, decreases as the radius of the stages increases and the peripheral velocity increases as the radius of the stages increases. Therefore, this ratio must increase with the increase of the stage diameter. The $$\left(\frac{U_x}{C_x}\right)$$

ratio is a straight line relationship only when the radial velocity $C_R$ is constant and the local Mach number $M_{w_x'}$ is also constant which is the preferred mode of operation of the turbines according to the disclosed method. Accordingly, the degree of expansion in the flow channels is adjusted to produce not only the constant local Mach number, but also to produce the linear $U_x/C_x$ relationship.

It may be noted here that since it is much more proper from the point of view of reality, to take the above velocity ratios as the $U/C_u$ ratios, rather than the $$\left(\frac{U}{C}\right)_x$$

ratios, it turns out that $$\left(\frac{U_x}{C_n}\right)_{16}$$

is actually $$\left(\frac{U_x}{C_u}\right)_{16} \simeq .83$$

in FIG. 23, and can easily be made equal to one. Accordingly, the last stage of the disclosed turbines will always be the classical 50–50 reaction stage.

The additional curve which is also illustrated in this FIG. 32 is the ratio of the relative entry ($W_x$) and exit ($W_{x'}$) velocities in any stage; i.e., $W_x/W_{x'}$. It is also a straight line curve increasing from the first stage to the last stage of the turbine, which again illustrates in a more direct manner than the $$\left(\frac{U_x}{C_x}\right)$$

curve that the degree of expansion in the turbine stage channels, from stage to stage, is increased as a linear function of the radial distance of the stage from the axis of rotation.

The $$\left(\frac{C_x'}{C_1'}\right)^2$$

curve designates the ratio of the exit kinetic energy at any given stage, $x$, divided by the exit kinetic energy of the first rotor stage. The exit kinetic energy of the first turbine or rotor stage is the highest exit kinetic energy in the entire turbine rotor or rotors, and therefore, this ratio becomes a yardstick for the assimilation of the kinetic energy by the large diameter stages. The curve begins with a high value at the first stage and constantly decreases in value with the increase in the diameter of the stages, which means that the kinetic energy of any preceding stage is being absorbed or converted into work by the succeeding stage at an increasing rate throughout all of the stages of the turbine and not only by a few stages. The ratio finally reaches a value of approximately .38 in the last outermost turbine stage, which means that only 38% of the kinetic energy leaving the first stage is passed out by the last stage. It should be noted that the kinetic energy of the last rotor stage is further recovered by the exit stator stage before the gases enter the exhaust hood. This additional energy recovery is not indicated in this figure.

The invention therefore discloses a series of turbine structures and the methods of their operation, which produce radial centrifugal flow turbines capable of delivering greater shaft horse-power with a lesser number of stages with a given potential energy of fluid as compared to the radial turbines known to the prior art. Therefore, it is possible to obtain radial turbine machines having lower specific weight and higher overall efficiencies. Since by far the larger cost of any turbine is represented by the number of stages used in the machine for producing the desired horse-power, it follows that the disclosed radial machines will be much cheaper than the known radial turbines. As mentioned previously, it becomes possible to reduce the number of required stages by approximately 40% in the discussed specific example. Such reduction may be even greater in other machines having other $R_1/R_2$ ratio. It also has been stated in the discussion of these machines that it will enable one to operate the innermost stages of the turbines at lower temperatures, and therefore, the disclosed machines and methods also offer an opportunity to increase the maximum temperature of the operating cycle which in turn increases the overall efficiency of the power plant.

I claim:

1. A contra-rotatable centripetal flow compressor for compressing an elastic fluid, said compressor comprising a first rotor having a plurality of centripetal flow compression stages rotatable in one direction, a second rotor having a plurality of centripetal flow compression stages rotatable in the direction opposite to the direction of rotation of said first rotor, at least some of the stages of the first rotor interleaving some of the stages of the second rotor, and at least one stationary vector-adjusting stage positioned between the outermost, or the first, rotatable compression stage of said compressor and the next succeeding, or the second, rotatable stage of said compressor, all of said stages defining a single, radial centripetal flow channel of said compressor, said channel lying in a single, transverse plane, perpendicular to the axis of rotation of said first and second rotors.

2. A centripetal flow compressor comprising a housing, a stationary centra-prerotation centripetal flow stator stage at the entry to said compressor, a stationary centripetal flow diffusion stator stage at the exit from said compressor, a first rotor rotatable in one direction, a second rotor rotatable in the opposite direction, said rotors being positioned in said housing between said stationary stator stages, said compressor having at least first and second centripetal flow compression stages, and a stationary centripetal flow vector-adjusting stage positioned between said first and second compression stages.

3. A centripetal flow compressor including a first centripetal flow compression stage rotatable in one direction, a second centripetal flow compression stage rotatable in the direction opposite to the direction of rotation of said first stage, and a centripetal flow vector-adjusting stage positioned between said first and second compression stages, said vector-adjusting stage having a flow turning angle having the magnitude at the design operating point of the compressor to make the local Mach number at the entry to the second compression stage substantially equal to the local Mach number at the entry into the first compression stage.

4. A centripetal flow compressor comprising a first rotor having first and third side-discs, first and second compression stages supported by and suspended from said first side-disc, at least a fourth compression stage suspended from said third side-disc, said third side-disc being suspended from and supported by said second stage, a second rotor having a second side-disc mounted adjacent to the inner surface of said first side-disc, and at least a third compression stage supported by and suspended from the inner side of said second side-disc.

5. A centripetal flow compressor as defined in claim 4 which also includes additional compression stages—including said fourth stage—mounted on said third side-disc, additional compression stages mounted on said second side-disc, including said third stage, and a stationary vector-adjusting stage positioned between said first and second compression stages.

6. A centripetal compressor as defined in claim 4 which also includes a stationary contra-prerotation stage at the entry to said compressor, a stationary diffusion stage at the exit from said compressor, and a centrally located stationary duct for receiving compressed air from said compressor, said duct having a radial flow portion merging into an axial flow portion, said diffusion stage constituting the outer periphery of the radial flow portion of said duct.

7. A centripetal compressor comprising a frame, a stationary duct having an axial flow portion and a radial flow portion, said radial flow portion terminating in a diffuser stator receiving compressed fluid from said compressor, said duct being supported by said frame, a first shaft rotatively mounted on and surrounding the axial flow portion of said duct, a second shaft in concentric relationship with and surrounding said first shaft, a first compressor rotor, including a plurality of compression stages and the innermost compression stage of said compressor, said first rotor being mounted on said first shaft through the blading of said innermost stage, and a second compressor rotor mounted on said second shaft, said second rotor having a plurality of compression stages.

8. A centripetal flow compressor comprising a first rotor rotatable in one direction and having a first side-disc and a first plurality of centripetal flow compression stages mounted on and suspended directly from said first side-disc, said first plurality of compression stages including at least the first, second and fourth compression stages; a second rotor rotatable in the opposite direction and having a second side-disc and a second plurality of centripetal flow compression stages mounted on and suspended from said second side-disc, said second plurality of compression stages including at least the third and fifth compression stages; a first stationary vector-adjusting stage placed between said first and second compression stages, and a second stationary vector-adjusting stage placed between said second and third compression stages.

9. A radial flow turbomachine comprising a radial flow channel including an inner stator, an outer stator, a first rotor having a plurality of dynamic stages including the outermost stage, a second rotor having a plurality of dynamic stages including the innermost stage; said first rotor including first and second side-discs lying on the opposite sides of said radial flow channel, and constituting two side-walls of said radial flow channel, with at least most of the dynamic stages of said first rotor being mounted on said first side-disc, said first and second side-discs being connected to each other through one of the outer stages of the first rotor; a first hollow, outer shaft for rotatively supporting said first rotor, said shaft being connected to said second side-disc, a third side-disc supporting all of the stages of the second rotor, said third side-disc being mounted along and adjacent to the inner side of said second side-disc, and a second inner shaft for said second rotor, said shafts being concentric with respect to each other said shafts and connections between said shafts and said rotors lying completely outside the inner boundaries of said radial flow channel and said inner stator, said channel being free of any rotatable elements of said turbomachine.

10. The radial flow turbomachine as defined in claim 9 in which said machine is a centripetal flow compressor having a stationary vector-adjusting stage between the outermost stage of the first rotor and the next succeeding dynamic stage of said compressor.

11. A centripetal flow compressor comprising a single radial flow channel including a stationary contra-prerotation input stator, having a plurality of blades, at the entry to said compressor, a stationary diffuser and flow-directing output stator at the exit from said compressor, and first and second contra-rotatable rotors, each having a plurality of centripetal flow compression stages, the compression stages of the first rotor interleaving the compression stages of the second rotor; two concentric shafts, first and second means for connecting said respective rotors to said first and second shafts, said rotors being positioned between said input stator and said output stator, and a centrally positioned, funnel-shaped stationary duct, having a radial flow portion merging into an axial flow portion for receiving the output of said compressor, said output stator being connected to and constituting the outer periphery of the radial portion of said duct, said first and second means being located outside of said duct.

12. A radial flow turbomachine having a single radial flow channel, including a central duct terminating on its inner side with an inner stator having a plurality of blades, an outer stator having a plurality of blades, a first rotor having a plurality of stages rotatable in one direction, a second rotor having a plurality of stages rotatable in the opposite direction, first and second concentric shafts, means for connecting said first and second rotors to said first and second shafts, respectively, for rotatively supporting said first and second rotors between said inner and outer stators, said means and said shafts lying outside the inner boundaries of said central duct, said duct being free of any rotatable components of said turbomachine.

13. The radial flow turbomachine as defined in claim 9 in which said machine is a centripetal flow compressor having a stationary vector-adjusting stage between the first and the second stages of said compressor, said first and second stages being the first two corotatable stages of the first rotor.

14. The radial flow turbomachine as defined in claim 9 in which said turbomachine is a centripetal flow compressor having first and second rotatable compression stages mounted on the first rotor and a third rotatable compression stage mounted on the second rotor, a stationary vector-adjusting stage concentrically positioned between said first and second compression stages, and gear means interconnecting said first and second rotors, said gear means having a ratio to rotate the outermost stage of the first rotor—which is the first compression stage—and the outermost stage of the second rotor—which is the third compression stage—at two equal in magnitude but opposite in sign peripheral velocities.

15. A radial flow turbomachine having a single radial flow channel defined by a frame having a hood and an outer stator, said hood and said outer stator constituting the outer periphery of said channel, and having a plurality of blades uniformly distributed around said periphery; a stationary, curved, funnel-shaped duct having an axial flow portion merging into a radial flow portion, said radial flow portion terminating in a radial flow inner stator having a plurality of blades uniformly distributed around the periphery of the radial portion of said duct;

said axial flow portion having a longitudinal axis coinciding with the longitudinal and rotational axis of said turbomachine; first and second rotors each having a plurality of radial flow rotatable stages, stages of the first rotor interleaving stages of the second rotor, said first rotor including a first shaft, first and second side discs positioned on the opposite sides of the radial flow channel formed by said stages, said outer and inner stators and the radial portions of said hood and duct, stages of the first rotor being connected to and suspended from said first side disc; one of the stages of said first rotor interconnecting said first and second side discs through the blading of said one stage; said second side disc being directly connected to and mounted on said first shaft; said second rotor including a second shaft concentric with said first shaft, a third side disc connected to said second shaft and said plurality of stages suspended from said third side-disc; said frame surrounding said rotors and rotatively supporting said shafts, the outer stator being fluid-dynamically directly coupled to the outer-most rotatable stage of said turbomachine; the radial flow portion of said duct, said inner and outer stators and said rotatable stages comprising a single radial flow channel symmetrically disposed with respect to a single transverse plane perpendicular to the longitudinal axis of said duct and turbomachine.

16. A radial flow turbomachine comprising a single radial flow channel including the following elements fluid-dynamically directly coupled to each other: a hood terminating in a radial flow stator having a plurality of blades, first and second sets of rotatable intermeshing contra-rotatable stages, an inner radial flow stator having a plurality of blades fluid-dynamically directly coupled to the innermost rotatable stage, and a funnel-shaped duct having a radial portion merging into an axial portion, said radial portion including around its periphery said inner stator; first and second concentric shafts for rotatively supporting said first and second sets of stages respectively; first and second side-discs for rotatively supporting said first set of stages on said first shaft, said first side-disc being located on one side of said channel and said second disc being located on the opposite side of said channel, said first side-disc being connected to said second side-disc through one of the stages of said first set; a third side-disc connected to the second shaft and to said second set of stages, all of the connections between said first and second shafts, said side-discs, and said stages being located outside of said central duct.

17. A centripetal compressor comprising first and second rotatable compression stages and a stationary vector-adjusting stage positioned between said rotatable stages and having a turning angle to make the local Mach number $M_{W_2}$ at the entry into the second stage to have the following relationship:

$$M_{W_2} = M_{W_1} \pm \Delta M$$

where
$M_{W_1}$ is the local Mach number at the entry into the first stage;
$M_{W_2}$ is the local Mach number at the entry into the second stage;
$\Delta M$ has any value between $-0.2$ and $+0.2$.

18. A contra-rotatable centripetal flow compressor comprising a single radial flow channel defined by a first rotor having a plurality of centripetal flow compression stages rotatable in one direction, a second rotor having a plurality of centripetal flow compression stages rotatable in the direction opposite to the direction of rotation of the first rotor, and at least one stationary vector-adjusting stage positioned between the outermost, or the first rotatable compression stage constituting a part of the first rotor and the next succeeding, or the second rotatable compression stage constituting the outermost stage of the second rotor.

19. A centripetal flow compressor comprising a first rotor having first, second, third and fifth centripetal flow compression stages rotatable in one direction; a second rotor having fourth and sixth centripetal flow compression stages rotatable in the opposite direction to the direction of rotation of the first rotor, and at least first and second stationary vector-adjusting stages, said first vector-adjusting stage being positioned between said first and second compression stages, and said second vector-adjusting stage being positioned between said second and third compression stages, whereby said vector-adjusting stages are positioned between the rotatable stages of the first rotor, the count of said compression and of said vector-adjusting stages being in the centripetal direction said vector-adjusting stages having a turning angle dimensioned to discharge said fluid at the exit from said vector-adjusting stages so as to produce a substantially constant Mach number operation of said compressor.

20. A centripetal flow compressor comprising a first rotor rotatable in one direction and having first, second and fourth compression stages, a second rotor rotatable in the opposite direction and having third and fifth compression stages, and at least first and second stationary vector-adjusting stages, said first vector-adjusting stage being positioned between said first and second compression stages, and said second vector-adjusting stage being positioned between said second and third compression stages, whereby said first vector-adjusting stage is mounted between the first two outer-most stages of the first rotor and the second vector-adjusting stage is mounted between the two contra-rotating stages of the two rotors, the numerical order of said stages—in the centripetal direction—being as follows: the first rotatable compression stage followed by the first vector-adjusting stage, and then the second compression stage followed by the second vector-adjusting stage.

References Cited in the file of this patent

UNITED STATES PATENTS

| | | |
|---|---|---|
| 963,378 | Lorenz | July 5, 1910 |
| 2,044,540 | Moller | June 16, 1936 |
| 2,047,501 | Wettstein | July 14, 1936 |
| 2,145,886 | Meininghaus | Feb. 7, 1939 |
| 2,218,957 | Moeller | Oct. 22, 1940 |
| 2,318,990 | Doran | May 11, 1943 |
| 2,391,779 | Griffith | Dec. 25, 1945 |
| 2,417,693 | Lange | Mar. 18, 1947 |
| 2,430,183 | Moller | Nov. 4, 1947 |
| 2,575,682 | Price | Nov. 20, 1951 |
| 2,577,179 | Buchi | Dec. 4, 1951 |
| 2,747,367 | Savin | May 29, 1956 |
| 2,795,373 | Hewson | June 11, 1957 |

FOREIGN PATENTS

| | | |
|---|---|---|
| 7,783 | Great Britain | Apr. 2, 1913 |
| 447,945 | Great Britain | May 28, 1936 |
| 813,337 | France | Feb. 22, 1937 |